US012640089B2

(12) United States Patent
Kim et al.

(10) Patent No.: US 12,640,089 B2
(45) Date of Patent: May 26, 2026

(54) PIXEL CIRCUIT, DISPLAY APPARATUS INCLUDING THE SAME AND ELECTRONIC APPARATUS INCLUDING THE SAME

(71) Applicant: Samsung Display Co., LTD., Yongin-si (KR)

(72) Inventors: Kwihyun Kim, Yongin-si (KR); Dongwoo Kim, Yongin-si (KR); Sehyun Lee, Yongin-si (KR); Haksun Chang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/037,732

(22) Filed: Jan. 27, 2025

(65) Prior Publication Data

US 2025/0336338 A1 Oct. 30, 2025

(30) Foreign Application Priority Data

Apr. 30, 2024 (KR) ........................ 10-2024-0057911

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2310/08* (2013.01); *G09G 2330/021* (2013.01)

(58) Field of Classification Search
CPC .. G09G 3/00; G09G 3/20; G09G 3/22; G09G 3/30; G09G 3/32; G09G 3/325;
(Continued)

(56) References Cited

U.S. PATENT DOCUMENTS

2004/0155841 A1 8/2004 Kasai
2019/0066598 A1* 2/2019 Kim .................... G09G 3/3291
(Continued)

FOREIGN PATENT DOCUMENTS

EP 3871211 B1 5/2023
KR 1020220052265 A 4/2022

OTHER PUBLICATIONS

Extended European Search Report mailed Aug. 27, 2025 in EP Application No. 25173027.1, 18 pages.
(Continued)

*Primary Examiner* — Chanh D Nguyen
*Assistant Examiner* — Nguyen H Trong
(74) *Attorney, Agent, or Firm* — CANTOR COLBURN LLP

(57) ABSTRACT

A pixel circuit includes a first circuit including a seventh transistor connected to a fourth node, a fifth node and a sixth node, an eighth transistor for receiving a second writing-gate signal, and connected to the fifth node and the fourth node, a ninth transistor for receiving the second writing-gate signal and a data current and connected to the fifth node, a tenth transistor for receiving a second initialization-gate signal and a first initialization voltage and connected to a seventh node, an eleventh transistor for receiving an emission signal and a second power voltage and connected to the fifth node, a twelfth transistor connected to the seventh node and the fourth node and for receiving the second power voltage or a second initialization voltage, a thirteenth transistor for receiving an anode initialization-gate signal and the second initialization voltage and connected to the sixth node and a light emitting element.

15 Claims, 51 Drawing Sheets

(58) Field of Classification Search
CPC .. G09G 3/3233; G09G 3/3291; G09G 3/3275; G09G 3/3266; G09G 3/3283; G09G 3/3258; G09G 2300/043; G09G 2300/0819; G09G 3210/08; G09G 2330/021; H05B 45/325; H05B 45/345; H10K 59/121; H10K 59/126; H01L 23/00; H01L 25/16; H01L 27/15; H01L 27/32; H01L 27/142; H01L 33/62; H01L 51/52
See application file for complete search history.

(56) References Cited

U.S. PATENT DOCUMENTS

| | | | | |
|---|---|---|---|---|
| 2020/0312216 | A1 | 10/2020 | Kim et al. | |
| 2022/0101783 | A1* | 3/2022 | Han | G09G 3/32 |
| 2024/0363055 | A1* | 10/2024 | Zhang | G09G 3/32 |
| 2024/0363057 | A1* | 10/2024 | Zhai | G09G 3/32 |

OTHER PUBLICATIONS

Bernd Richter, "OLED-on-CMOS based bidirectional microdisplay for near-to-eye and sensor applications", Center for Organic Materials and Electronic Devices Dresden Fraunhofer IPMS, Dresden, Germany; Downloaded on Dec. 5, 2024 at 11:00:26 UTC from IEEE Xplore (3 pages).

* cited by examiner

PIXEL CIRCUIT, DISPLAY APPARATUS INCLUDING THE SAME AND ELECTRONIC APPARATUS INCLUDING THE SAME

This application claims priority to Korean Patent Application No. 10-2024-0057911, filed on Apr. 30, 2024, and all the benefits accruing therefrom under 35 U.S.C. § 119, the content of which in its entirety is herein incorporated by reference.

BACKGROUND

1. Field

Embodiments of the present invention relate to a pixel circuit, a display apparatus including the pixel circuit and an electronic apparatus including the pixel circuit. More particularly, embodiments of the present invention relate to a pixel circuit driven in a pulse width modulation method, operating an internal or external compensation of a threshold voltage of a driving transistor in a constant current generating circuit by current writing, including fewer transistors, and thus, applicable to a ultra-high resolution display apparatus, a display apparatus including the pixel circuit and an electronic apparatus including the pixel circuit.

2. Description of the Related Art

Generally, a display apparatus includes a display panel and a display panel driver. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls the gate driver and the data driver.

A conventional pixel circuit driven in a pulse width modulation method and operating internal compensation of the threshold voltage may include nineteen or more transistors and three or more capacitors. When the pixel circuit includes nineteen or more transistors and three or more capacitors, the pixel circuit may not be applied to an ultra-high resolution display apparatus due to a limitation in integration.

SUMMARY

Embodiments of the present invention provide a pixel circuit driven in a pulse width modulation method, operating an internal or external compensation of a threshold voltage of a driving transistor in a constant current generating circuit by current writing, including fewer transistors, and thus, applicable to a ultra-high resolution display apparatus.

Embodiments of the present invention also provide a display apparatus including the pixel circuit.

Embodiments of the present invention also provide an electronic apparatus including the pixel circuit.

In an embodiment of a pixel circuit according to the present invention, the pixel circuit includes a first circuit. The first circuit includes a seventh transistor including a control electrode connected to a fourth node, a first electrode connected to a fifth node and a second electrode connected to a sixth node, an eighth transistor including a control electrode configured to receive a second writing gate signal, a first electrode connected to the fifth node and a second electrode connected to the fourth node, a ninth transistor including a control electrode configured to receive the second writing gate signal, a first electrode configured to receive a data current and a second electrode connected to the fifth node, a tenth transistor including a control electrode configured to receive a second initialization gate signal, a first electrode configured to receive a first initialization voltage and a second electrode connected to a seventh node, an eleventh transistor including a control electrode configured to receive an emission signal, a first electrode configured to receive a second power voltage and a second electrode connected to the fifth node, a twelfth transistor including a control electrode connected to the seventh node, a first electrode configured to receive the second power voltage or a second initialization voltage and a second electrode connected to the fourth node, a thirteenth transistor including a control electrode configured to receive an anode initialization gate signal, a first electrode configured to receive the second initialization voltage and a second electrode connected to the sixth node and a light emitting element including a first electrode connected to the sixth node and a second electrode configured to receive a third power voltage.

In an embodiment, the first circuit may further include a second capacitor including a first electrode connected to the fourth node and a second electrode connected to the sixth node and a third capacitor including a first electrode connected to the seventh node and a second electrode connected to the first electrode of the twelfth transistor.

In an embodiment, the pixel circuit may further include a second circuit. The second circuit includes a first transistor including a control electrode connected to a first node, a first electrode connected to a second node and a second electrode connected to a third node, a second transistor including a control electrode configured to receive a first writing gate signal, a first electrode configured to receive a data voltage and a second electrode connected to the second node, a third transistor including a control electrode configured to receive the first writing gate signal, a first electrode connected to the first node and a second electrode connected to the third node, a fourth transistor including a control electrode configured to receive the emission signal, a first electrode configured to receive a first power voltage and a second electrode connected to the second node, a fifth transistor including a control electrode configured to receive the emission signal, a first electrode connected to the third node and a second electrode connected to the seventh node and a sixth transistor including a control electrode configured to receive a first initialization gate signal, a first electrode configured to receive the first initialization voltage and a second electrode connected to the first node.

In an embodiment, the second circuit may further include a first capacitor including a first electrode configured to receive a sweep signal and a second electrode connected to the first node.

In an embodiment, the first transistor, the fourth transistor, the fifth transistor, the eighth transistor, the ninth transistor, the eleventh transistor, the twelfth transistor and the thirteenth transistor may be P-type transistors. The second transistor, the third transistor, the sixth transistor and the tenth transistor may be N-type transistors.

In an embodiment, the seventh transistor may be an N-type transistor. The first electrode of the twelfth transistor may be configured to receive the second initialization voltage.

In an embodiment, the seventh transistor may be a P-type transistor. The first electrode of the twelfth transistor may be configured to receive the second power voltage.

In an embodiment, the second power voltage may be greater than the first power voltage.

In an embodiment, the first initialization gate signal may sequentially have an active level and an inactive level in a first period. The second initialization gate signal may sequentially have an inactive level and an active level in the first period. The first writing gate signal may have an inactive level in the first period. The second writing gate signal may have an inactive level in the first period. The emission signal may have an inactive level in the first period. The sweep signal may have a high level in the first period. The first initialization voltage may have a low level in the first period. The data current may have a low level in the first period. The anode initialization gate signal may have an active level in the first period.

In an embodiment, the first initialization gate signal may have the inactive level in a second period subsequent to the first period. The second initialization gate signal may have the inactive level in the second period. The first writing gate signal may have an active pulse in the second period. The second writing gate signal may have an inactive level in the second period. The emission signal may have the inactive level in the second period. The sweep signal may have the high level in the second period. The first initialization voltage may have the low level in the second period. The data current may have the low level in the second period. The anode initialization gate signal may have an inactive level.

In an embodiment, the first initialization gate signal may have the inactive level in a third period subsequent to the second period. The second initialization gate signal may have an active pulse in the third period. The first writing gate signal may have the inactive level in the third period. The second writing gate signal may have an active pulse in the third period. The emission signal may have the inactive level in the third period. The sweep signal may have the high level in the third period. The first initialization voltage may have a high pulse in the third period. The data current may have a high level in the third period. The anode initialization gate signal may have the active level in the third period.

In an embodiment, the first initialization gate signal may have the inactive level in a fourth period subsequent to the third period and a fifth period subsequent to the fourth period. The second initialization gate signal may have the inactive level in the fourth period and the fifth period. The first writing gate signal may have the inactive level in the fourth period and the fifth period. The second writing gate signal may have the inactive level in the fourth period and the fifth period. The emission signal may have an active level in the fourth period and the fifth period. The sweep signal may gradually decrease from the high level in the fourth period and the fifth period. The first initialization voltage may have the low level in the fourth period and the fifth period. The data current may have the low level in the fourth period and the fifth period. The anode initialization gate signal may have the inactive level in the fourth period and the fifth period.

In an embodiment, the data voltage may be applied to the first transistor and the light emitting element may emit a light in a writing frame. The first initialization gate signal may sequentially have an active level and an inactive level in a first period of the writing frame. The second initialization gate signal may sequentially have an inactive level and an active level in the first period of the writing frame. The first writing gate signal may have an active pulse in a second period of the writing frame. The data voltage may not be applied to the first transistor and the light emitting element may emit a light in a holding frame. The first initialization gate signal and the second initialization gate signal may have an inactive level in a first period of the holding frame. The first writing gate signal may have an inactive level in a second period of the holding frame.

In an embodiment of a display apparatus according to the present invention, the display apparatus includes a first circuit. The first circuit includes a first transistor including a control electrode connected to a first node, a first electrode configured to receive a first power voltage and a second electrode connected to a second node, a second transistor including a control electrode configured to receive a sensing control signal, a first electrode connected to a third node and a second electrode connected to the first node, a third transistor including a control electrode configured to receive the sensing control signal, a first electrode connected to the third node and a second electrode connected to the second node, a fourth transistor including a control electrode configured to receive an emission signal, a first electrode connected to the second node and a second electrode connected to a first electrode of a light emitting element, a first capacitor including a first electrode configured to receive the first power voltage and a second electrode connected to the first node and the light emitting element including the first electrode connected to the second electrode of the fourth transistor and a second electrode configured to receive a second power voltage.

In an embodiment, wherein the first circuit may further include a second capacitor including a first electrode connected to a fourth node and a second electrode connected to the first node. The display apparatus may further include a second circuit. The second circuit may include a fifth transistor including a control electrode configured to receive a scan signal, a first electrode configured to receive a data voltage and a second electrode connected to the fourth node and a third capacitor including a first electrode configured to receive a sweep signal and a second electrode connected to the fourth node.

In an embodiment, the first transistor and the fourth transistor may be P-type transistors. The second transistor, the third transistor and the fifth transistor may be N-type transistors.

In an embodiment, the scan signal may have an active pulse in a first period. The sensing control signal may have an active pulse in the first period. The emission signal may have an inactive level in the first period. The sweep signal may have a low level in the first period. The data voltage may have a reference level in the first period. The scan signal may have an inactive level in a second period subsequent to the first period. The sensing control signal may have an active pulse in the second period. The emission signal may have the inactive level in the second period. The sweep signal may have the low level in the second period. The scan signal may have an active pulse in a third period subsequent to the second period. The sensing control signal may have an inactive level in the third period. The emission signal may have the inactive level in the third period. The sweep signal may have the low level in the third period. The data voltage may have a pulse width modulation data in the third period. The scan signal may have the inactive level in a fourth period subsequent to the third period and a fifth period subsequent to the fourth period. The sensing control signal may have the inactive level in the fourth period and the fifth period. The emission signal may have an active level in the fourth period and the fifth period. The sweep signal may gradually increase from the low level in the fourth period and the fifth period.

In an embodiment, the first circuit may further include a sixth transistor including a control electrode configured to receive an anode initialization gate signal, a first electrode configured to receive a second initialization voltage and a second electrode connected to the first electrode of the light emitting element.

In an embodiment, the scan signal may have an inactive level in a first period. The sensing control signal may have an active pulse in the first period. The emission signal may have an inactive level in the first period. The sweep signal may have a low level in the first period. The scan signal may have the inactive level in a second period subsequent to the first period. The sensing control signal may have an active pulse in the second period. The emission signal may have the inactive level in the second period. The sweep signal may have the low level in the second period. The scan signal may have an active pulse in a third period subsequent to the second period. The sensing control signal may have an inactive level in the third period. The emission signal may have the inactive level in the third period. The sweep signal may have the low level in the third period. The data voltage may sequentially have a reference level and a pulse width modulation data in the third period. The scan signal may have the inactive level in a fourth period subsequent to the third period and a fifth period subsequent to the fourth period. The sensing control signal may have the inactive level in the fourth period and the fifth period. The emission signal may have an active level in the fourth period and the fifth period. The sweep signal gradually increases from the low level in the fourth period and the fifth period.

In an embodiment, the data voltage may be applied to the first transistor, and the light emitting element emits a light in a writing frame. The scan signal may have active pulses in a first period of the writing frame and a third period of the writing frame. The data voltage may not be applied to the first transistor, and the light emitting element emits a light in a holding frame. The scan signal may have an inactive level in the first period of the writing frame and the third period of the writing frame.

In an embodiment, the display apparatus may further include a third circuit. The third circuit may include a first current applying transistor including a first electrode for receiving a data current and a second electrode connected to a ground, a second current applying transistor including a first electrode connected to the third node and a second electrode connected to the ground and a third current applying transistor including a control electrode configured to receive an initialization gate signal, a first electrode configured to receive a first initialization voltage and a second electrode connected to the third node. A control electrode of the first current applying transistor and the first electrode of the first current applying transistor and a control electrode of the second current applying transistor may be connected to one another. The first current applying transistor and the second current applying transistor may be N-type transistors. The third current applying transistor may be a P-type transistor.

In an embodiment, the display apparatus may further include a third circuit. The third circuit may include a first current applying transistor including a first electrode for receiving a data current and a second electrode connected to a ground, a second current applying transistor including a first electrode connected to the third node and a second electrode connected to the ground and a third current applying transistor including a control electrode configured to receive an initialization gate signal, a first electrode configured to receive a first initialization voltage and a second electrode connected to the third node. A control electrode of the first current applying transistor and the second electrode of the first current applying transistor and a control electrode of the second current applying transistor may be connected to one another. The first current applying transistor, the second current applying transistor and the third current applying transistor may be P-type transistors.

In an embodiment, the first circuit may further include a fifth transistor including a control electrode configured to receive an anode initialization gate signal, a first electrode configured to receive a second initialization voltage and a second electrode connected to the first electrode of the light emitting element. The display apparatus may further include a second circuit. The second circuit may include a sixth transistor including a control electrode connected to a fourth node, a first electrode configured to receive a second power voltage and a second electrode connected to a fifth node, a seventh transistor including a control electrode configured to receive a scan signal, a first electrode configured to receive a data voltage and a second electrode connected to a sixth node, an eighth transistor including a control electrode configured to receive a compensation gate signal, a first electrode connected to the fourth node and a second electrode connected to the fifth node, a ninth transistor including a control electrode configured to receive the emission signal, a first electrode connected to the fifth node and a second electrode connected to the first node, a second capacitor including a first electrode configured to receive a sweep signal and a second electrode connected to the fourth node and a third capacitor including a first electrode connected to the sixth node and a second electrode connected to the fourth node.

In an embodiment, the first transistor, the fourth transistor, the fifth transistor, the sixth transistor and the ninth transistor may be P-type transistors. The second transistor, the third transistor, the seventh transistor and the eighth transistor may be N-type transistors.

In an embodiment, the scan signal may have an active pulse in a first period. The sensing control signal may have an active pulse in the first period. The emission signal may have an inactive level in the first period. The sweep signal may have a high level in the first period. The anode initialization gate signal may have an active level in the first period. The data voltage may have a reference level in the first period. The scan signal may have an inactive level in a second period subsequent to the first period. The sensing control signal may have an active pulse in the second period. The emission signal may have the inactive level in the second period. The sweep signal may have the high level in the second period. The anode initialization gate signal may have the active level in the second period. The scan signal may have an active pulse in a third period subsequent to the second period. The sensing control signal may have an inactive level in the third period. The emission signal may have the inactive level in the third period. The sweep signal may have the high level in the third period. The anode initialization gate signal may have the active level in the third period. The data voltage may have a pulse width modulation data in the third period. The scan signal may have the inactive level in a fourth period subsequent to the third period and a fifth period subsequent to the fourth period. The sensing control signal may have the inactive level in the fourth period and the fifth period. The emission signal may have an active level in the fourth period and the fifth period. The sweep signal gradually decreases from the high level in the fourth period and the fifth period. The anode initialization gate signal may have an inactive level in the fourth period and the fifth period.

In an embodiment, the data voltage may be applied to the sixth transistor and the light emitting element may emit a light in a writing frame. The scan signal may have active pulses in a first period of the writing frame and a third period of the writing frame. The data voltage may not be applied to the sixth transistor and the light emitting element may emit a light in a holding frame. The scan signal may have an inactive level in the first period of the writing frame and the third period of the writing frame.

In an embodiment, the display apparatus may further include a second circuit. The second circuit may include a sixth transistor including a control electrode connected to a fourth node, a first electrode configured to receive a second power voltage and a second electrode connected to a fifth node, a seventh transistor including a control electrode configured to receive a scan signal, a first electrode configured to receive a data voltage and a second electrode connected to a sixth node, an eighth transistor including a control electrode configured to receive a compensation gate signal, a first electrode connected to the fourth node and a second electrode connected to the fifth node, a ninth transistor including a control electrode configured to receive the emission signal, a first electrode connected to the fifth node and a second electrode connected to the first node, a second capacitor including a first electrode configured to receive a sweep signal and a second electrode connected to the fourth node and a third capacitor including a first electrode connected to the sixth node and a second electrode connected to the fourth node.

In an embodiment of a display apparatus according to the present invention, the display apparatus includes a display panel, a data driver, a gate driver and an emission driver. The display panel includes a pixel. The data driver is configured to output a data voltage to the pixel. The gate driver is configured to output a gate signal to the pixel. The emission driver is configured to output an emission signal to the pixel. The pixel includes a first circuit. The first circuit includes a seventh transistor including a control electrode connected to a fourth node, a first electrode connected to a fifth node and a second electrode connected to a sixth node, an eighth transistor including a control electrode configured to receive a second writing gate signal, a first electrode connected to the fifth node and a second electrode connected to the fourth node, a ninth transistor including a control electrode configured to receive the second writing gate signal, a first electrode configured to receive a data current and a second electrode connected to the fifth node, a tenth transistor including a control electrode configured to receive a second initialization gate signal, a first electrode configured to receive a first initialization voltage and a second electrode connected to a seventh node, an eleventh transistor including a control electrode configured to receive the emission signal, a first electrode configured to receive a second power voltage and a second electrode connected to the fifth node, a twelfth transistor including a control electrode connected to the seventh node, a first electrode configured to receive the second power voltage or a second initialization voltage and a second electrode connected to the fourth node, a thirteenth transistor including a control electrode configured to receive an anode initialization gate signal, a first electrode configured to receive the second initialization voltage and a second electrode connected to the sixth node and a light emitting element including a first electrode connected to the sixth node and a second electrode configured to receive a third power voltage.

In an embodiment of an electronic apparatus according to the present invention, the electronic apparatus includes a display panel, a data driver, a gate driver, an emission driver, a driving controller and a processor. The display panel includes a pixel. The data driver is configured to output a data voltage to the pixel. The gate driver is configured to output a gate signal to the pixel. The emission driver is configured to output an emission signal to the pixel. The driving controller is configured to control the data driver, the gate driver and the emission driver. The processor is configured to output input image data and an input control signal to the driving controller. The pixel includes a first circuit. The first circuit includes a seventh transistor including a control electrode connected to a fourth node, a first electrode connected to a fifth node and a second electrode connected to a sixth node, an eighth transistor including a control electrode configured to receive a second writing gate signal, a first electrode connected to the fifth node and a second electrode connected to the fourth node, a ninth transistor including a control electrode configured to receive the second writing gate signal, a first electrode configured to receive a data current and a second electrode connected to the fifth node, a tenth transistor including a control electrode configured to receive a second initialization gate signal, a first electrode configured to receive a first initialization voltage and a second electrode connected to a seventh node, an eleventh transistor including a control electrode configured to receive the emission signal, a first electrode configured to receive a second power voltage and a second electrode connected to the fifth node, a twelfth transistor including a control electrode connected to the seventh node, a first electrode configured to receive the second power voltage or a second initialization voltage and a second electrode connected to the fourth node, a thirteenth transistor including a control electrode configured to receive an anode initialization gate signal, a first electrode configured to receive the second initialization voltage and a second electrode connected to the sixth node and a light emitting element including a first electrode connected to the sixth node and a second electrode configured to receive a third power voltage.

According to the pixel circuit, the display apparatus including the pixel circuit and the electronic apparatus including the pixel circuit, the pixel circuit may be driven in the pulse width modulation method. The threshold voltage of the driving transistor in the constant current generating circuit may be internally or externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit and at least one transistor in the constant current generating circuit may be N-type transistors so that a power consumption may be reduced.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

It will be understood that when an element is referred to as being "connected to" another element, it can be directly connected to the other element or intervening elements may be present therebetween. In contrast, when an element is referred to as being "directly connected to" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Hereinafter, the present invention will be explained in detail with reference to the accompanying drawings.

Figure 1:
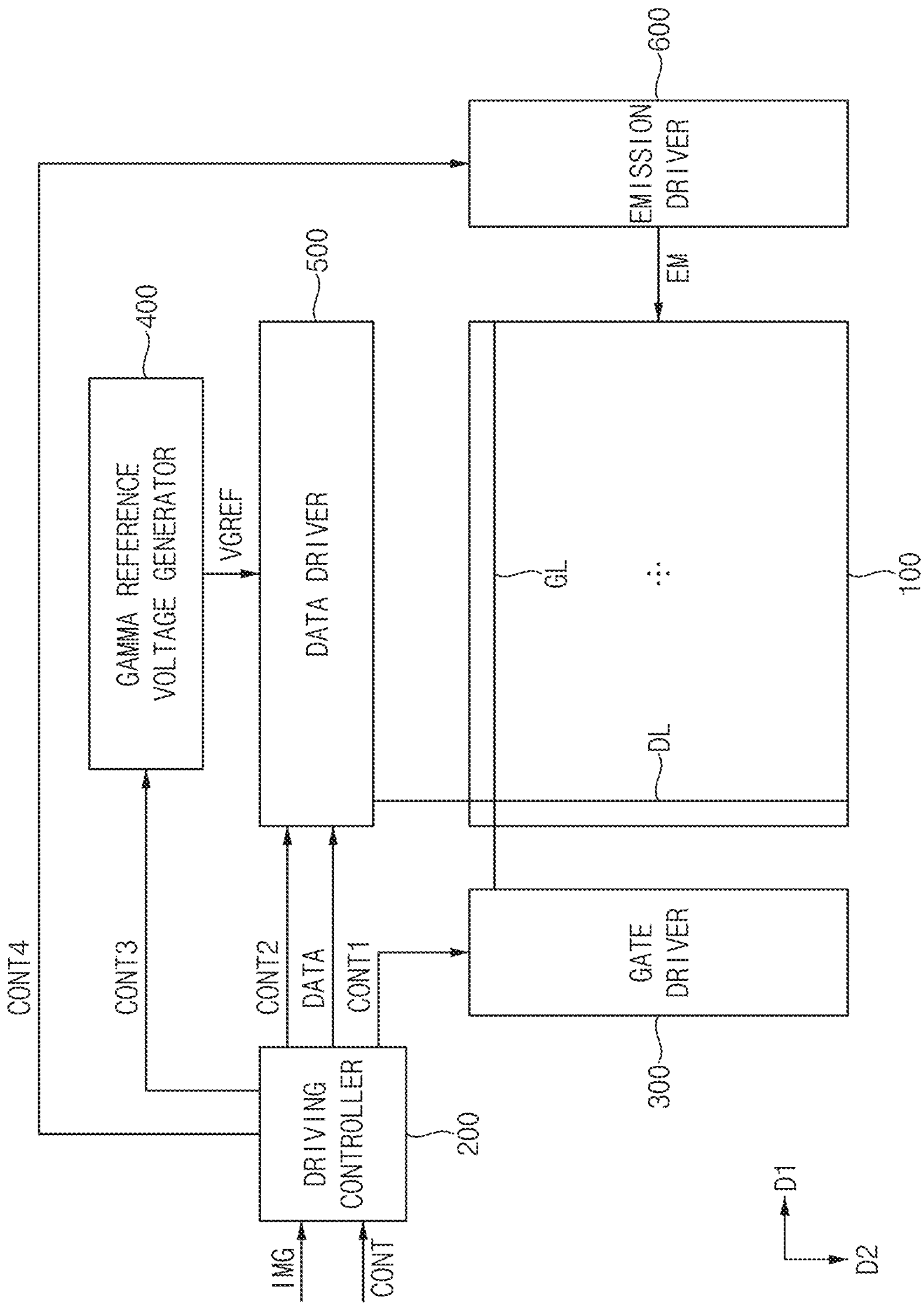
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include an emission driver 600.

The display panel 100 has a display region on which an image is displayed and a peripheral region adjacent to the display region.

The display panel 100 includes a plurality of gate lines GL, a plurality of data lines DL and a plurality of pixels electrically connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GL in response to the first control signal CONT1 received from the driving controller 200. The gate driver 300 may output the gate signals to the gate lines GL.

In an embodiment of the present invention, the gate driver 300 may be integrated on the peripheral region of the display panel 100. In an embodiment of the present invention, the gate driver 300 may be mounted on the peripheral region of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

In an embodiment of the present invention, the data driver 500 may be integrated on the peripheral region of the display panel 100. In an embodiment of the present invention, the data driver 500 may be mounted on the peripheral region of the display panel 100.

The emission driver 600 generates emission signals EM in response to the fourth control signal CONT4 received from the driving controller 200. The emission driver 600 may output the emission signals EM to the display panel 100.

In an embodiment of the present invention, the emission driver 600 may be integrated on the peripheral region of the display panel 100. In an embodiment of the present invention, the emission driver 600 may be mounted on the peripheral region of the display panel 100.

Figure 2:
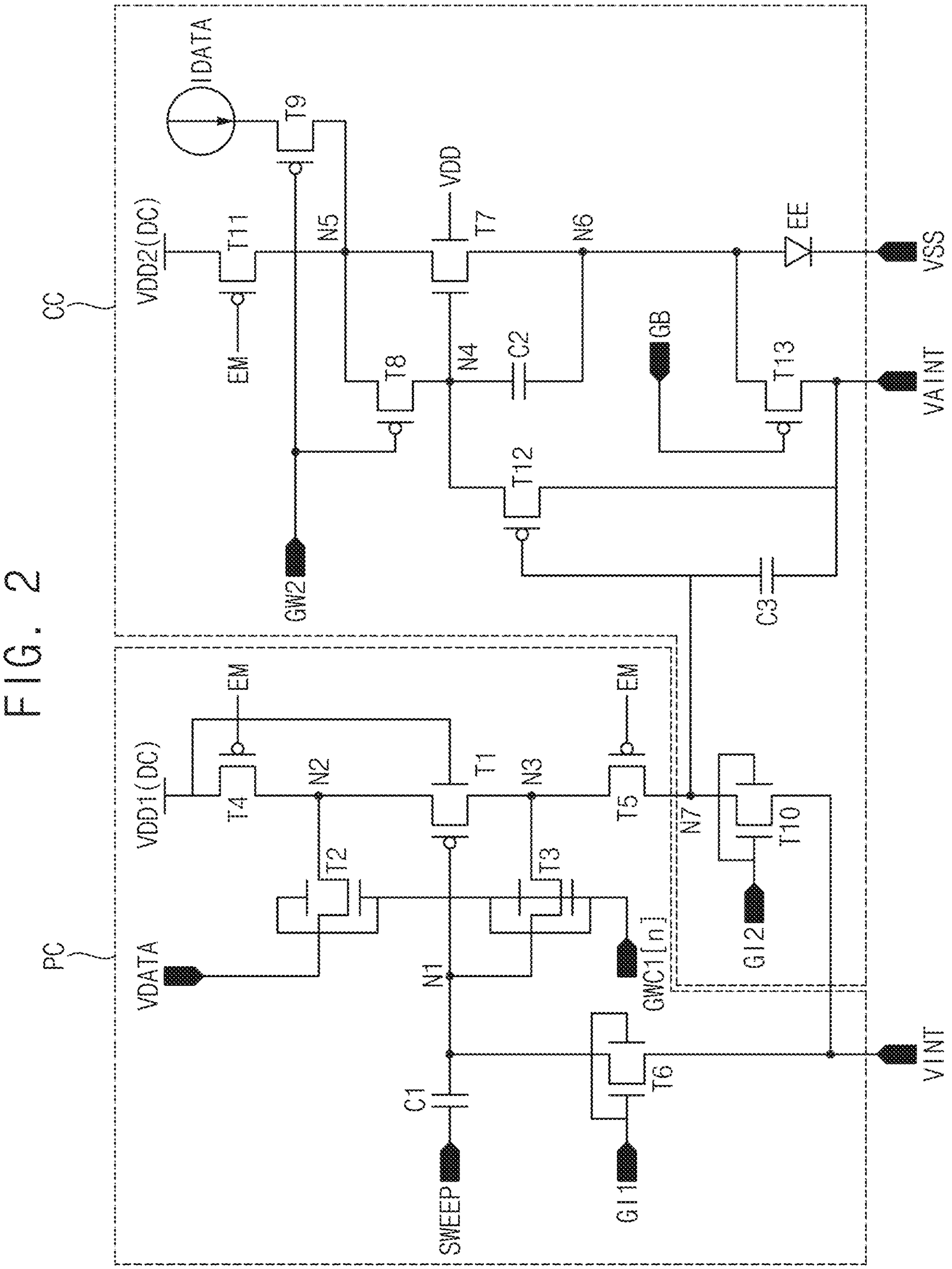
FIG. 2 is a circuit diagram illustrating a pixel circuit of the display panel of FIG. 1.

FIG. 2 is a circuit diagram illustrating a pixel circuit of the display panel 100 of FIG. 1.

Referring to FIGS. 1 and 2, the pixel circuit may include a first circuit CC and a second circuit PC.

The first circuit CC may be a "constant current generating circuit" for a constant current generation ("CCG"). The second circuit PC may be a "pulse width modulation circuit" for a pulse width modulation ("PWM").

The first circuit CC includes a seventh transistor T7 including a control electrode connected to a fourth node N4, a first electrode connected to a fifth node N5 and a second electrode connected to a sixth node N6, an eighth transistor T8 including a control electrode for receiving a second writing gate signal GW2, a first electrode connected to the fifth node N5 and a second electrode connected to the fourth node N4, a ninth transistor T9 including a control electrode for receiving the second writing gate signal GW2, a first electrode for receiving a data current IDATA and a second electrode connected to the fifth node N5, a tenth transistor T10 including a control electrode for receiving a second initialization gate signal GI2, a first electrode for receiving a first initialization voltage VINT and a second electrode connected to a seventh node N7, an eleventh transistor T11 including a control electrode for receiving the emission signal EM, a first electrode for receiving a second power voltage VDD2(DC) and a second electrode connected to the fifth node N5, a twelfth transistor T12 including a control electrode connected to the seventh node N7, a first electrode for receiving the second power voltage VDD2(DC) or a second initialization voltage VAINT and a second electrode connected to the fourth node N4, a thirteenth transistor T13 including a control electrode for receiving an anode initialization gate signal GB, a first electrode for receiving the second initialization voltage VAINT and a second electrode connected to the sixth node, and a light emitting element EE including a first electrode connected to the sixth node N6 and a second electrode for receiving a third power voltage VSS. Here, DC refers to a direct current.

The first circuit CC may further include a second capacitor C2 including a first electrode connected to the fourth node N4 and a second electrode connected to the sixth node N6 and a third capacitor C3 including a first electrode connected to the seventh node N7 and a second electrode connected to the first electrode of the twelfth transistor T12.

The second circuit PC may include a first transistor T1 including a control electrode connected to a first node N1, a first electrode connected to a second node N2 and a second electrode connected to a third node N3, a second transistor T2 including a control electrode for receiving a first writing gate signal GWC1[n], a first electrode for receiving the data voltage VDATA and a second electrode connected to the second node N2, a third transistor T3 including a control electrode for receiving the first writing gate signal GWC1[n], a first electrode connected to the first node N1 and a second electrode connected to the third node N3, a fourth transistor T4 including a control electrode for receiving the emission signal EM, a first electrode for receiving a first power voltage VDD1(DC) and a second electrode connected to the second node N2, a fifth transistor T5 including a control electrode for receiving the emission signal EM, a first electrode connected to the third node N3 and a second electrode connected to the seventh node N7, and a sixth transistor T6 including a control electrode for receiving a first initialization gate signal GI1, a first electrode for receiving the first initialization voltage VINT and a second electrode connected to the first node N1.

The second circuit PC may further include a first capacitor C1 including a first electrode for receiving a sweep signal SWEEP and a second electrode connected to the first node N1.

As explained above, the pixel circuit may include thirteen transistors and three capacitors.

In the present embodiment, some of the transistors in the pixel circuit may be P-type transistors and some of the transistors in the pixel circuit may be N-type transistors. For example, the P-type transistor may be a low temperature polycrystalline silicon ("LTPS") transistor. For example, the N-type transistor may be an oxide semiconductor transistor.

For example, the first transistor T1, the fourth transistor T4, the fifth transistor T5, the eighth transistor T8, the ninth transistor T9, the eleventh transistor T11, the twelfth transistor T12 and the thirteenth transistor T13 may be P-type transistors. The second transistor T2, the third transistor T3, the sixth transistor T6 and the tenth transistor T10 may be N-type transistors.

In the present embodiment, the seventh transistor T7 may be an N-type transistor. The first electrode of the twelfth transistor T12 may receive the second initialization voltage VAINT.

For example, the first transistor T1 may further include a second control electrode for receiving the first power voltage VDD1(DC). For example, the second transistor T2 may further include a second control electrode connected to the control electrode of the second transistor T2. For example, the third transistor T3 may further include a second control electrode connected to the control electrode of the third transistor T3. For example, the sixth transistor T6 may further include a second control electrode connected to the control electrode of the sixth transistor T6. For example, the seventh transistor T7 may further include a second control electrode for receiving a power voltage VDD. For example, the tenth transistor T10 may further include a second control electrode connected to the control electrode of the tenth transistor T10.

The light emitting element EE may emit a light based on the data voltage VDATA and the data current IDATA.

The data voltage VDATA may have a voltage level varied according to a light emission intensity of each pixel. For example, the data voltage IDATA may have a first current level for a red pixel, a second current level different from the first current level for a green pixel and a third current level different from the first current level and the second current level.

For example, the second power voltage VDD2 may be a high power voltage for determining a light emission degree of the light emitting element EE and the third power voltage VSS may be a low power voltage for determining the light emission degree of the light emitting element EE. The second power voltage VDD2 may be greater than the third power voltage VSS.

For example, the second power voltage VDD2 may be greater than the first power voltage VDD1. The first power voltage VDD1 may be a voltage for turning on the twelfth transistor T12. The twelfth transistor T12 is a P-type transistor so that the first power voltage VDD1 may be less than the second power voltage VDD2.

When the first transistor T1 is turned off and the seventh transistor T7 is turned on in a light emission period, the light emitting element EE may emit a light. When the first transistor T1 is turned on, and accordingly, the first power voltage VDD1 is applied to the control electrode of the twelfth transistor T12 in a light emission-off period, the twelfth transistor T12 may be turned on. When the twelfth transistor T12 is turned on, the second initialization voltage VAINT is applied to the fourth node N4 through the twelfth transistor T12 so that the seventh transistor T7 may be turned off and the light emitting element EE may stop emitting a light.

For example, the second initialization voltage VAINT may be less than the third power voltage VSS. When the second initialization voltage VAINT is less than the third power voltage VSS, a leakage current may be prevented from flowing through the light emitting element EE. Thus, a black characteristic of the pixel circuit may be enhanced.

In the present embodiment, the first writing gate signal GWC1[n] may be a progressive scan signal having different timings for pixel rows. Herein, [n] may represent an n-th pixel row. The pixel circuit of FIG. 2 for receiving the first writing gate signal GWC1[n] may be a pixel circuit included in the n-th pixel row.

The first initialization gate signal GI1, the second initialization gate signal GI2, the second writing gate signal GW2, the anode initialization gate signal GB may be global scan signals having the same timing regardless of the pixel row. In addition, the emission signal EM may be a global scan signal having the same timing regardless of the pixel row.

The first power voltage VDD1, the second power voltage VDD2, the third power voltage VSS and the second initialization voltage VAINT may be direct-current voltages. In contrast, the first initialization voltage VINT may be an alternating voltage. For example, the first initialization voltage VINT may have a first level and a second level.

Figure 3:
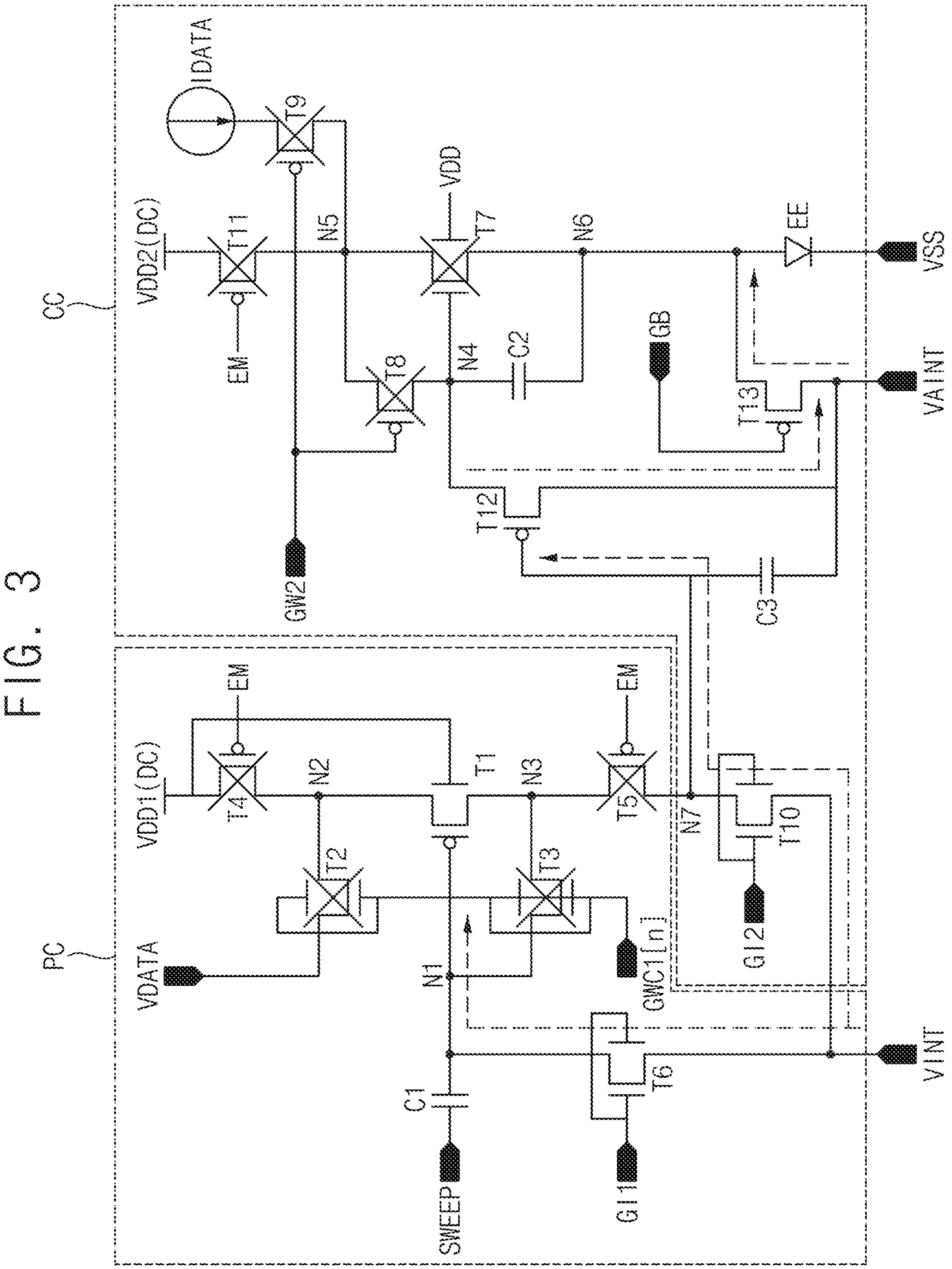
FIG. 3 is a circuit diagram illustrating an operation of the pixel circuit of FIG. 2 in a first period of a driving timing.
Figure 4:
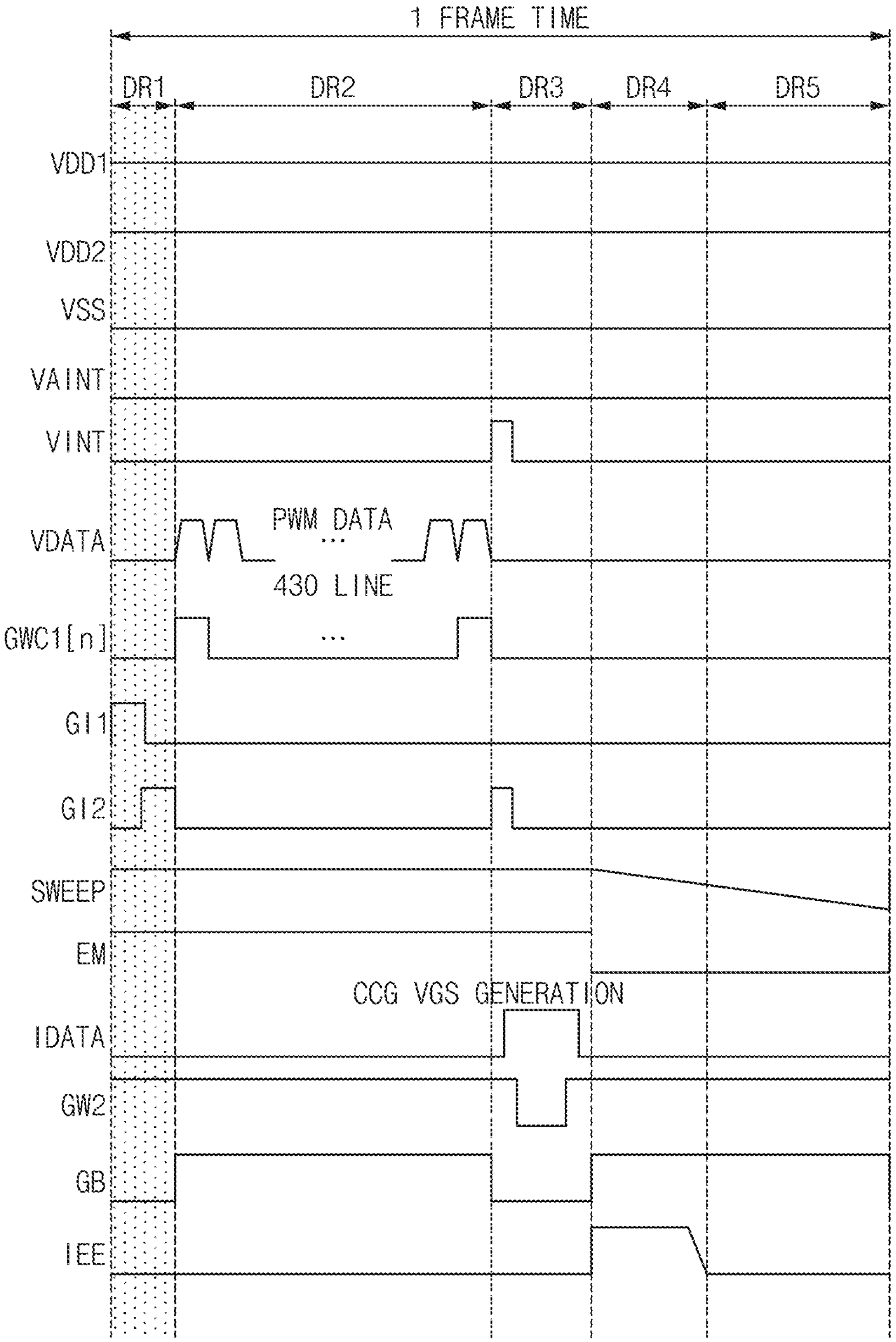
FIG. 4 is a timing diagram illustrating an example of input signals applied to the pixel circuit of FIG. 2 and an output signal of the pixel circuit of FIG. 2 in the first period.
Figure 5:
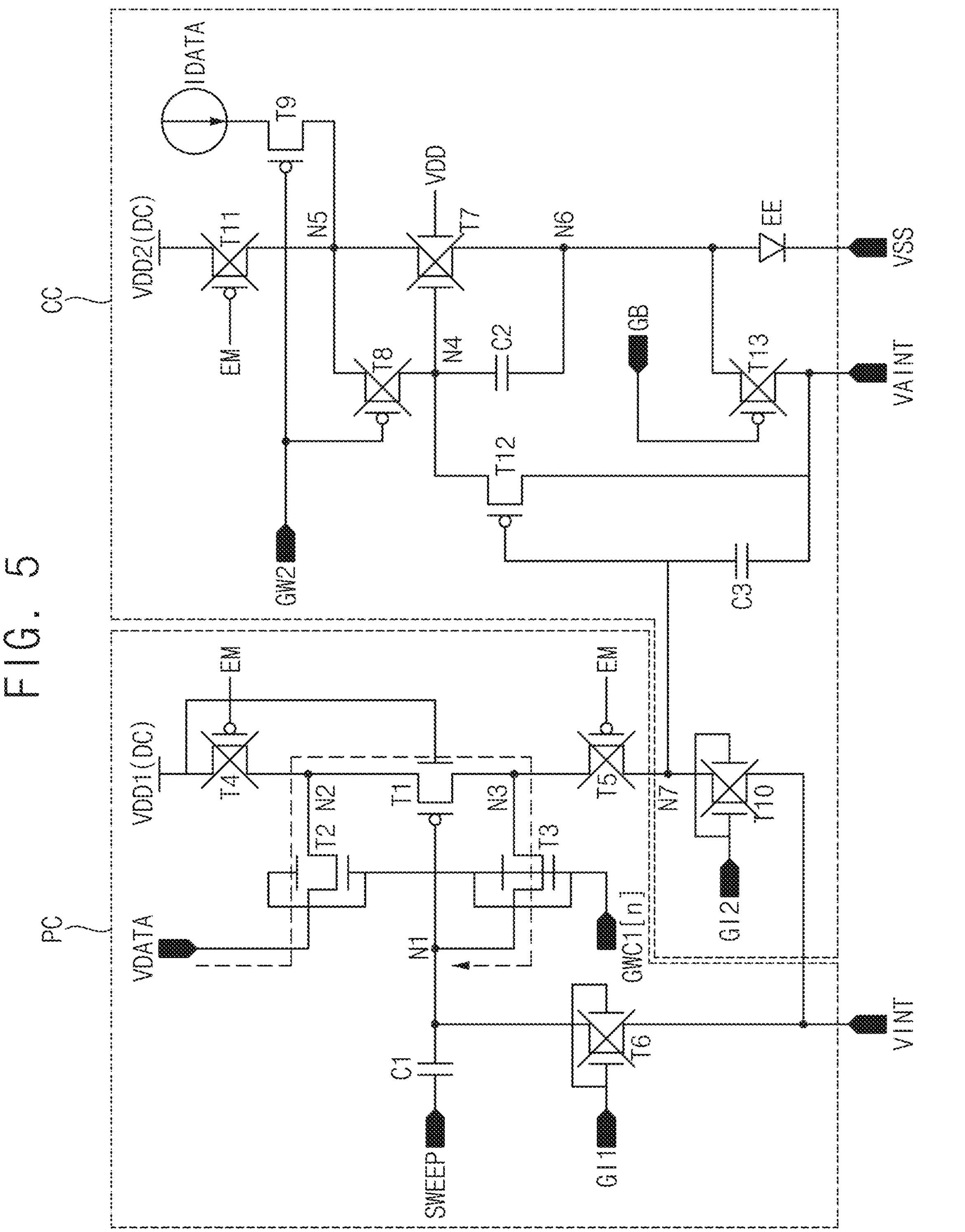
FIG. 5 is a circuit diagram illustrating an operation of the pixel circuit of FIG. 2 in a second period of the driving timing.
Figure 6:
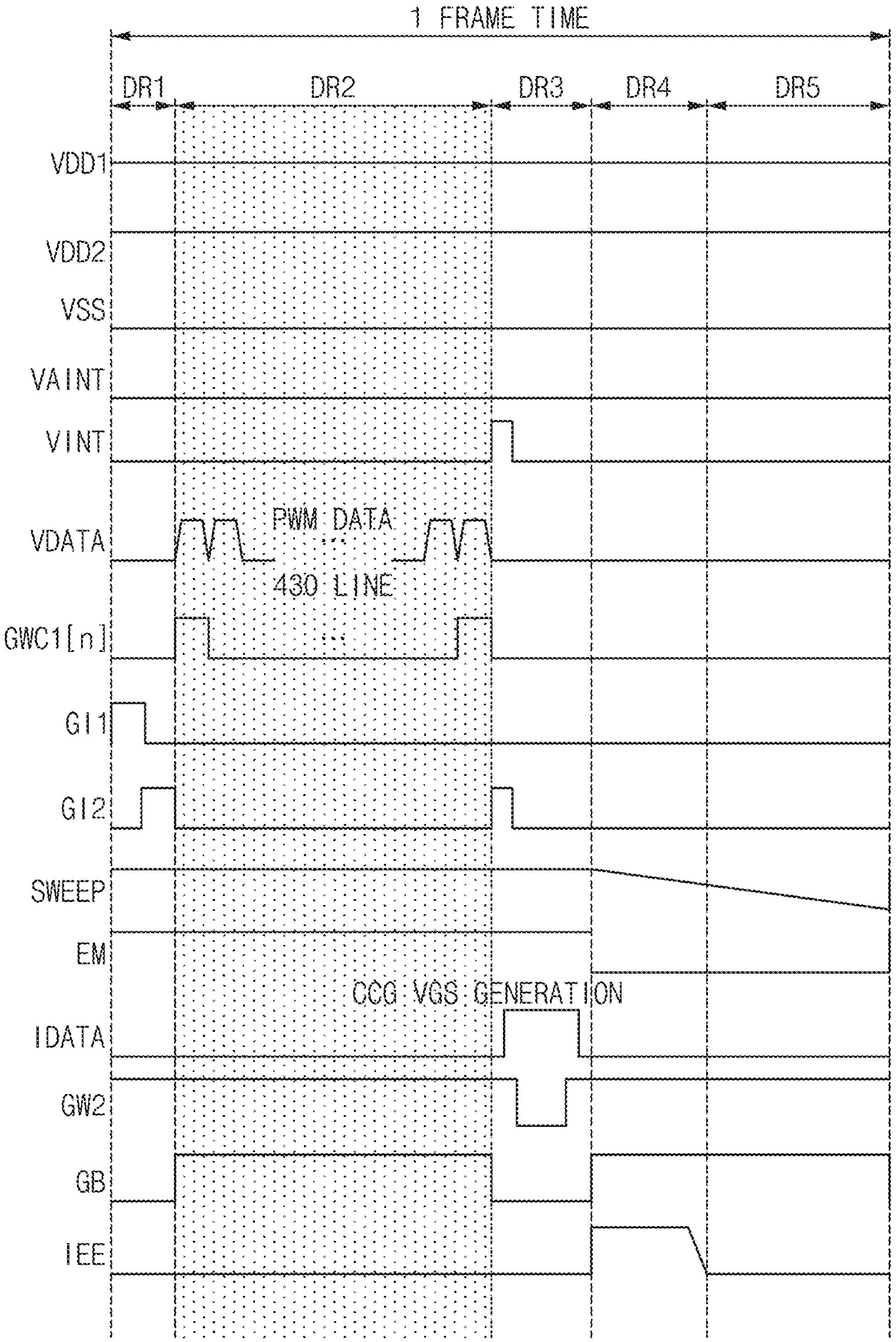
FIG. 6 is a timing diagram illustrating an example of input signals applied to the pixel circuit of FIG. 2 and an output signal of the pixel circuit of FIG. 2 in the second period.
Figure 7:
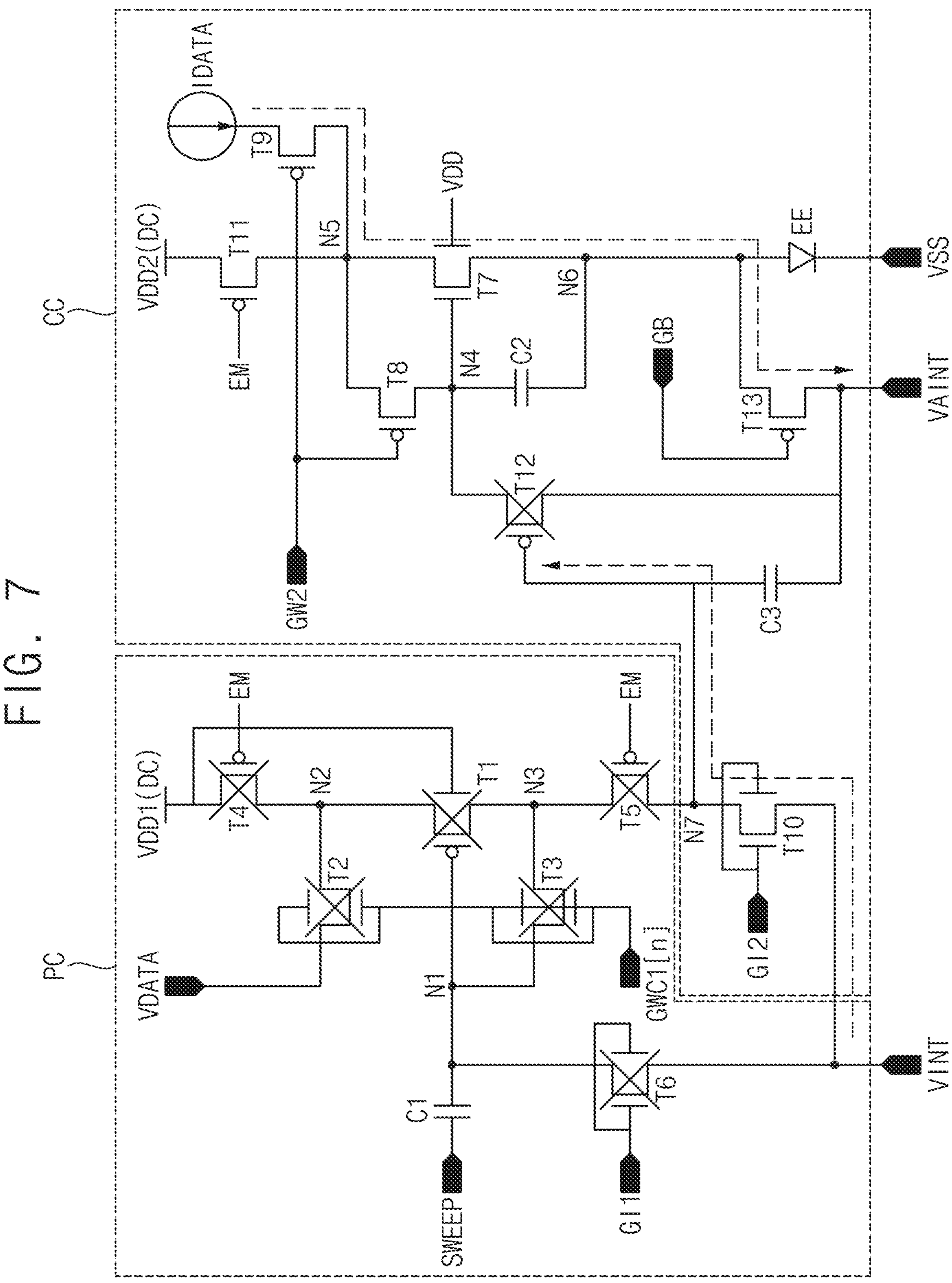
FIG. 7 is a circuit diagram illustrating an operation of the pixel circuit of FIG. 2 in a third period of the driving timing.
Figure 8:
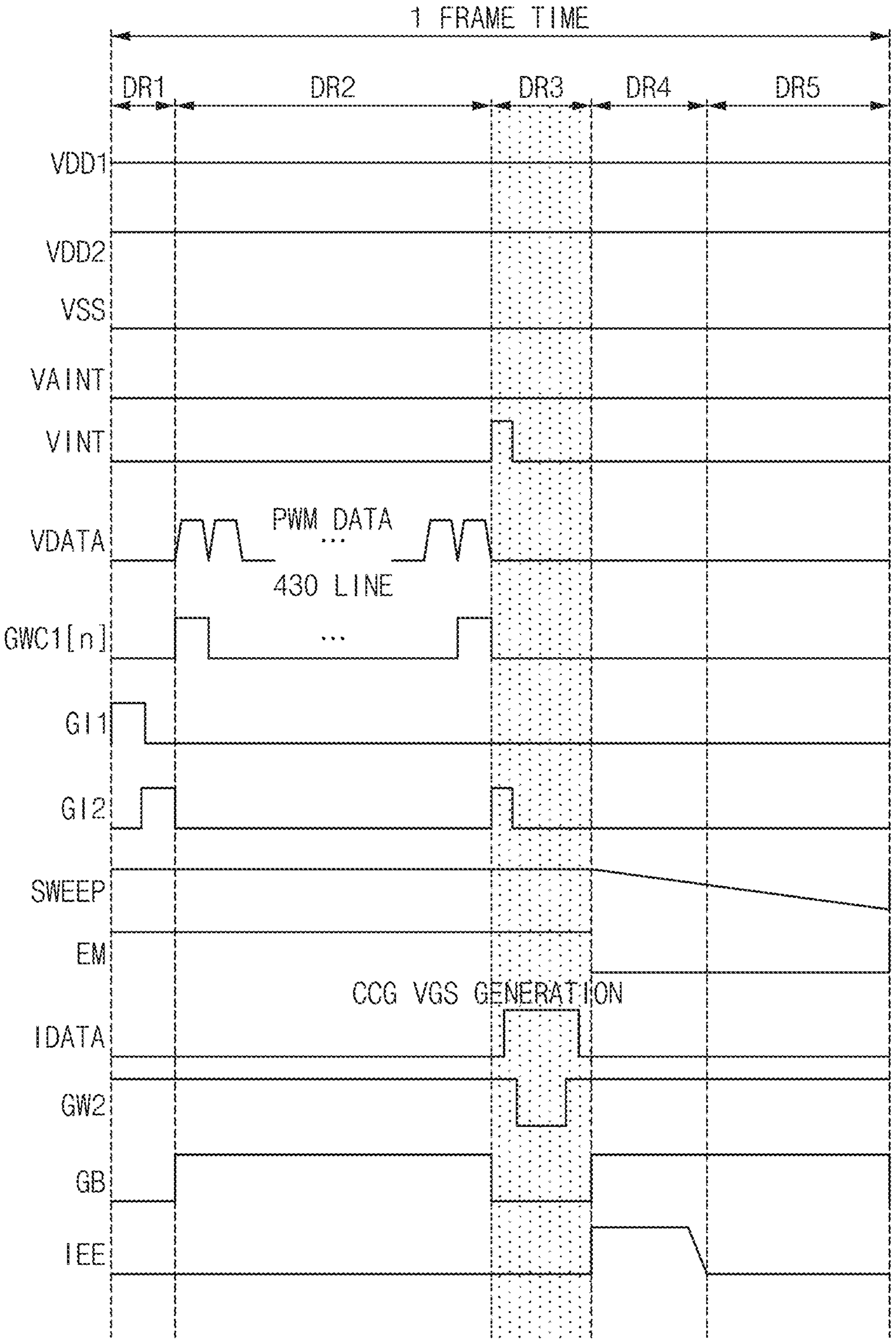
FIG. 8 is a timing diagram illustrating an example of input signals applied to the pixel circuit of FIG. 2 and an output signal of the pixel circuit of FIG. 2 in the third period.
Figure 9:
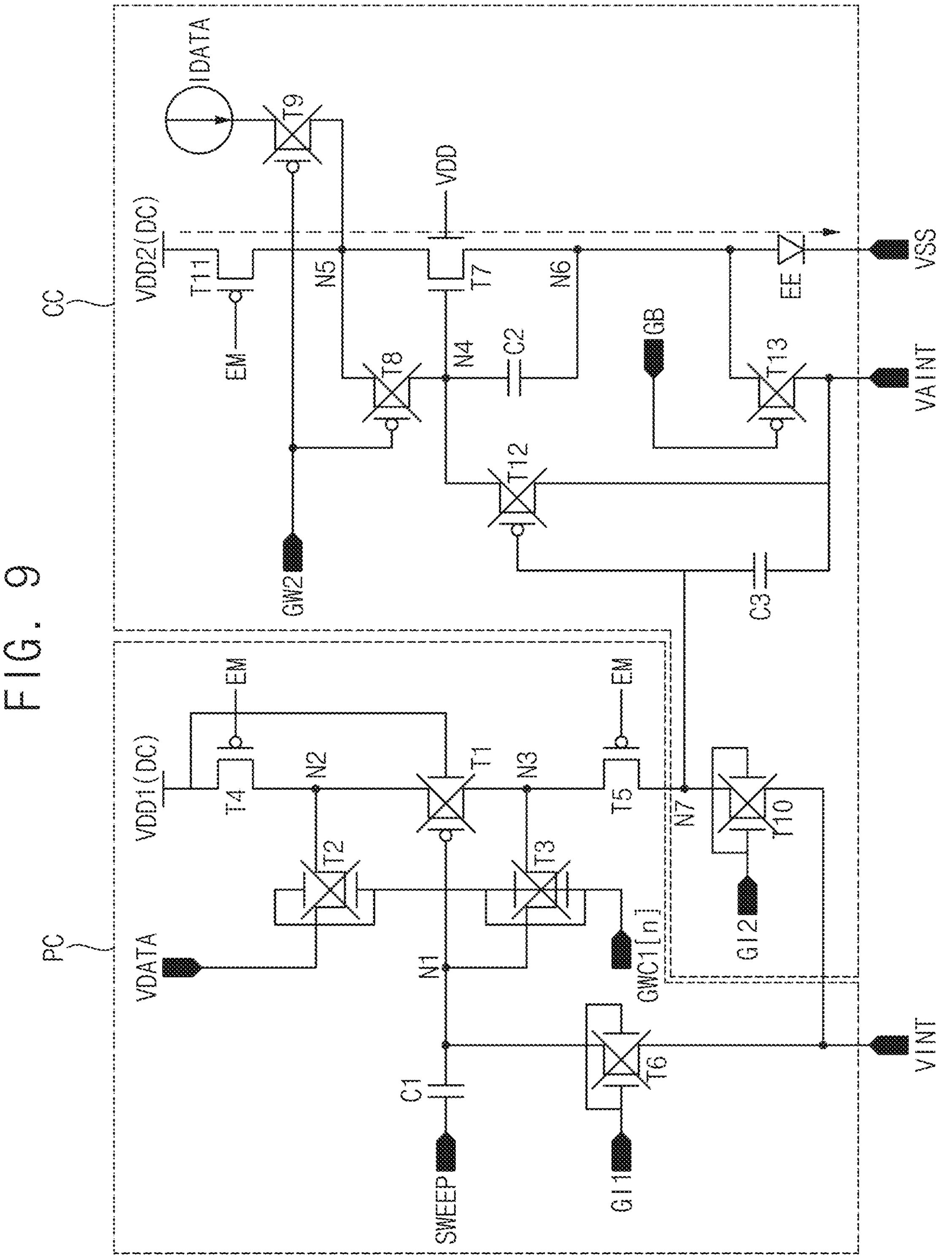
FIG. 9 is a circuit diagram illustrating an operation of the pixel circuit of FIG. 2 in a fourth period of the driving timing.
Figure 10:
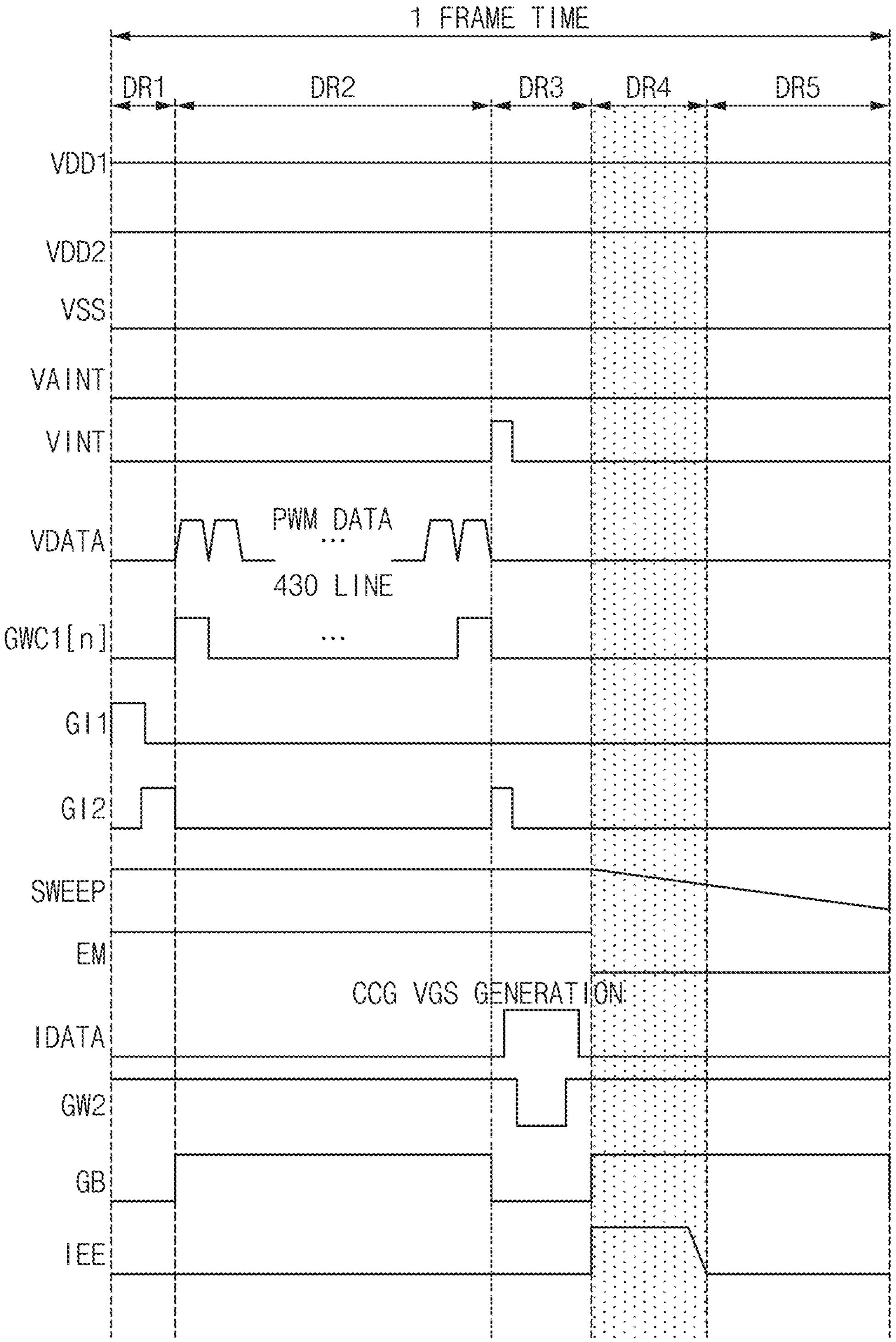
FIG. 10 is a timing diagram illustrating an example of input signals applied to the pixel circuit of FIG. 2 and an output signal of the pixel circuit of FIG. 2 in the fourth period.
Figure 11:
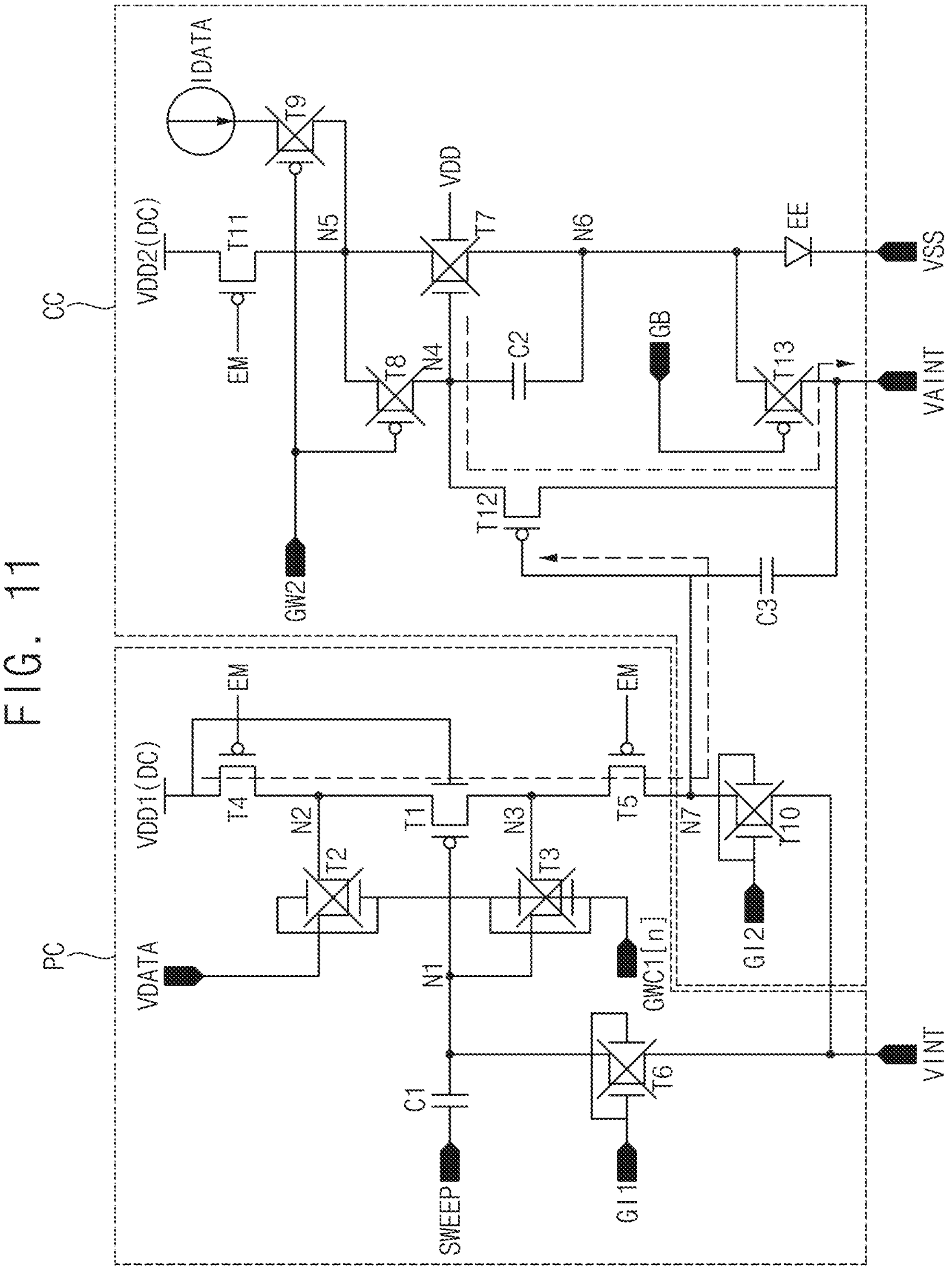
FIG. 11 is a circuit diagram illustrating an operation of the pixel circuit of FIG. 2 in a fifth period of the driving timing.
Figure 12:
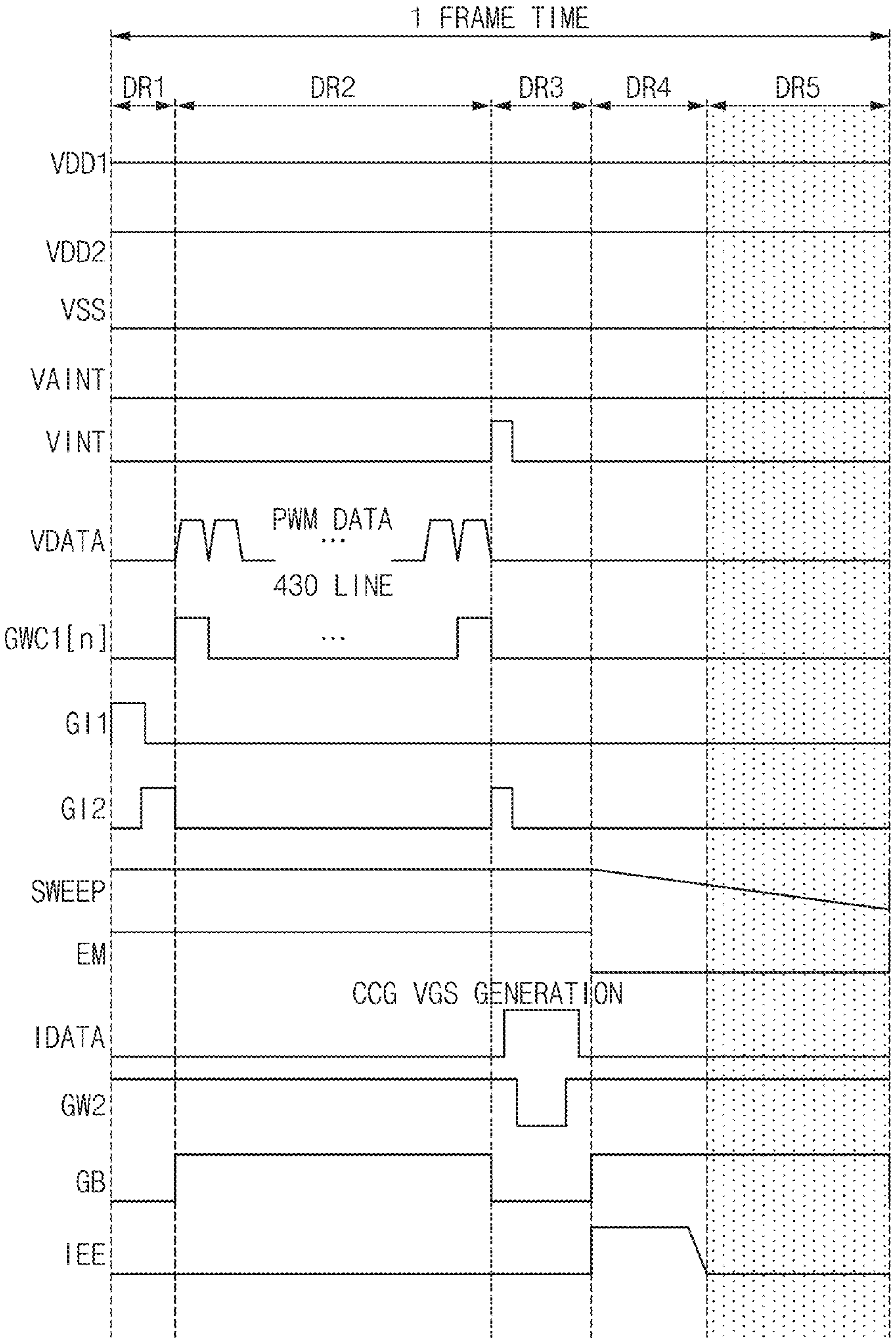
FIG. 12 is a timing diagram illustrating an example of input signals applied to the pixel circuit of FIG. 2 and an output signal of the pixel circuit of FIG. 2 in the fifth period.

FIG. 3 is a circuit diagram illustrating an operation of the pixel circuit CC and PC of FIG. 2 in a first period of a driving timing. FIG. 4 is a timing diagram illustrating an example of input signals applied to the pixel circuit CC and PC of FIG. 2 and an output signal of the pixel circuit CC and PC of FIG. 2 in the first period. FIG. 5 is a circuit diagram illustrating an operation of the pixel circuit CC and PC of FIG. 2 in a second period of the driving timing. FIG. 6 is a timing diagram illustrating an example of input signals applied to the pixel circuit CC and PC of FIG. 2 and an output signal of the pixel circuit CC and PC of FIG. 2 in the second period. FIG. 7 is a circuit diagram illustrating an operation of the pixel circuit CC and PC of FIG. 2 in a third period of the driving timing. FIG. 8 is a timing diagram illustrating an example of input signals applied to the pixel circuit CC and PC of FIG. 2 and an output signal of the pixel circuit CC and PC of FIG. 2 in the third period. FIG. 9 is a circuit diagram illustrating an operation of the pixel circuit CC and PC of FIG. 2 in a fourth period of the driving timing. FIG. 10 is a timing diagram illustrating an example of input signals applied to the pixel circuit CC and PC of FIG. 2 and an output signal of the pixel circuit CC and PC of FIG. 2 in the fourth period. FIG. 11 is a circuit diagram illustrating an operation of the pixel circuit CC and PC of FIG. 2 in a fifth period of the driving timing. FIG. 12 is a timing diagram illustrating an example of input signals applied to the pixel circuit CC and PC of FIG. 2 and an output signal of the pixel circuit CC and PC of FIG. 2 in the fifth period.

Referring to FIGS. 1 to 12, in the driving timing, the first period DR1 may be an initialization period, the second period DR2 may be a pulse width modulation data writing and compensation period, the third period DR3 may be a constant-current voltage writing period, the fourth period DR4 may be the light emission period and the fifth period DR5 may be the light emission-off period.

A width of the fourth period DR4 which is the light emission period may be determined by a level of the pulse width modulation data VDATA.

The sweep signal SWEEP may have a constant high level in the first period DR1, the second period DR2 and the third period DR3 and may gradually decrease in the fourth period DR4 and the fifth period DR5.

Referring to FIGS. 3 and 4, in the first period DR1, the first initialization gate signal GI1 may sequentially have an active level and an inactive level, the second initialization gate signal GI2 may sequentially have an inactive level and an active level, the first writing gate signal GWC1[n] may have an inactive level, the second writing gate signal GW2 may have an inactive level, the emission signal EM may have an inactive level, the sweep signal SWEEP may have the high level, the first initialization voltage VINT may have a low level, the data current IDATA may have a low level and the anode initialization gate signal GB may have an active level.

Herein, when the transistor for receiving the first initialization gate signal GI1, the second initialization gate signal GI2, the first writing gate signal GWC1[n], the second writing gate signal GW2, the emission signal EM and the anode initialization gate signal GB is a P-type transistor, the active level may be a low level and the inactive level may be a high level. In contrast, when the transistor for receiving the first initialization gate signal GI1, the second initialization gate signal GI2, the first writing gate signal GWC1[n], the second writing gate signal GW2, the emission signal EM and the anode initialization gate signal GB is an N-type transistor, the active level may be a high level and the inactive level may be a low level.

The first period DR1 may be the initialization period. In the initialization period DR1, the sixth transistor T6, the tenth transistor T10, the twelfth transistor T12 and the thirteenth transistor T13 may be turned on.

In the initialization period DR1, the control electrode (the first node N1) of the first transistor T1 may be initialized by the first initialization voltage VINT through the sixth transistor T6. The first initialization voltage VINT may be a level to turn on the first transistor T1.

In the initialization period DR1, the control electrode (the seventh node N7) of the twelfth transistor T12 may be initialized by the first initialization voltage VINT through the tenth transistor T10. The first initialization voltage VINT may be a level to turn on the twelfth transistor T12.

In the initialization period DR1, the control electrode (the fourth node N4) of the seventh transistor T7 may be initialized by the second initialization voltage VAINT through the twelfth transistor T12. The second initialization voltage VAINT may be a level to turn off the seventh transistor T7.

In the initialization period DR1, the anode electrode of the light emitting element EE may be initialized by the second initialization voltage VAINT through the thirteenth transistor T13.

Referring to FIGS. 5 and 6, in the second period DR2 subsequent to the first period DR1, the first initialization gate signal GI1 may have the inactive level, the second initialization gate signal GI2 may have the inactive level, the first writing gate signal GWC1[n] may have an active pulse, the second writing gate signal GW2 may have an inactive level, the emission signal EM may have the inactive level, the sweep signal SWEEP may have the high level, the first initialization voltage VINT may have the low level, the data current IDATA may have the low level and the anode initialization gate signal GB may have an inactive level.

The second period DR2 may be the pulse width modulation data writing and compensation period. In the pulse width modulation data writing and compensation period DR2, the second transistor T2 may be turned on by the first writing gate signal GWC1[n], the first transistor T1 may be turned on by the first initialization voltage in the initialization period DR1 and the third transistor T3 may be turned on by the first writing gate signal GWC1[n].

In the pulse width modulation data writing and compensation period DR2, the data voltage VDATA may be applied to the control electrode (the first node N1) of the first transistor T1 along a path of the second transistor T2, the first transistor T1 and the third transistor T3. By the third transistor T3 which is diode-connected, a threshold voltage of the first transistor T1 may be compensated in the data voltage VDATA.

Referring to FIGS. 7 and 8, in the third period DR3 subsequent to the second period DR2, the first initialization gate signal GI1 may have the inactive level, the second initialization gate signal GI2 may have an active pulse, the first writing gate signal GWC1[n] may have the inactive level, the second writing gate signal GW2 may have an active pulse, the emission signal EM may have the inactive level, the sweep signal SWEEP may have the high level, the first initialization voltage VINT may have a high pulse, the data current IDATA may have a high level and the anode initialization gate signal GB may have the active level.

The third period DR3 may be the constant-current voltage writing period. In the constant-current voltage writing period DR3, the ninth transistor T9 may be turned on by the second writing gate signal GW2.

In the constant-current voltage writing period DR3, the data current IDATA may flow through the ninth transistor T9, the seventh transistor T7 and the thirteenth transistor T13. When the data current IDATA flows the seventh transistor T7, a gate-source voltage may be stored in the second capacitor C2. The data current IDATA may be a target current corresponding to a target luminance of the light emitting element EE. When the target current flows through the seventh transistor T7, a threshold voltage of the seventh transistor T7 may be compensated.

Referring to FIGS. 9 and 12, in the fourth period DR4 and the fifth period DR5 which are subsequent to the third period DR3, the first initialization gate signal GI1 may have the inactive level, the second initialization gate signal GI2 may have the inactive level, the first writing gate signal GWC1[n] may have the inactive level, the second writing gate signal GW2 may have the inactive level, the emission signal EM may have an active level, the sweep signal SWEEP may gradually decrease from the high level, the first initialization voltage VINT may have the low level, the data current IDATA may have the low level and the anode initialization gate signal GB may have the inactive level.

The fourth period DR4 may be the light emission period. In the light emission period DR4, the fourth transistor T4, the fifth transistor T5 and the eleventh transistor T11 may be turned on by the emission signal EM and the seventh transistor T7 may be turned on by the gate-source voltage set in the third period DR3.

In the light emission period DR4, a current IEE may flow along a path of the eleventh transistor T11, the seventh transistor T7 and the light emitting element EE so that the light emitting element EE may emit a light.

The fifth period DR5 subsequent to the fourth period DR4 may be the light emission-off period. As the sweep signal SWEEP decreases, the first transistor T1 may be turned on at a certain time point. The certain time point when the first transistor T1 is turned on may be determined by the data voltage VDATA applied to the control electrode of the first transistor T1.

When the first transistor T1 is turned on, the first power voltage VDD1 is applied to the control electrode of the twelfth transistor T12 along a path of the fourth transistor T4, the first transistor T1 and the fifth transistor T5.

When the first power voltage VDD1 is applied to the control electrode of the twelfth transistor T12, the twelfth transistor T12 may be turned on so that the second initialization voltage VAINT may be applied to the control electrode of the seventh transistor T7. When the second initialization voltage VAINT is applied to the control electrode of the seventh transistor T7, the seventh transistor T7 may be turned off and the light emitting element EE may stop emitting a light.

According to the present embodiment, the pixel circuit may be driven in the pulse width modulation method. The threshold voltage of the driving transistor T7 in the constant current generating circuit CC may be internally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 13:
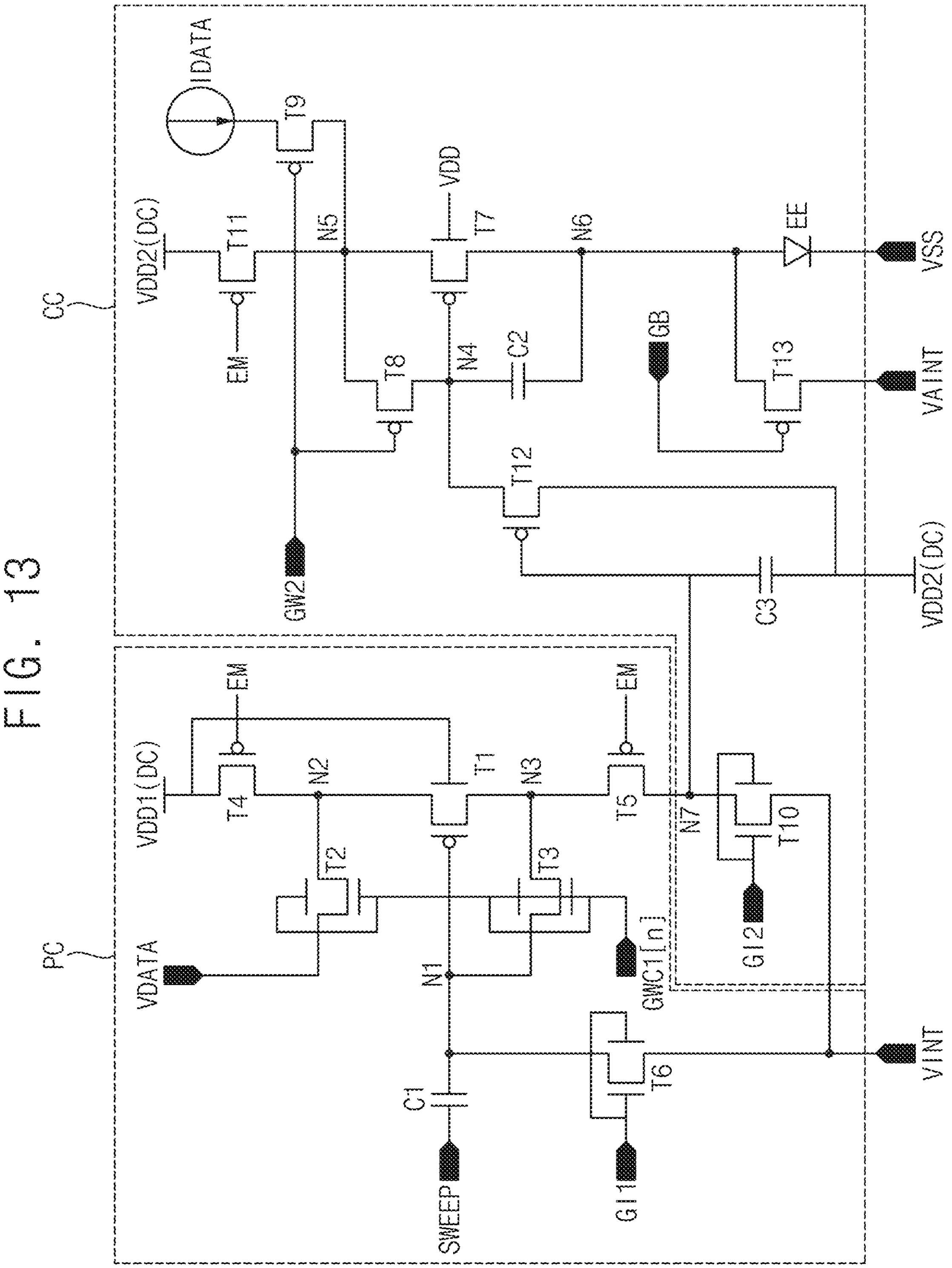
FIG. 13 is a circuit diagram illustrating a pixel circuit of a display panel of a display apparatus according to an embodiment of the present invention.

FIG. 13 is a circuit diagram illustrating a pixel circuit of a display panel 100 of a display apparatus according to an embodiment of the present invention.

The pixel circuit according to the present embodiment is substantially the same as the pixel circuit of the previous embodiment explained referring to FIG. 2 except that the seventh transistor is a P-type transistor and the second power voltage is applied to the first electrode of the twelfth transistor. Thus, the same reference numerals will be used to refer to the same or like parts as those described in the previous embodiment and any repetitive explanation concerning the above elements will be omitted.

In the present embodiment, the seventh transistor T7 may be a P-type transistor. The first electrode of the twelfth transistor T12 may receive the second power voltage VDD2.

Figure 14:
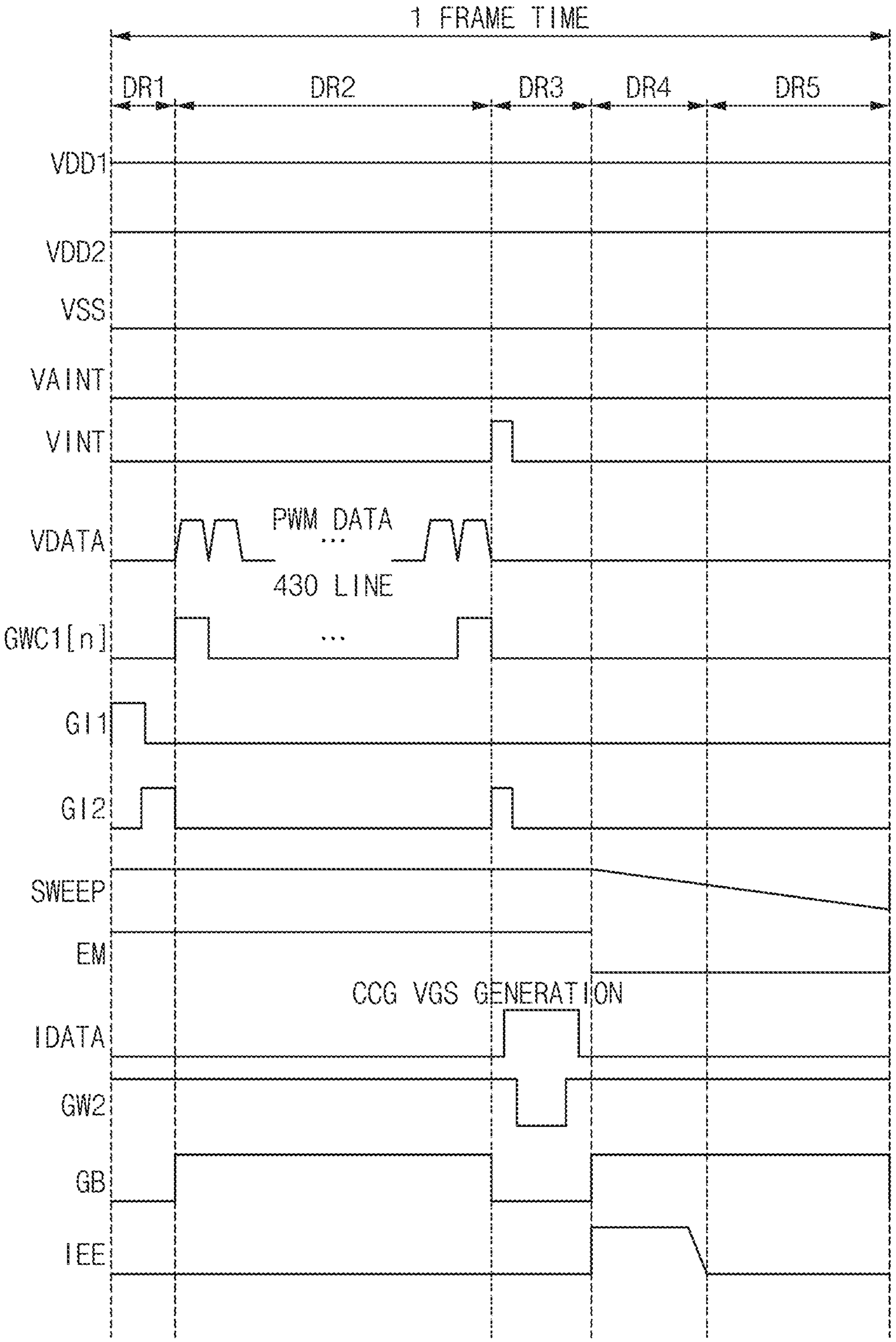
FIG. 14 is a timing diagram illustrating an example of input signals applied to the pixel circuit of FIG. 2 and an output signal of the pixel circuit of FIG. 2 in a writing frame.
Figure 15:
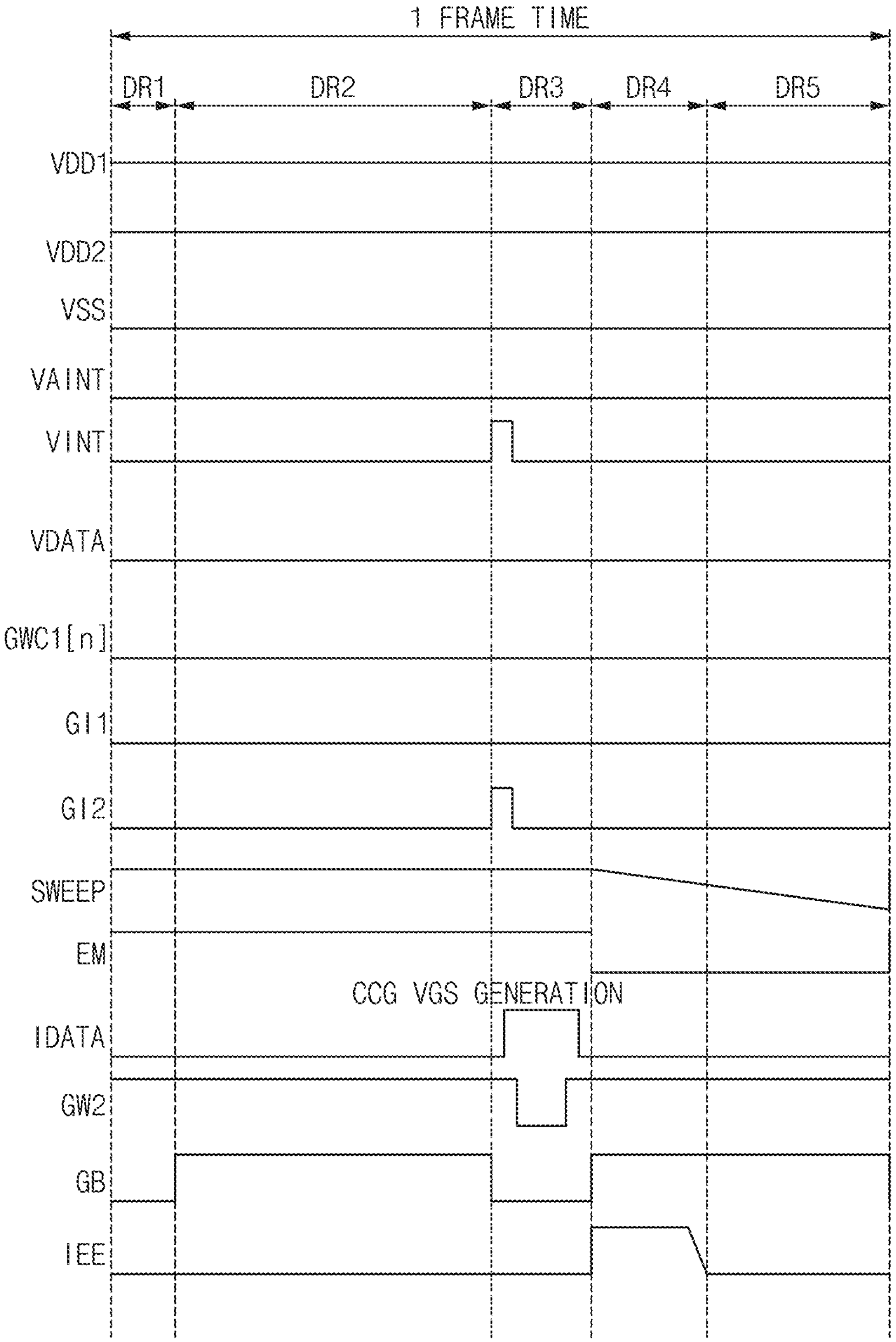
FIG. 15 is a timing diagram illustrating an example of input signals applied to the pixel circuit of FIG. 2 and an output signal of the pixel circuit of FIG. 2 in a holding frame.

FIG. 14 is a timing diagram illustrating an example of input signals applied to the pixel circuit CC and PC of FIG. 2 and an output signal of the pixel circuit CC and PC of FIG. 2 in a writing frame. FIG. 15 is a timing diagram illustrating an example of input signals applied to the pixel circuit CC and PC of FIG. 2 and an output signal of the pixel circuit CC and PC of FIG. 2 in a holding frame.

The driving timing of the pixel circuit according to the present embodiment is substantially the same as the driving timing of the previous embodiment explained referring to FIGS. 4, 6, 8, 10 and 12 except that the display panel is driven in a variable frequency. Thus, the same reference numerals will be used to refer to the same or like parts as those described in the previous embodiment and any repetitive explanation concerning the above elements will be omitted.

Referring to FIGS. 1, 2, 14 and 15, the display panel 100 may be driven in a variable frequency.

The driving timing of the display apparatus supporting a variable frequency driving method may include a writing frame when the data voltage is written to the pixel and a holding frame when the light emitting element emits a light without writing the data voltage to the pixel.

In the writing frame, the data voltage VDATA may be applied to the first transistor T1 and the light emitting element EE may emit a light. In a first period DR1 of the writing frame, the first initialization gate signal GI1 may sequentially have an active level and an inactive level, and the second initialization gate signal GI2 may sequentially have an inactive level and an active level. In a second period DR2 of the writing frame, the first writing gate signal GWC1[n] may have an active pulse.

In the holding frame, the data voltage VDATA may not be applied to the first transistor T1 and the light emitting element EE may emit a light. In a first period DR1 of the holding frame, the first initialization gate signal GI1 and the second initialization gate signal GI2 may have an inactive level. In a second period DR2 of the holding frame, the first writing gate signal GWC1[n] may have an inactive level.

According to the present embodiment, the pixel circuit may be driven in the pulse width modulation method. The threshold voltage of the driving transistor T7 in the constant current generating circuit CC may be internally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

In addition, in the present embodiment, the pixel circuit may support the variable frequency driving method so that the power consumption of the display apparatus may be reduced.

Figure 16:
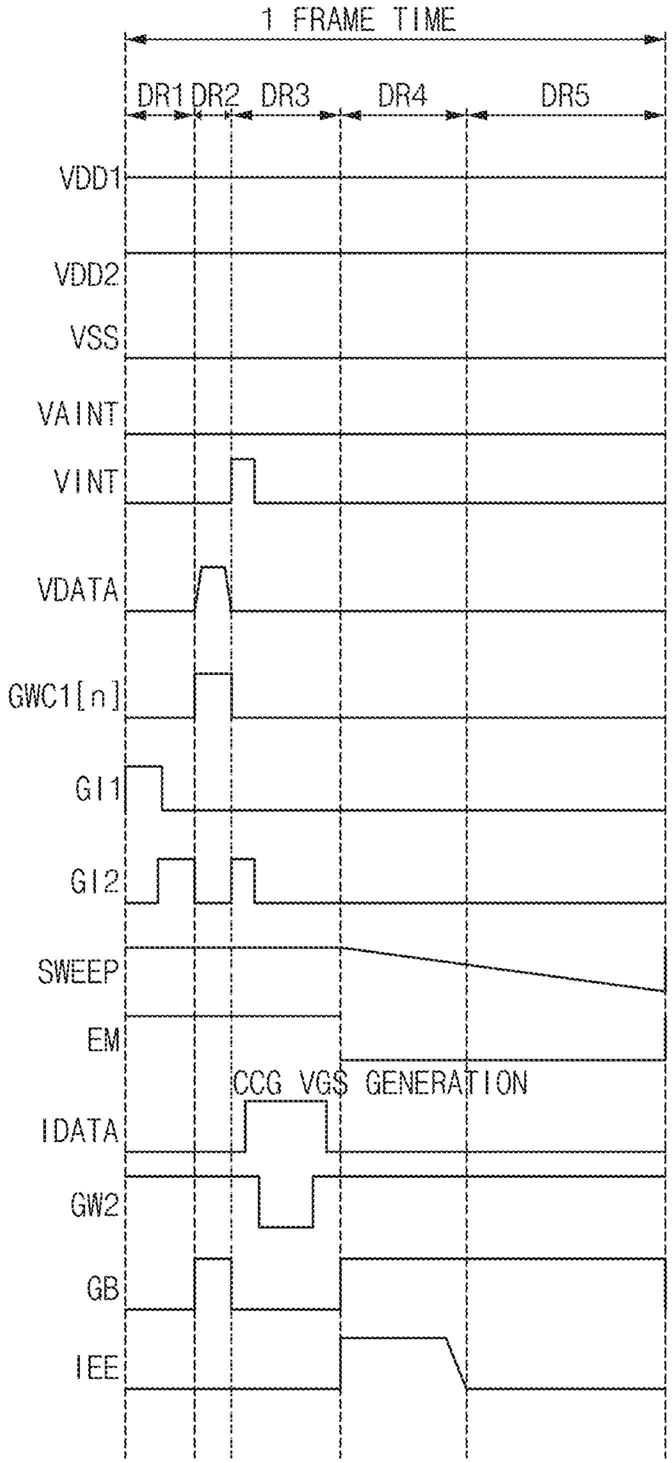
FIG. 16 is a timing diagram illustrating an example of input signals applied to the pixel circuit of FIG. 2 and an output signal of the pixel circuit of FIG. 2.

FIG. 16 is a timing diagram illustrating an example of input signals applied to the pixel circuit CC and PC of FIG. 2 and an output signal of the pixel circuit CC and PC of FIG. 2.

The driving timing of the pixel circuit according to the present embodiment is substantially the same as the driving timing of the previous embodiment explained referring to FIGS. 4, 6, 8, 10 and 12 except that the display panel is driven in a progressive light emission driving method. Thus, the same reference numerals will be used to refer to the same or like parts as those described in the previous embodiment and any repetitive explanation concerning the above elements will be omitted.

Referring to FIGS. 1, 2 and 16, the display panel 100 may be driven in a progressive light emission driving method.

In a driving timing, a first period DR1 may be an initialization period, a second period DR2 may be a pulse width modulation data writing and compensation period, a third period DR3 may be a constant-current voltage writing period, a fourth period DR4 may be a light emission period and a fifth period DR5 may be a light emission-off period.

In the present embodiment, the first writing gate signal GWC1[n], the first initialization gate signal GI1, the second initialization gate signal GI2, the second writing gate signal GW2, the anode initialization gate signal GB and the emission signal EM may be progressive scan signals having different timings for pixel rows.

The first writing gate signal GWC1[n], the first initialization gate signal GI1, the second initialization gate signal GI2, the second writing gate signal GW2, the anode initialization gate signal GB and the emission signal EM may be progressively applied to the pixel rows.

In addition, the data voltage VDATA and the first initialization voltage VINT may be progressively applied to the pixel rows.

According to the present embodiment, the pixel circuit may be driven in the pulse width modulation method. The threshold voltage of the driving transistor T7 in the constant current generating circuit CC may be internally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

In addition, in the present embodiment, the pixel circuit may be driven in the progressive light emission driving method.

Figure 17:
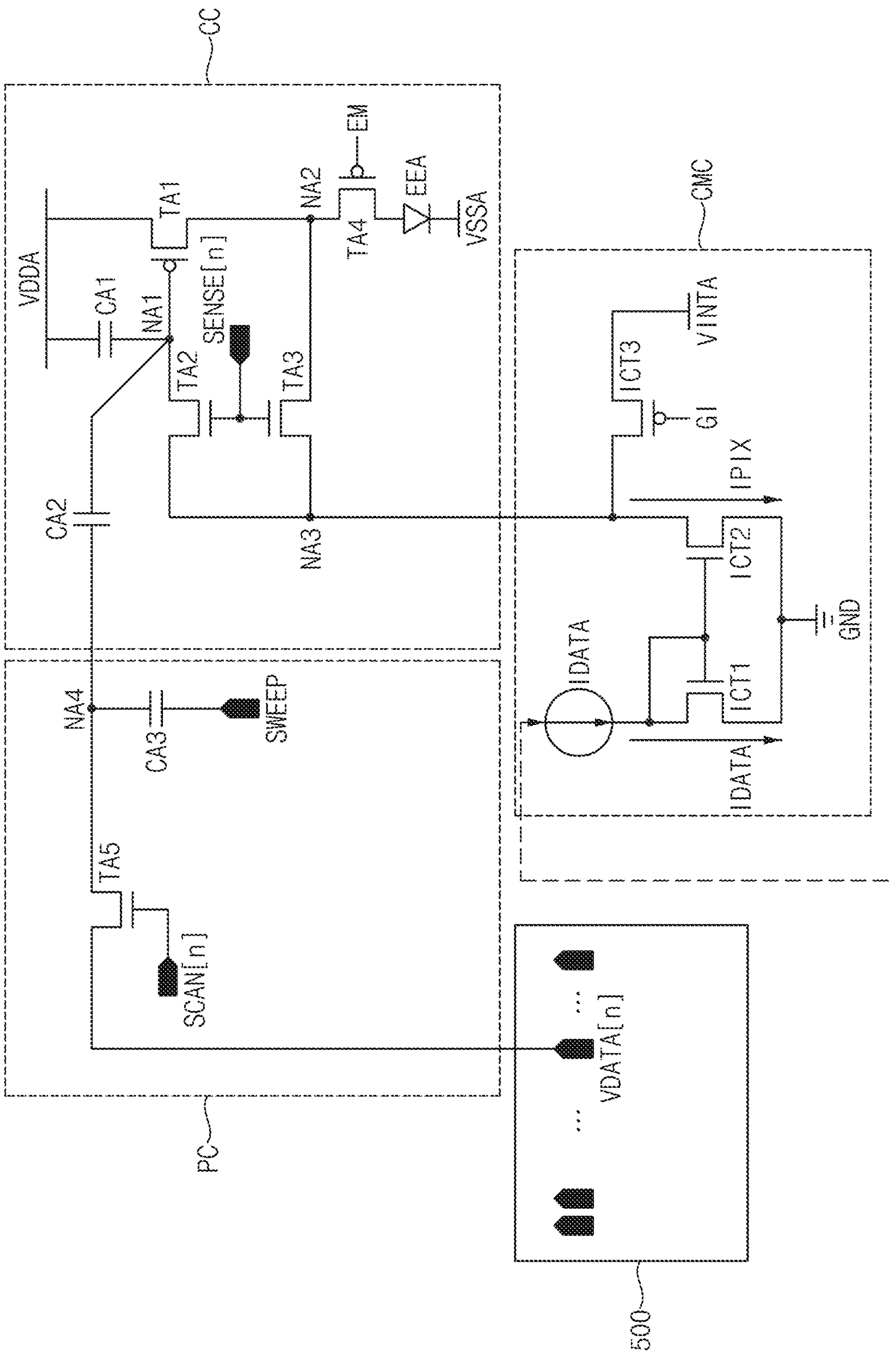
FIG. 17 is a circuit diagram illustrating a pixel circuit of a display panel of a display apparatus according to an embodiment of the present invention, a data driver and a constant current applying circuit of a display panel driver of the display apparatus.

FIG. 17 is a circuit diagram illustrating a pixel circuit CC and PC of a display panel 100 of a display apparatus according to an embodiment of the present invention, a data driver 500 and a constant current applying circuit CMC of a display panel driver of the display apparatus.

Referring to FIGS. 1 and 17, the pixel circuit may include a first circuit CC and a second circuit PC.

The first circuit CC may be a constant current generating circuit for a constant current generation (CCG). The second circuit PC may be a pulse width modulation circuit for a pulse width modulation (PWM).

The first circuit CC includes a first transistor TA1 including a control electrode connected to a first node NA1, a first electrode for receiving a first power voltage VDDA and a second electrode connected to a second node NA2, a second transistor TA2 including a control electrode for receiving a sensing control signal SENSE[n], a first electrode connected to a third node NA3 and a second electrode connected to the first node NA1, a third transistor TA3 including a control electrode for receiving the sensing control signal SENSE[n], a first electrode connected to the third node NA3 and a second electrode connected to the second node NA2, a fourth transistor TA4 including a control electrode for receiving an emission signal EM, a first electrode connected to the second node NA2 and a second electrode connected to a first electrode of a light emitting element EEA, a first capacitor CA1 including a first electrode for receiving the first power voltage VDDA and a second electrode connected to the first node NA1 and the light emitting element EEA including a first electrode connected to the second electrode of the fourth transistor TA4 and a second electrode for receiving a second power voltage VSSA.

The first circuit CC may further include a second capacitor CA2 including a first electrode connected to a fourth node NA4 and a second electrode connected to the first node NA1.

The second circuit PC may further include a fifth transistor TA5 including a control electrode for receiving a scan signal SCAN[n], a first electrode for receiving a data voltage VDATA and a second electrode connected to the fourth node NA4 and a third capacitor CA3 including a first electrode for receiving a sweep signal SWEEP and a second electrode connected to the fourth node NA4.

As explained above, the pixel circuit may include five transistors and three capacitors.

In the present embodiment, some of the transistors in the pixel circuit may be P-type transistors and some of the transistors in the pixel circuit may be N-type transistors.

For example, the first transistor TA1 and the fourth transistor TA4 may be P-type transistors. The second transistor TA2, the third transistor TA3 and the fifth transistor TA5 may be N-type transistors.

The display apparatus may further include a constant current applying circuit CMC (in other words, "third circuit"). The third circuit CMC may apply a data current IDATA to the first circuit CC.

For example, the third circuit CMC may be integrated on the peripheral region of the display panel 100. Alternatively, the third circuit CMC may be formed out of the display panel 100.

The third circuit CMC may include a first current applying transistor ICT1 including a first electrode for receiving the data current IDATA and a second electrode connected to a ground GND, a second current applying transistor ICT2 including a first electrode connected to the third node NA3 and a second electrode connected to the ground GND and a third current applying transistor ICT3 including a control electrode for receiving an initialization gate signal GI, a first electrode for receiving a first initialization voltage VINTA and a second electrode connected to the third node NA3.

In the present embodiment, a control electrode of the first current applying transistor ICT1 and the first electrode of the first current applying transistor ICT1 and a control electrode of the second current applying transistor ICT2 may be connected to one another.

In the present embodiment, the first current applying transistor ICT1 and the second current applying transistor ICT1 may be N-type transistors. The third current applying transistor ICT3 may be a P-type transistor.

When the data current IDATA flows through the first current applying transistor ICT1, a pixel current IPIX may flow through the second applying transistor ICT2. For example, the data current IDATA may be substantially the same as the pixel current IPIX. For example, the data current IDATA may be the same as the pixel current IPIX. Alternatively, the data current IDATA may be proportional to the pixel current IPIX but may be different from the pixel current IPIX.

A ratio of the data current IDATA and the pixel current IPIX may be determined by a W/L ratio of the first current applying transistor ICT1 and a W/L ratio of the second current applying transistor ICT2.

The light emitting element EEA may emit a light based on the data voltage VDATA and the data current IDATA.

Figure 18:
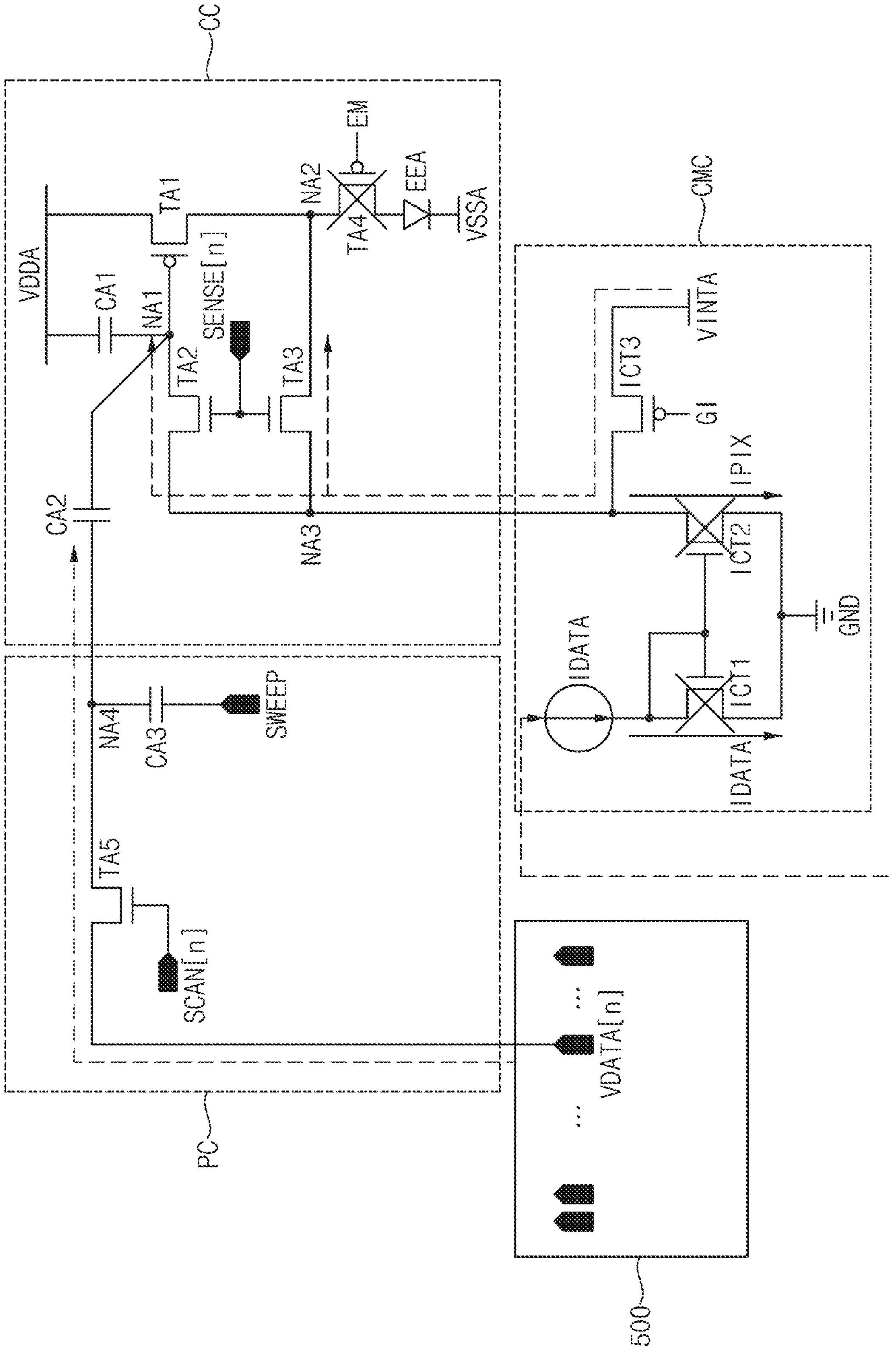
FIG. 18 is a circuit diagram illustrating an operation of the pixel circuit of FIG. 17 and an operation of the constant current applying circuit of FIG. 17 in a first period of a driving timing.
Figure 19:
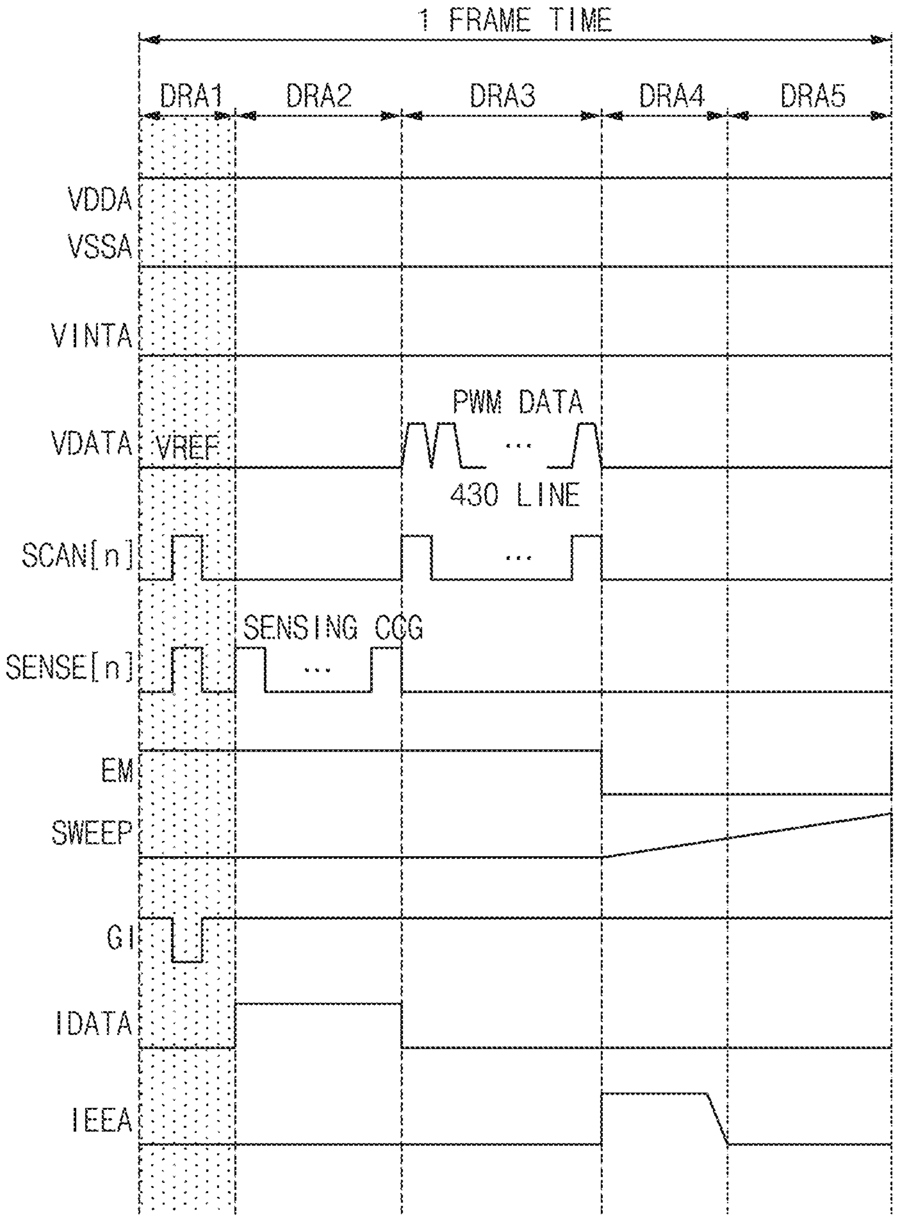
FIG. 19 is a timing diagram illustrating an example of input signals and an output signal of the pixel circuit of FIG. 17 and the constant current applying circuit of FIG. 17 in the first period.
Figure 20:
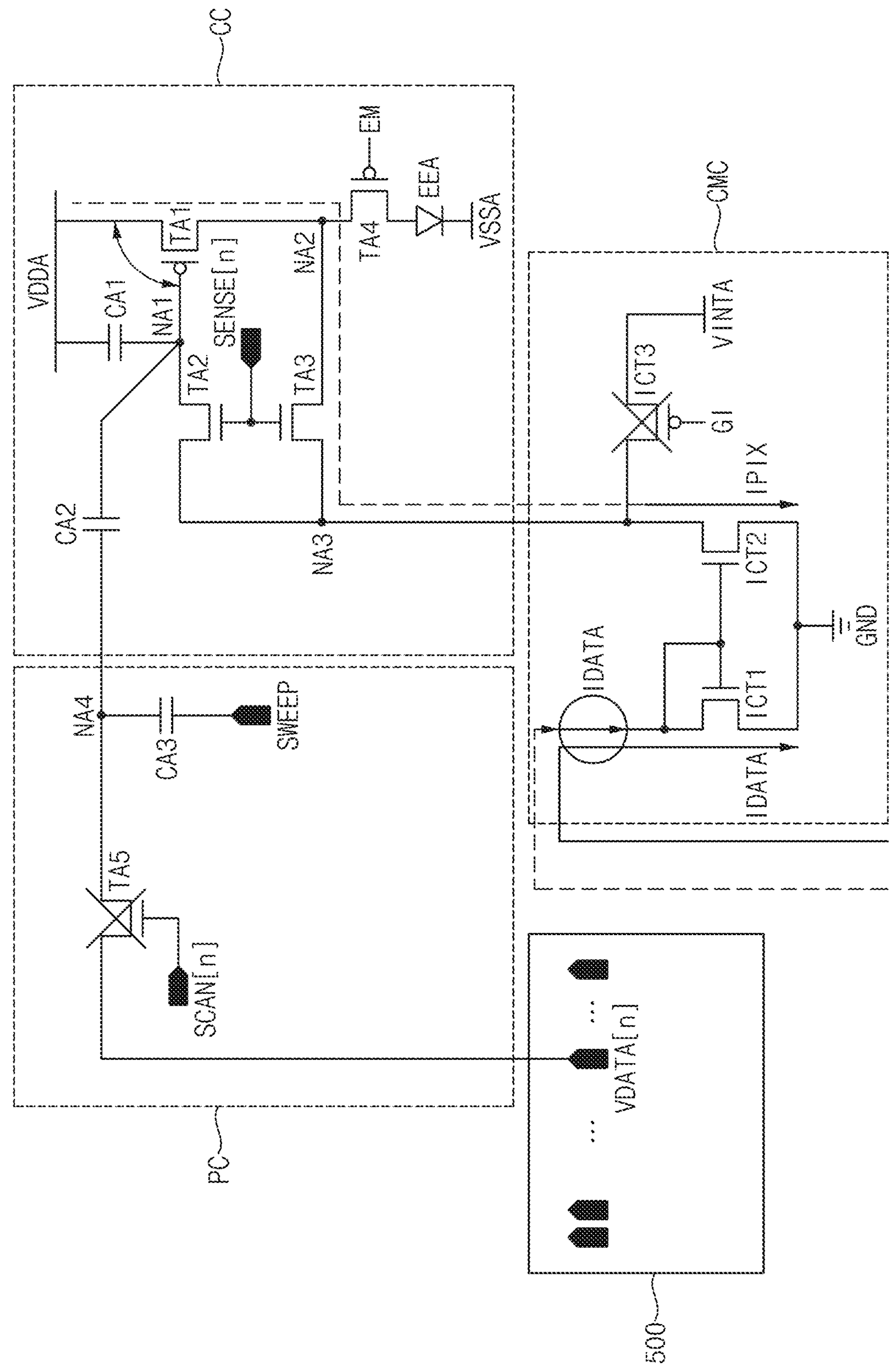
FIG. 20 is a circuit diagram illustrating an operation of the pixel circuit of FIG. 17 and an operation of the constant current applying circuit of FIG. 17 in a second period of the driving timing.
Figure 21:
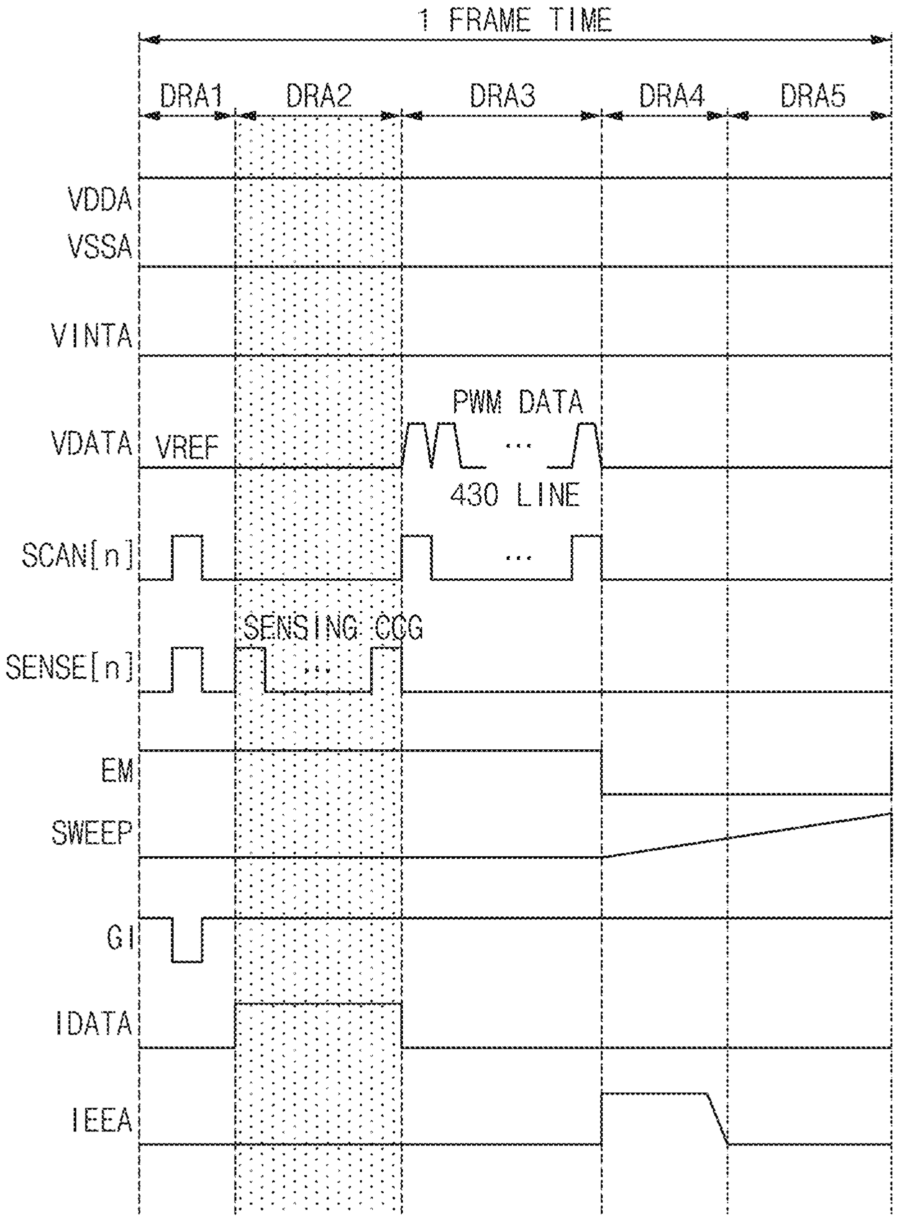
FIG. 21 is a timing diagram illustrating an example of input signals and an output signal of the pixel circuit of FIG. 17 and the constant current applying circuit of FIG. 17 in the second period.
Figure 22:
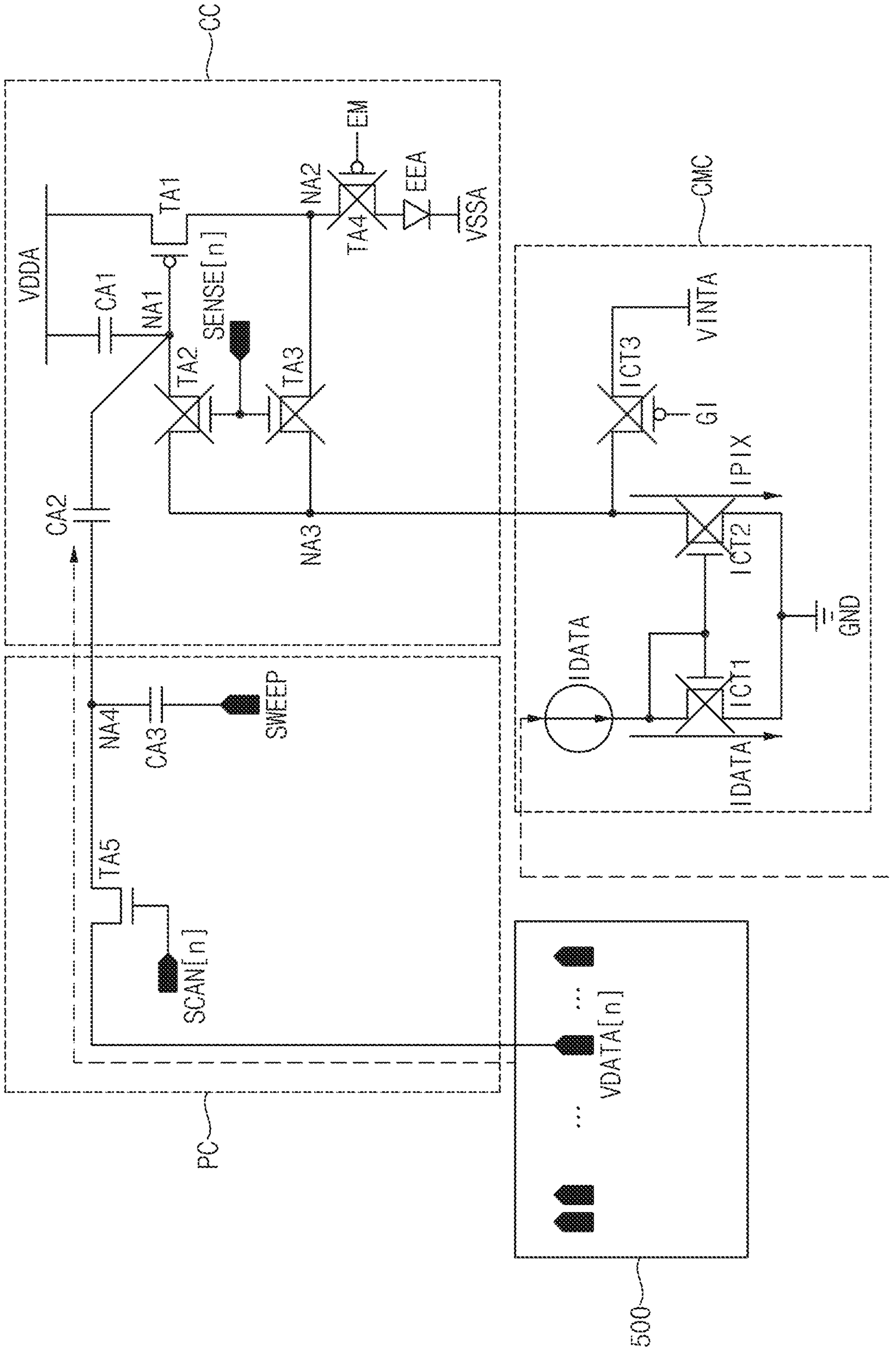
FIG. 22 is a circuit diagram illustrating an operation of the pixel circuit of FIG. 17 and an operation of the constant current applying circuit of FIG. 17 in a third period of the driving timing.
Figure 23:
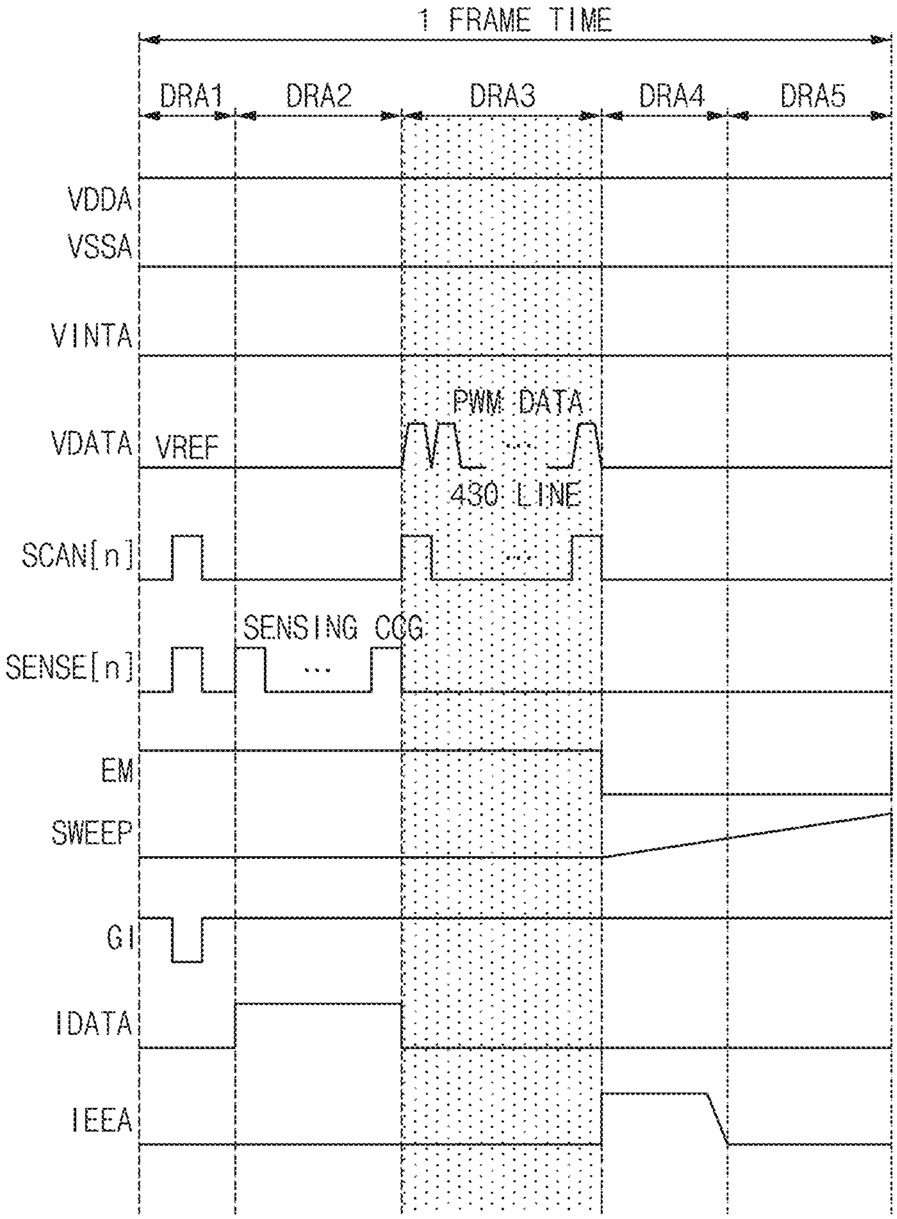
FIG. 23 is a timing diagram illustrating an example of input signals and an output signal of the pixel circuit of FIG. 17 and the constant current applying circuit of FIG. 17 in the third period.
Figure 24:
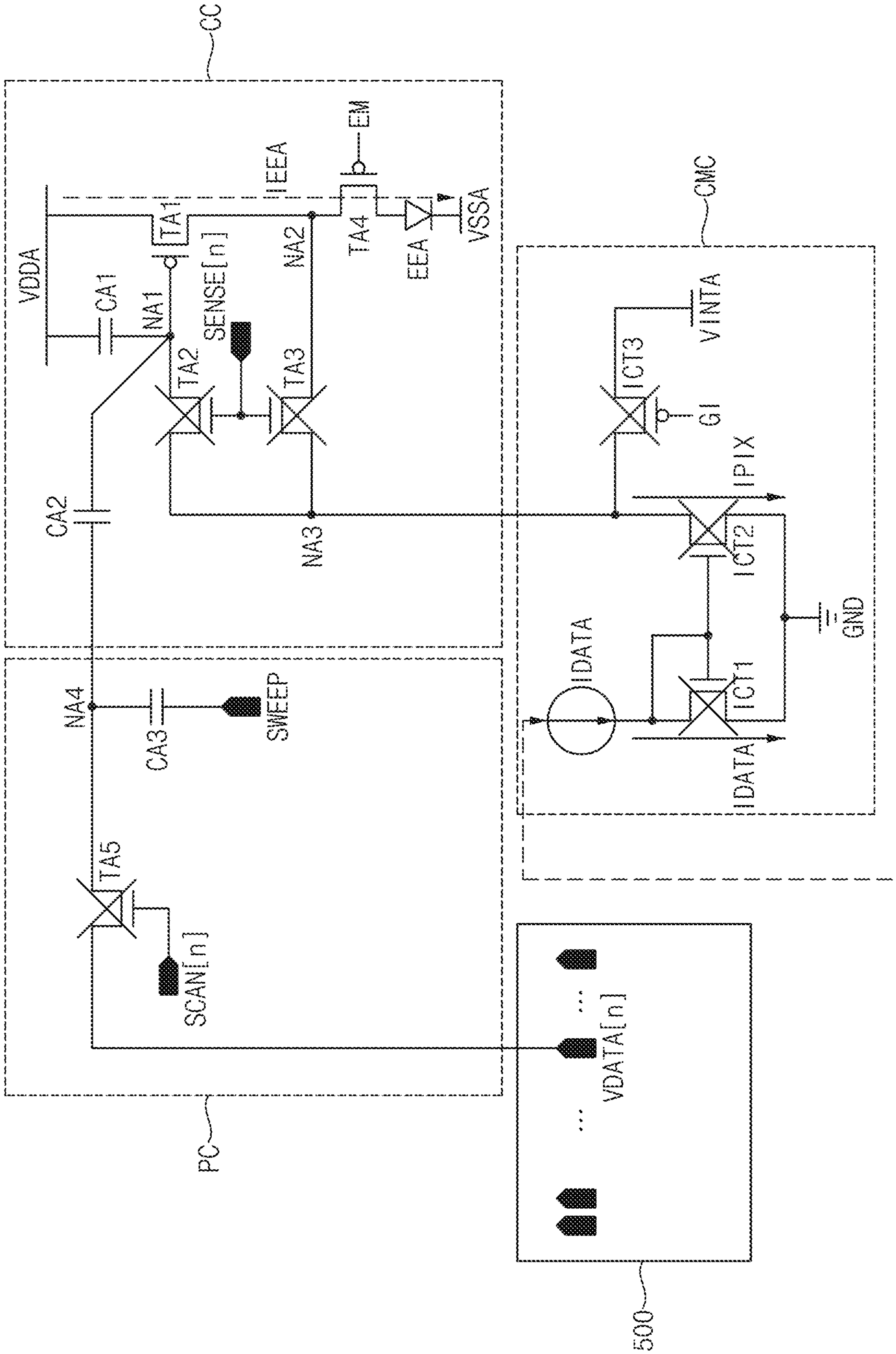
FIG. 24 is a circuit diagram illustrating an operation of the pixel circuit of FIG. 17 and an operation of the constant current applying circuit of FIG. 17 in a fourth period of the driving timing.
Figure 25:
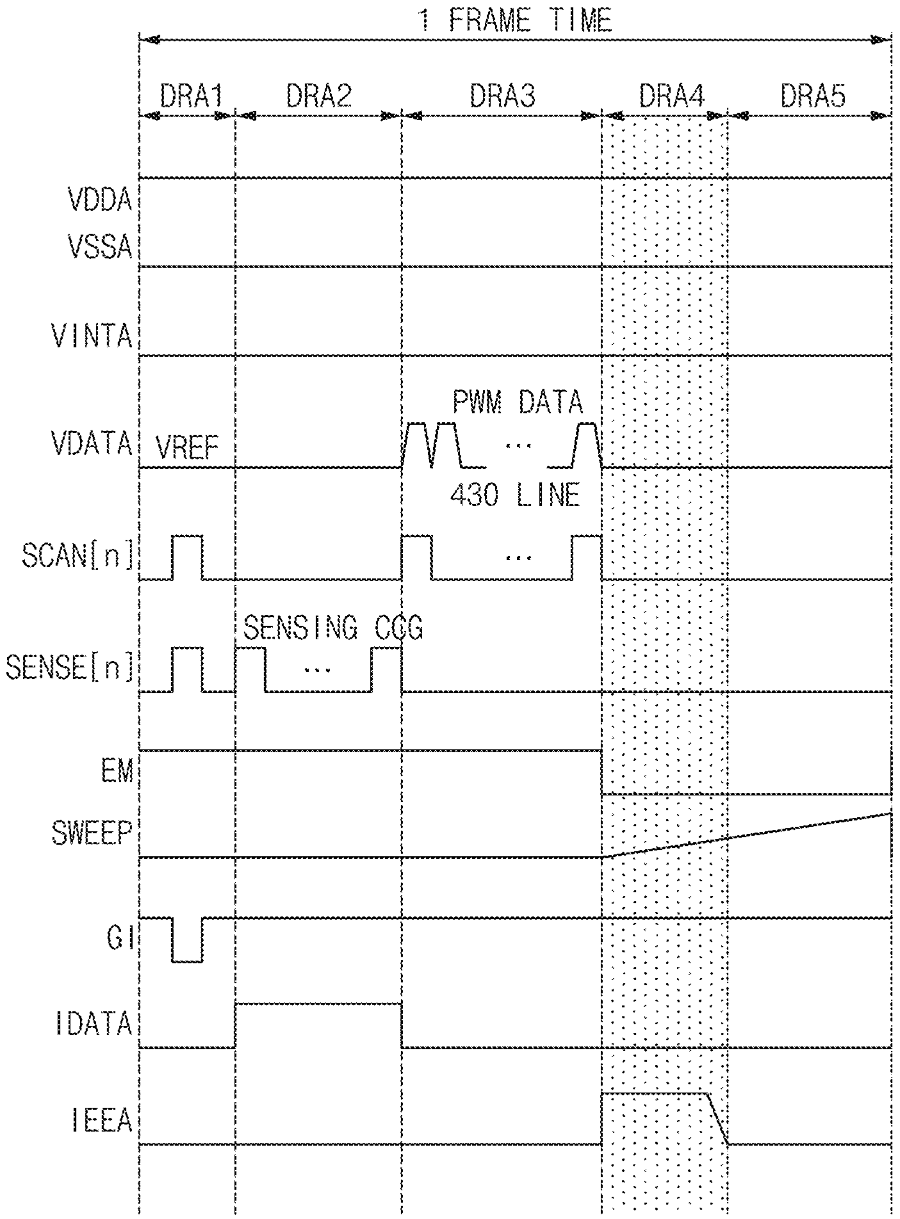
FIG. 25 is a timing diagram illustrating an example of input signals and an output signal of the pixel circuit of FIG. 17 and the constant current applying circuit of FIG. 17 in the fourth period.
Figure 26:
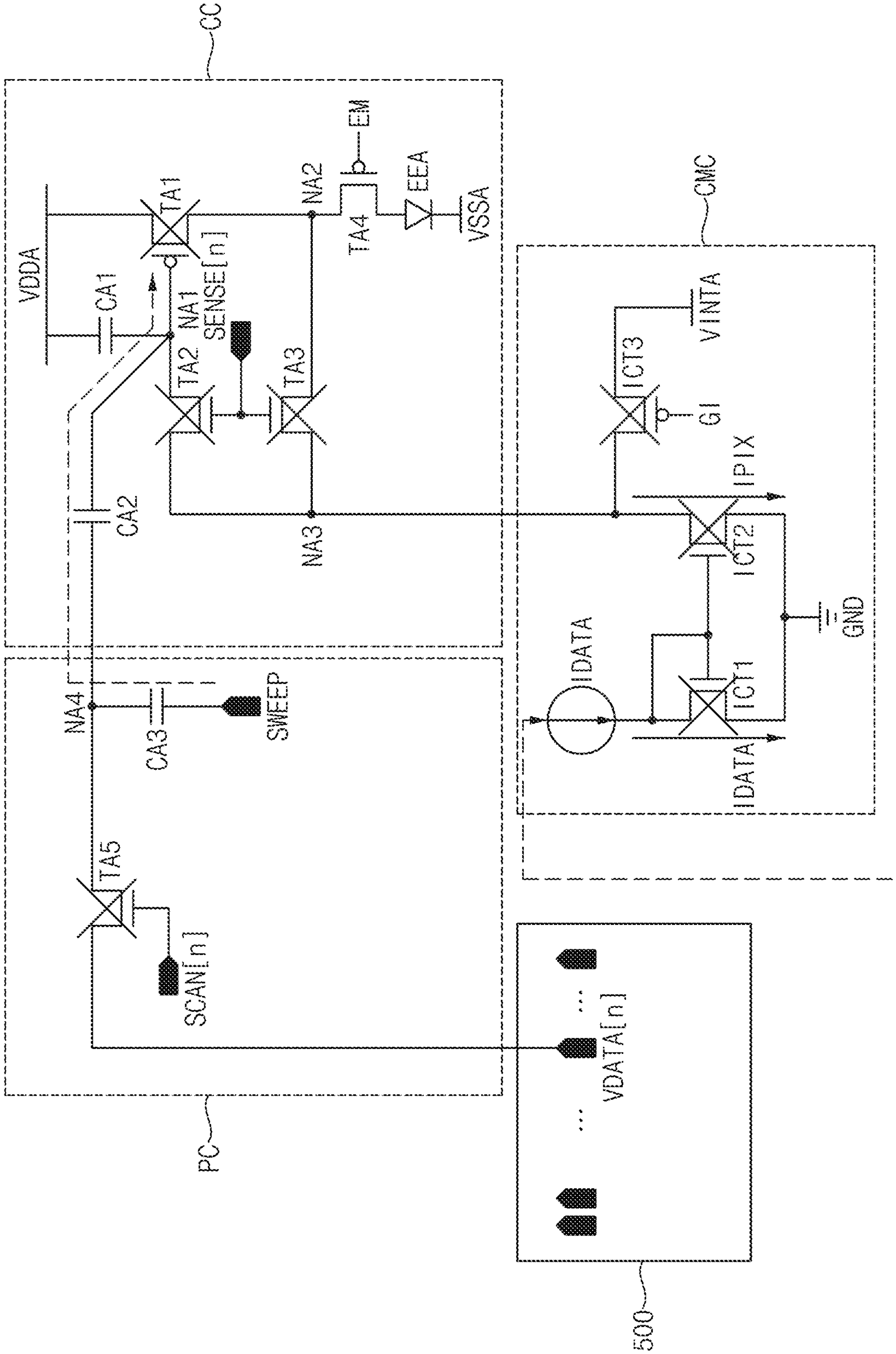
FIG. 26 is a circuit diagram illustrating an operation of the pixel circuit of FIG. 17 and an operation of the constant current applying circuit of FIG. 17 in a fifth period of the driving timing.
Figure 27:
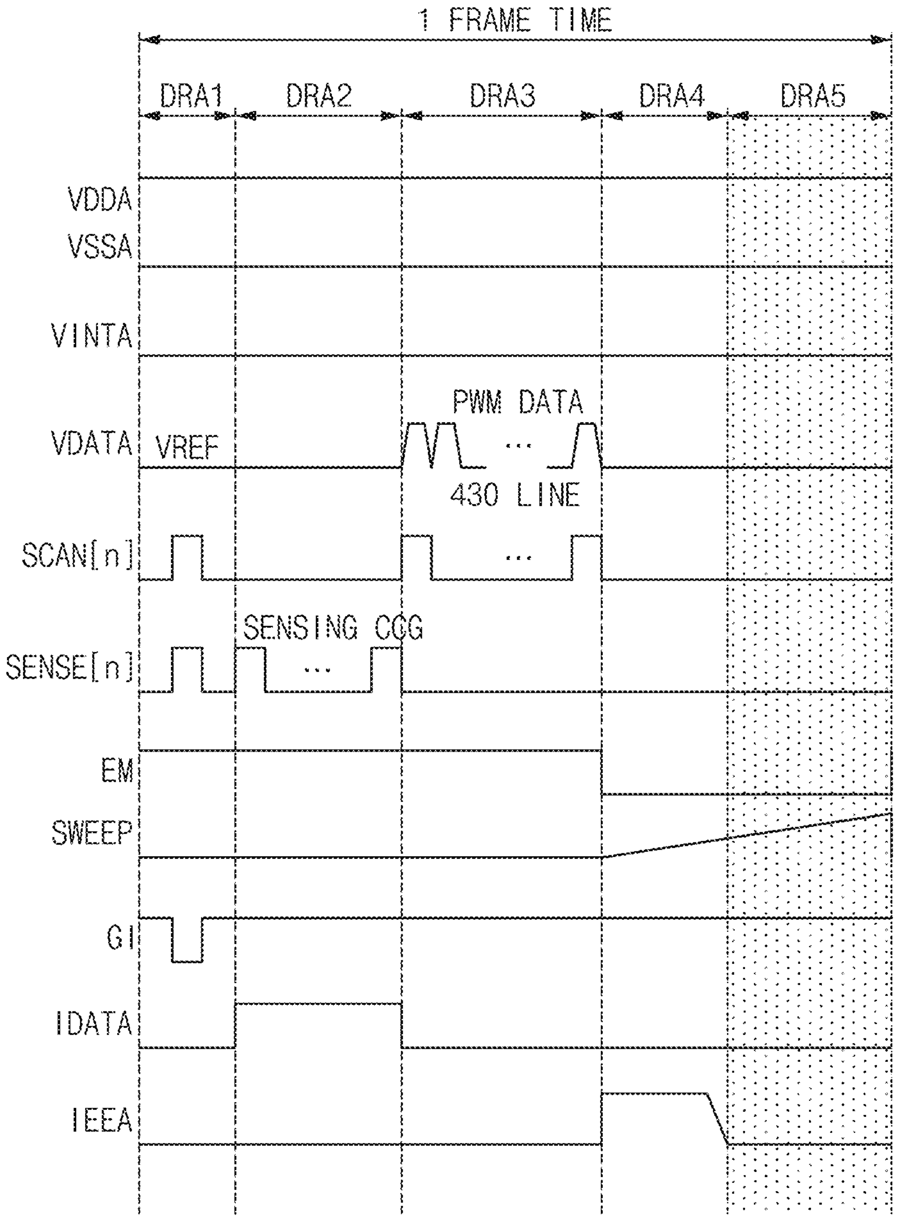
FIG. 27 is a timing diagram illustrating an example of input signals and an output signal of the pixel circuit of FIG. 17 and the constant current applying circuit of FIG. 17 in the fifth period.

FIG. 18 is a circuit diagram illustrating an operation of the pixel circuit CC and PC of FIG. 17 and an operation of the constant current applying circuit CMC of FIG. 17 in a first period DRA1 of a driving timing. FIG. 19 is a timing diagram illustrating an example of input signals and an output signal of the pixel circuit CC and PC of FIG. 17 and the constant current applying circuit CMC of FIG. 17 in the first period DRA1. FIG. 20 is a circuit diagram illustrating an operation of the pixel circuit CC and PC of FIG. 17 and an operation of the constant current applying circuit CMC of FIG. 17 in a second period DRA2 of the driving timing. FIG. 21 is a timing diagram illustrating an example of input signals and an output signal of the pixel circuit CC and PC of FIG. 17 and the constant current applying circuit CMC of FIG. 17 in the second period DRA2. FIG. 22 is a circuit diagram illustrating an operation of the pixel circuit CC and PC of FIG. 17 and an operation of the constant current applying circuit CMC of FIG. 17 in a third period DRA3 of the driving timing. FIG. 23 is a timing diagram illustrating an example of input signals and an output signal of the pixel circuit CC and PC of FIG. 17 and the constant current applying circuit CMC of FIG. 17 in the third period DRA3. FIG. 24 is a circuit diagram illustrating an operation of the pixel circuit CC and PC of FIG. 17 and an operation of the constant current applying circuit CMC of FIG. 17 in a fourth period DRA4 of the driving timing. FIG. 25 is a timing diagram illustrating an example of input signals and an output signal of the pixel circuit CC and PC of FIG. 17 and the constant current applying circuit CMC of FIG. 17 in the fourth period DRA4. FIG. 26 is a circuit diagram illustrating an operation of the pixel circuit CC and PC of FIG. 17 and an operation of the constant current applying circuit CMC of FIG. 17 in a fifth period DRA5 of the driving timing. FIG. 27 is a timing diagram illustrating an example of input signals and an output signal of the pixel circuit CC and PC of FIG. 17 and the constant current applying circuit CMC of FIG. 17 in the fifth period DRA5.

Referring to FIGS. 1 and 17 to 27, in the driving timing, the first period DRA1 may be an initialization period, the second period DRA2 may be a constant-current sensing period, the third period DRA3 may be a pulse width modulation data writing period, the fourth period DRA4 may be the light emission period and the fifth period DRA5 may be the light emission-off period.

A width of the fourth period DRA4 which is the light emission period may be determined by a level of the pulse width modulation data VDATA.

The sweep signal SWEEP may have a constant low level in the first period DRA1, the second period DRA2 and the third period DRA3 and may gradually increase in the fourth period DRA4 and the fifth period DRA5.

Referring to FIGS. 18 and 19, in the first period DRA1, the scan signal SCAN[n] may have an active pulse, the sensing control signal SENSE[n] may have an active pulse, the emission signal EM may have an inactive level, the sweep signal SWEEP may have the low level and the data voltage VDATA may have a reference level VREF. In the first period DRA1, the initialization gate signal GI may have an active pulse.

In the first period DRA1, the reference level VREF may be applied to the fourth node NA4 through the fifth transistor TA5. In the first period DRA1, the first initialization voltage VINTA may be applied to the first node NA1 through the third current applying transistor ICT3 and the second transistor TA2. In the first period DRA1, the first initialization voltage VINTA may be applied to the second node NA2 through the third current applying transistor ICT3 and the third transistor TA3.

Referring to FIGS. 20 and 21, in the second period DRA2 subsequent to the first period DRA1, the scan signal SCAN [n] may have an inactive level, the sensing control signal SENSE[n] may have an active pulse, the emission signal EM may have the inactive level and the sweep signal SWEEP may have the low level. In the second period DRA2, the data current IDATA may have an active level.

In the second period DRA2, the first current applying transistor ICT1 and the second current applying transistor ICT2 may be turned on so that the pixel current IPIX corresponding to the data current IDATA flows the first transistor TA1 through the third transistor TA3.

When the pixel current IPIX flows the first transistor TA1, a gate-source voltage may be stored in the first capacitor CA1. The pixel current IPIX may be a target current corresponding to a target luminance of the light emitting element EEA. When the target current flows the first transistor TA1, a threshold voltage of the first transistor TA1 may be compensated.

Referring to FIGS. 22 and 23, in the third period DRA3 subsequent to the second period DRA2, the scan signal SCAN[n] may have an active pulse, the sensing control signal SENSE[n] may have an inactive level, the emission signal EM may have the inactive level, the sweep signal SWEEP may have the low level and the data voltage VDATA may have a pulse width modulation data PWM DATA. In the third period DRA3, the initialization gate signal GI may have the inactive level. In the third period DRA3, the data current IDATA may have an inactive level.

In the third period DRA3, the fifth transistor TA5 is turned on so that the data voltage VDATA corresponding to the pulse width modulation data PWM DATA may be applied to the fourth node NA4.

Referring to FIGS. 24 to 27, in the fourth period DRA4 and the fifth period DRA5 which are subsequent to the third period DRA3, the scan signal SCAN[n] may have the inactive level, the sensing control signal SENSE[n] may have the inactive level, the emission signal EM may have an active level and the sweep signal SWEEP may gradually increase from the low level.

The fourth period DRA4 may be the light emission period. In the light emission period DRA4, the fourth transistor TA4 may be turned on by the emission signal EM and the first transistor TA1 may be turned on by the gate-source voltage set after the second period DRA2.

In the light emission period DRA4, a current IEEA may flow along a path of the first transistor TA1, the fourth transistor TA4 and the light emitting element EEA so that the light emitting element EEA may emit a light.

The fifth period DRA5 subsequent to the fourth period DRA4 may be the light emission-off period. As the sweep signal SWEEP increases, the first transistor TA1 may be turned off at a certain time point. The certain time point when the first transistor TA1 is turned off may be determined by the data voltage VDATA applied to the fourth node NA4.

When the first transistor TA1 is turned off, the light emitting element EEA may stop emitting a light.

According to the present embodiment, the pixel circuit may be driven in the pulse width modulation method. The threshold voltage of the driving transistor TA1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 28:
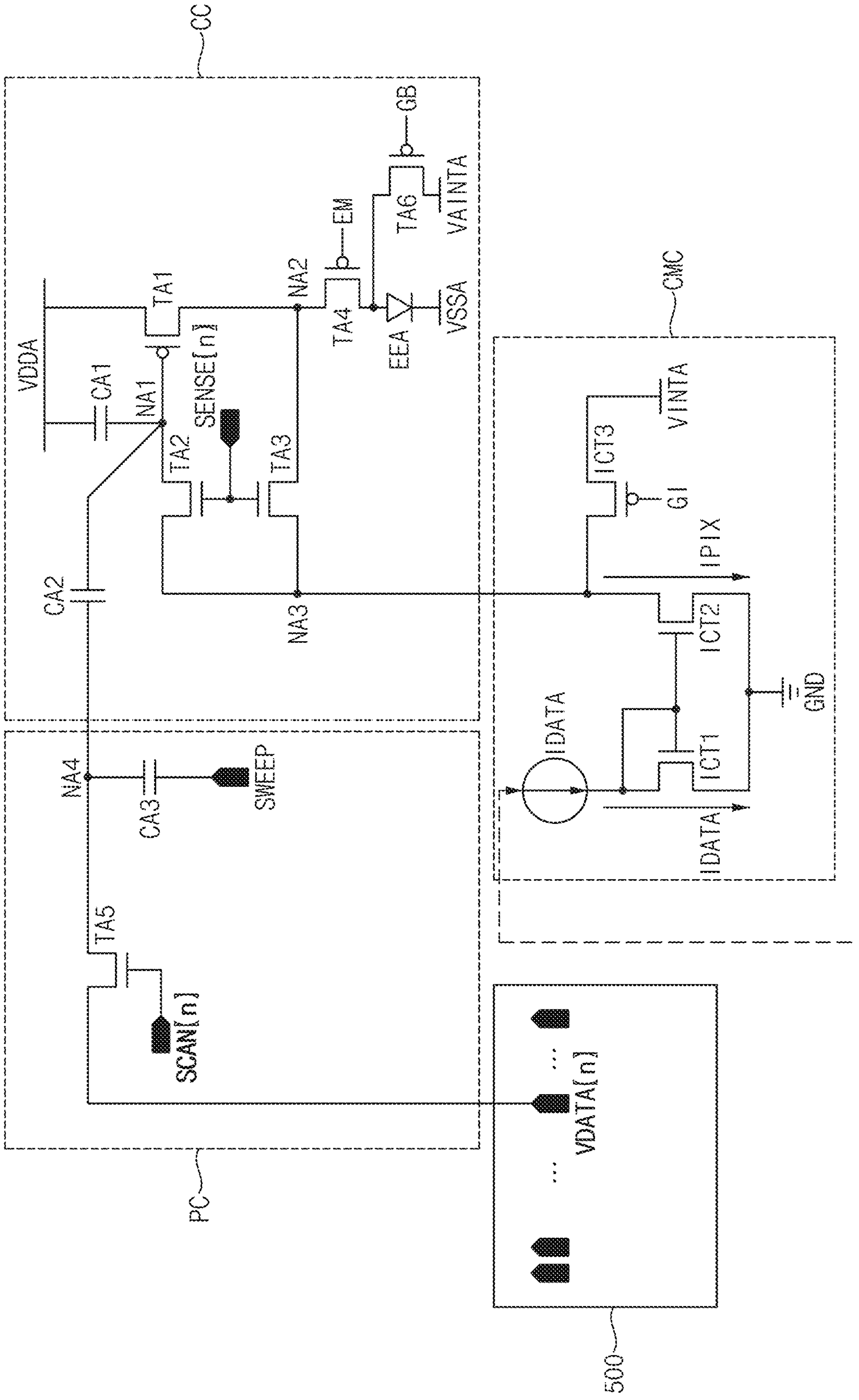
FIG. 28 is a circuit diagram illustrating a pixel circuit of a display panel of a display apparatus according to an embodiment of the present invention, a data driver and a constant current applying circuit of a display panel driver of the display apparatus.
Figure 29:
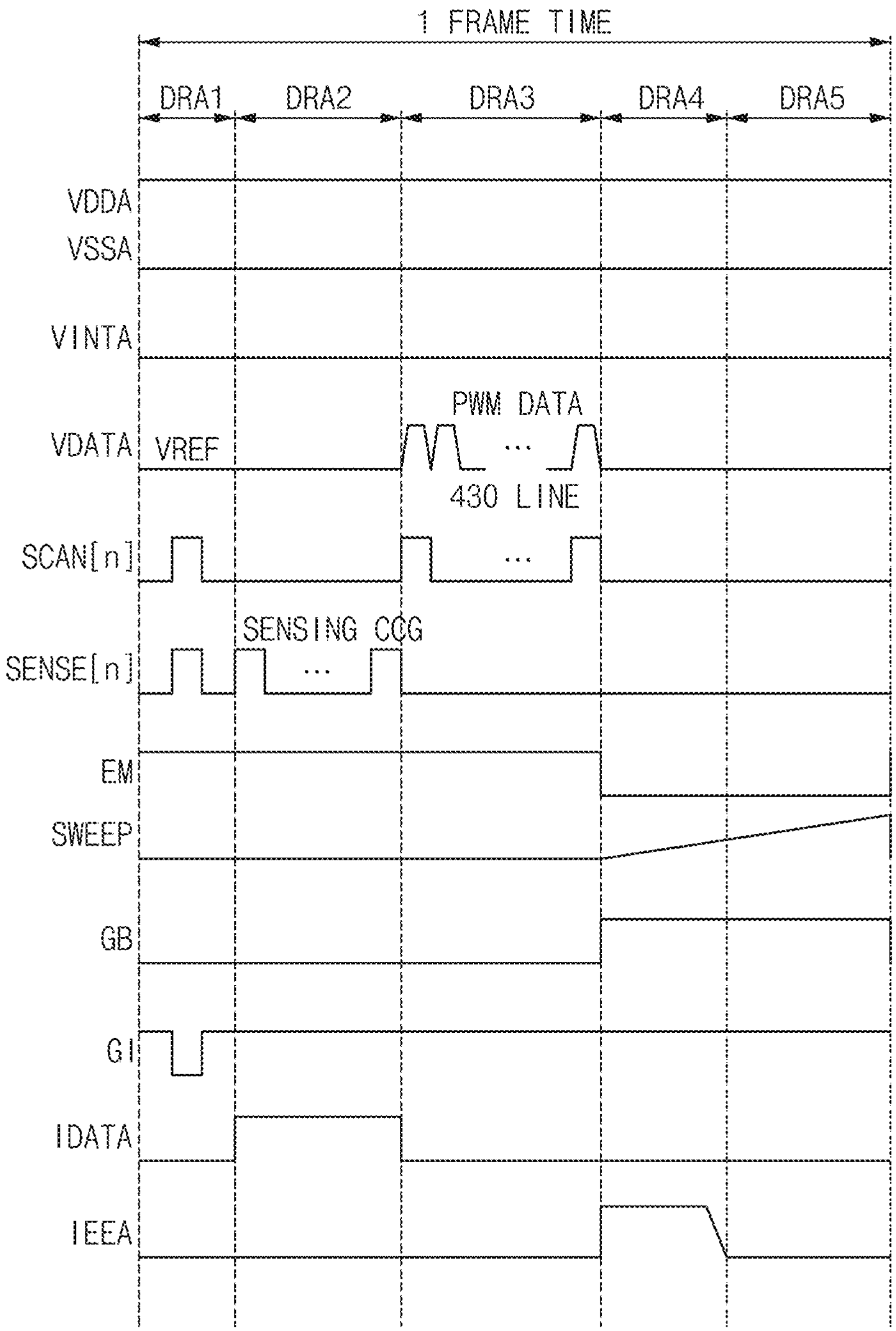
FIG. 29 is a timing diagram illustrating an example of input signals and an output signal of the pixel circuit of FIG. 28 and the constant current applying circuit of FIG. 28.

FIG. 28 is a circuit diagram illustrating a pixel circuit CC and PC of a display panel 100 of a display apparatus according to an embodiment of the present invention, a data driver 500 and a constant current applying circuit CMC of a display panel driver of the display apparatus. FIG. 29 is a timing diagram illustrating an example of input signals and an output signal of the pixel circuit CC and PC of FIG. 28 and the constant current applying circuit CMC of FIG. 28.

The display apparatus according to the present embodiment is substantially the same as the display apparatus of the previous embodiment explained referring to FIG. 17 except that the pixel circuit further includes a sixth transistor. Thus, the same reference numerals will be used to refer to the same or like parts as those described in the previous embodiment and any repetitive explanation concerning the above elements will be omitted.

Referring to FIGS. 1, 28 and 29, the first circuit CC may further include a sixth transistor TA6 including a control electrode for receiving an anode initialization gate signal GB, a first electrode for receiving a second initialization voltage VAINTA and a second electrode connected to the first electrode of the light emitting element EEA.

The driving timing of the pixel circuit according to the present embodiment is substantially the same as the driving timing of the previous embodiment explained referring to FIGS. 19, 21, 23, 25 and 27 except that driving timing further includes the anode initialization gate signal GB. Thus, the same reference numerals will be used to refer to the same or like parts as those described in the previous embodiment and any repetitive explanation concerning the above elements will be omitted.

The anode initialization gate signal GB may have an active level in the first period DRA1, the second period DRA2 and the third period DRA3. In contrast, the anode initialization gate signal GB may have an inactive level in the fourth period DRA4 and the fifth period DRA5.

According to the present embodiment, the pixel circuit may be driven in the pulse width modulation method. The threshold voltage of the driving transistor TA1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 30:
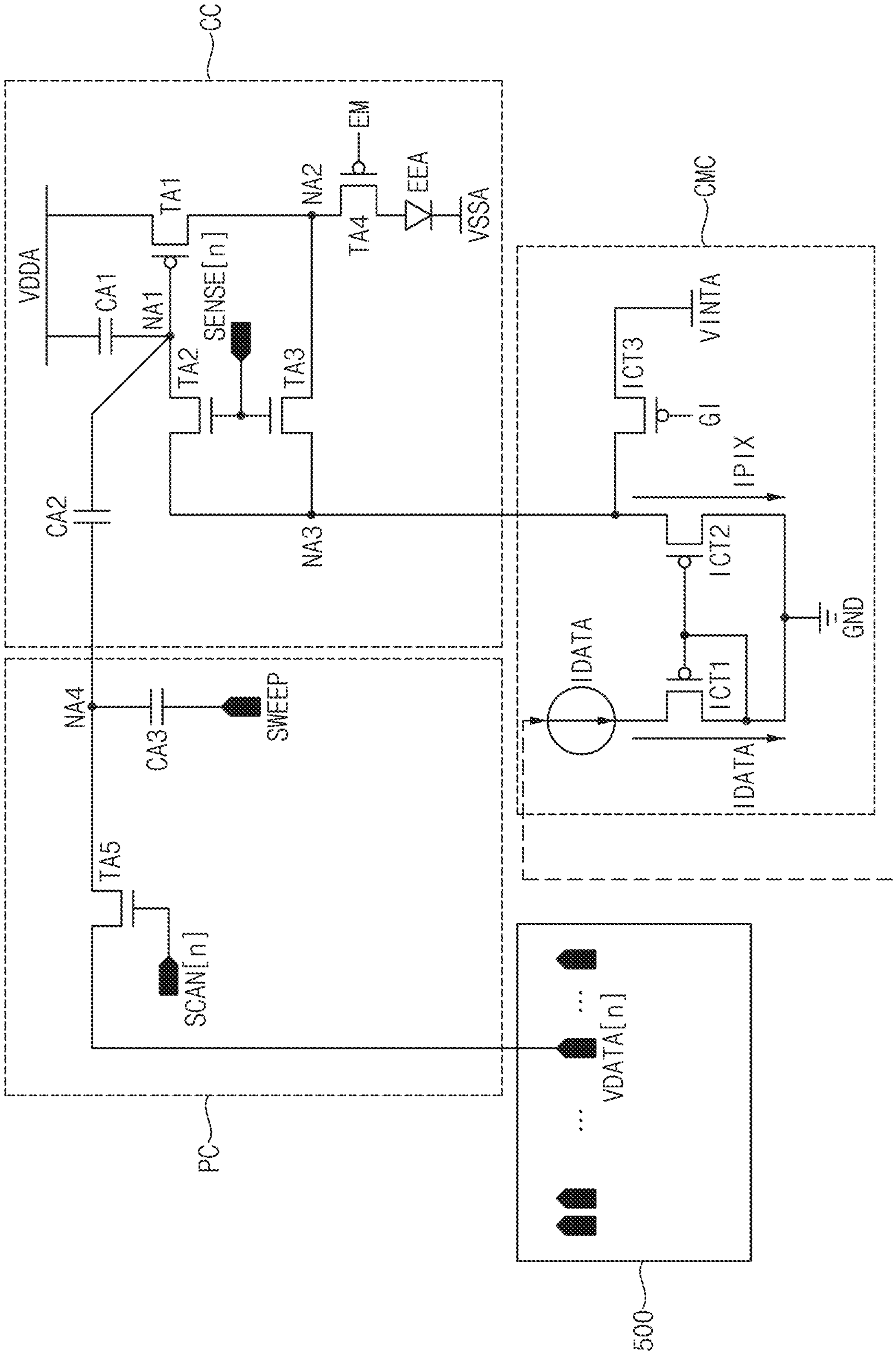
FIG. 30 is a circuit diagram illustrating a pixel circuit of a display panel of a display apparatus according to an embodiment of the present invention, a data driver and a constant current applying circuit of a display panel driver of the display apparatus.

FIG. 30 is a circuit diagram illustrating a pixel circuit CC and PC of a display panel 100 of a display apparatus according to an embodiment of the present invention, a data driver 500 and a constant current applying circuit CMC of a display panel driver of the display apparatus.

The display apparatus according to the present embodiment is substantially the same as the display apparatus of the previous embodiment explained referring to FIG. 17 except that the first current applying transistor and the second current applying transistor are P-type transistors. Thus, the same reference numerals will be used to refer to the same or like parts as those described in the previous embodiment and any repetitive explanation concerning the above elements will be omitted.

Referring to FIGS. 1 and 30, the third circuit CMC may include a first current applying transistor ICT1 including a first electrode for receiving the data current IDATA and a second electrode connected to a ground GND, a second current applying transistor ICT2 including a first electrode connected to the third node NA3 and a second electrode connected to the ground GND and a third current applying transistor ICT3 including a control electrode for receiving an initialization gate signal GI, a first electrode for receiving a first initialization voltage VINTA and a second electrode connected to the third node NA3.

In the present embodiment, a control electrode of the first current applying transistor ICT1 and the second electrode of the first current applying transistor ICT1 and a control electrode of the second current applying transistor ICT2 may be connected to one another.

In the present embodiment, the first current applying transistor ICT1 and the second current applying transistor ICT1 and the third current applying transistor ICT3 may be P-type transistors.

According to the present embodiment, the pixel circuit may be driven in the pulse width modulation method. The threshold voltage of the driving transistor TA1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 31:
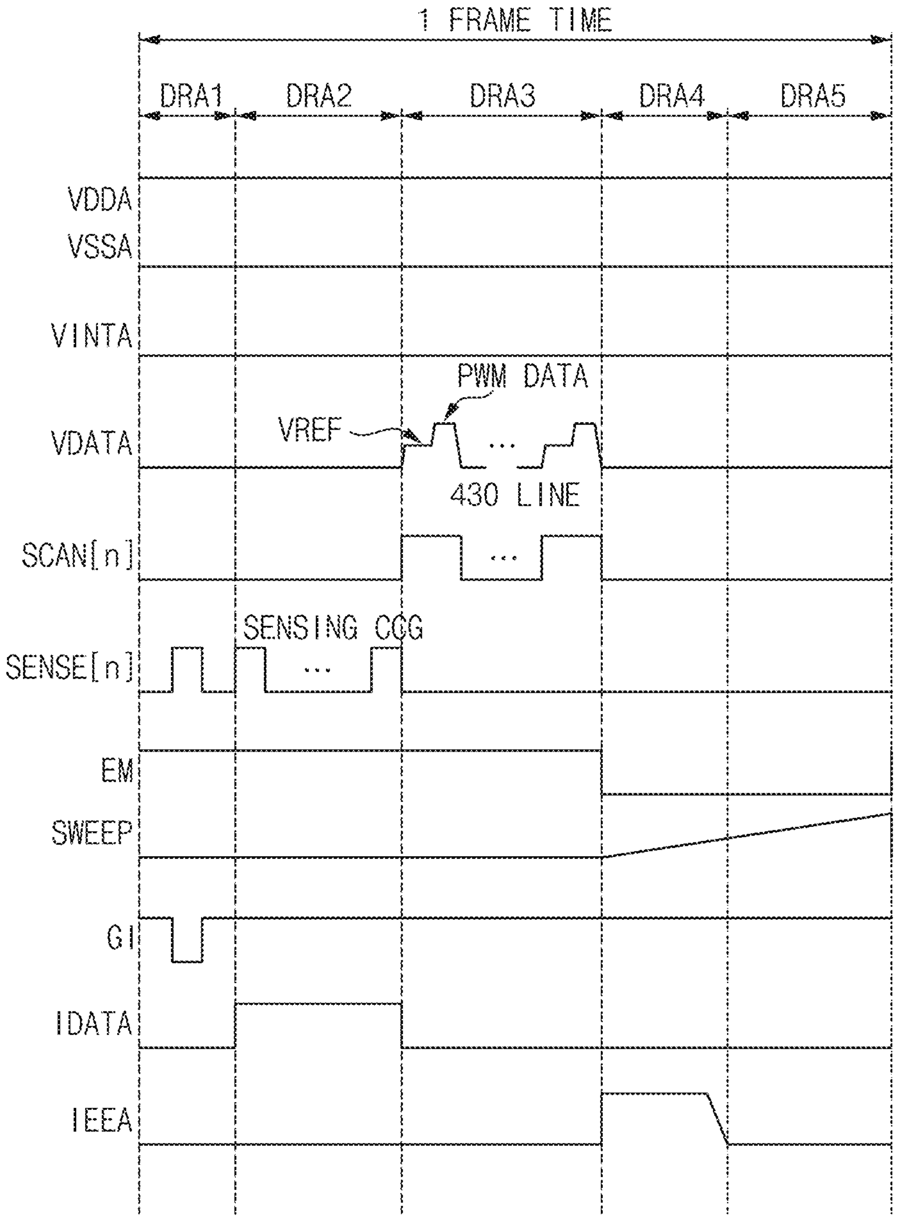
FIG. 31 is a timing diagram illustrating an example of input signals and an output signal of the pixel circuit of FIG. 17 and the constant current applying circuit of FIG. 17.

FIG. 31 is a timing diagram illustrating an example of input signals and an output signal of the pixel circuit CC and PC of FIG. 17 and the constant current applying circuit CMC of FIG. 17.

The driving timing of the pixel circuit according to the present embodiment is substantially the same as the driving timing of the previous embodiment explained referring to FIGS. 19, 21, 23, 25 and 27 except for a waveform of the data voltage VDATA and a waveform of the scan signal SCAN[n]. Thus, the same reference numerals will be used to refer to the same or like parts as those described in the previous embodiment and any repetitive explanation concerning the above elements will be omitted.

Referring to FIGS. 1, 17 and 31, in the first period DRA1, the scan signal SCAN[n] may have an inactive level, the sensing control signal SENSE[n] may have an active pulse, the emission signal EM may have an inactive level and the sweep signal SWEEP may have the low level. In the second period DRA2 subsequent to the first period DRA1, the scan signal SCAN[n] may have the inactive level, the sensing control signal SENSE[n] may have an active pulse, the emission signal EM may have the inactive level and the sweep signal SWEEP may have the low level. In the third period DRA3 subsequent to the second period DRA2, the scan signal SCAN[n] may have an active pulse, the sensing control signal SENSE[n] may have an inactive level, the emission signal EM may have the inactive level, the sweep signal SWEEP may have the low level and the data voltage VDATA may sequentially have a reference level VREF and a pulse width modulation data PWM DATA higher than the reference level VREF. In the fourth period DRA4 and the fifth period DRA5 which are subsequent to the third period DRA3, the scan signal SCAN[n] may have the inactive level, the sensing control signal SENSE[n] may have the inactive level, the emission signal EM may have an active level and the sweep signal SWEEP may gradually increase from the low level.

According to the present embodiment, the pixel circuit may be driven in the pulse width modulation method. The threshold voltage of the driving transistor TA1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 32:
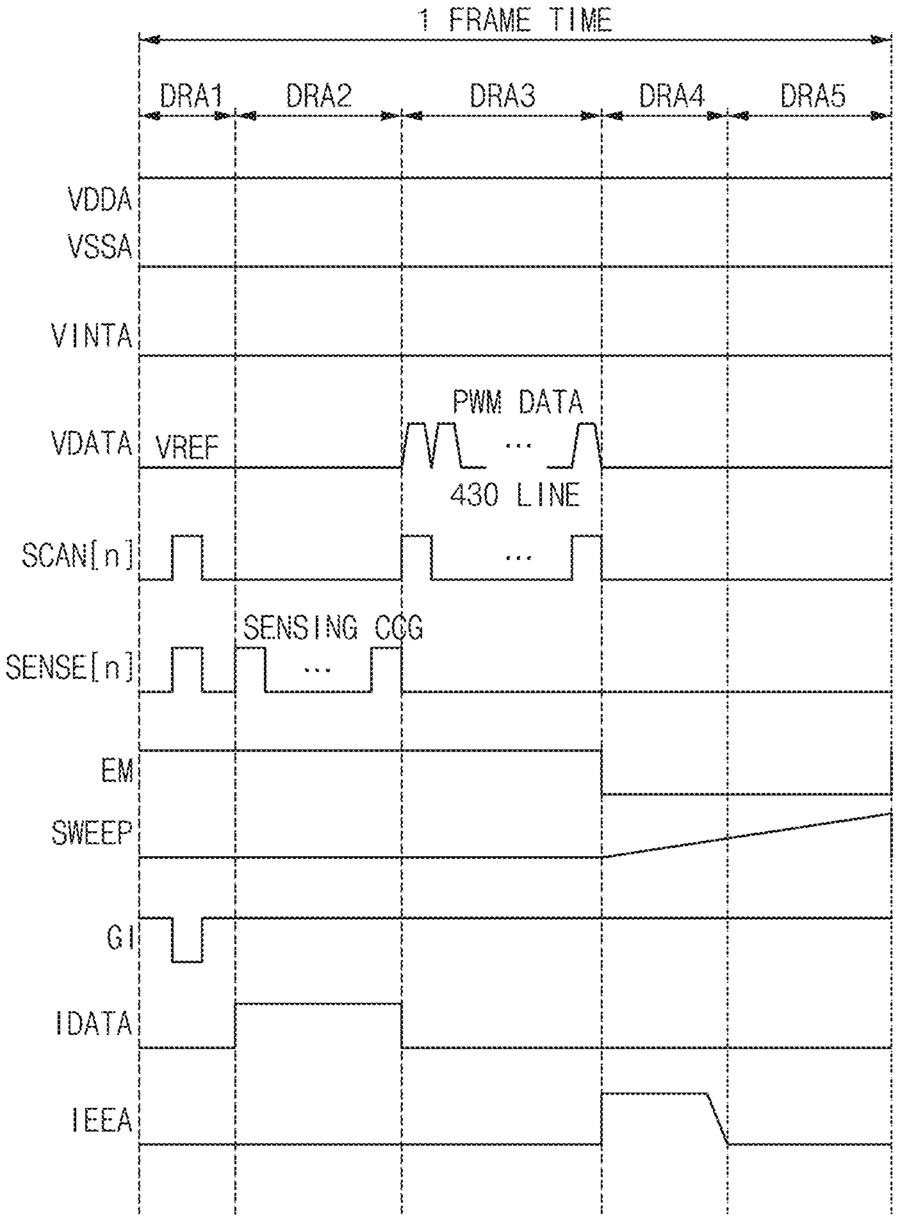
FIG. 32 is a timing diagram illustrating an example of input signals and an output signal of the pixel circuit of FIG. 17 and the constant current applying circuit of FIG. 17 in a writing period.
Figure 33:
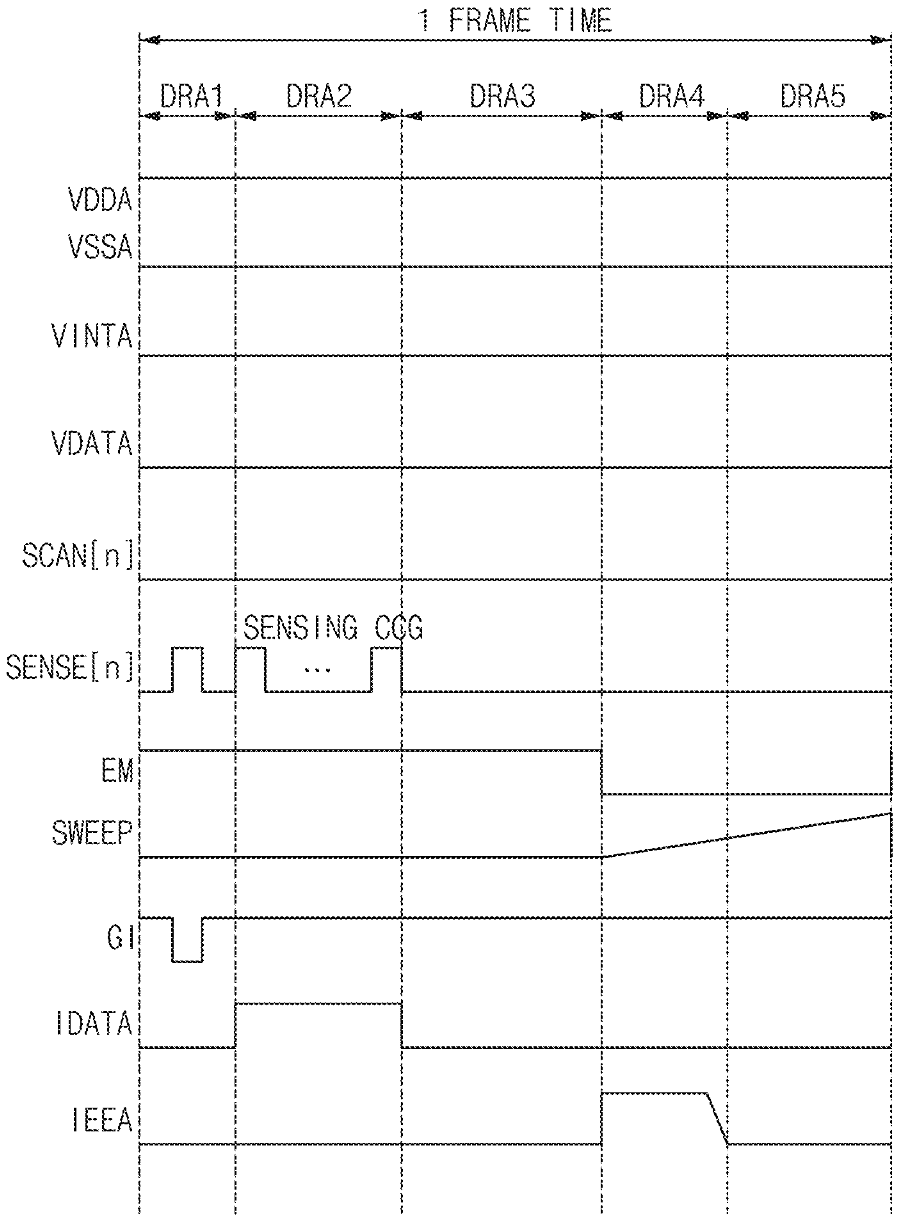
FIG. 33 is a timing diagram illustrating an example of input signals and an output signal of the pixel circuit of FIG. 17 and the constant current applying circuit of FIG. 17 in a holding period.

FIG. 32 is a timing diagram illustrating an example of input signals and an output signal of the pixel circuit CC and PC of FIG. 17 and the constant current applying circuit CMC of FIG. 17 in a writing period. FIG. 33 is a timing diagram illustrating an example of input signals and an output signal of the pixel circuit CC and PC of FIG. 17 and the constant current applying circuit CMC of FIG. 17 in a holding period.

The driving timing of the pixel circuit according to the present embodiment is substantially the same as the driving timing of the previous embodiment explained referring to FIGS. 19, 21, 23, 25 and 27 except that the display panel is driven in a variable frequency. Thus, the same reference numerals will be used to refer to the same or like parts as those described in the previous embodiment and any repetitive explanation concerning the above elements will be omitted.

Referring to FIGS. 1, 17, 32 and 33, the display panel 100 may be driven in a variable frequency.

The driving timing of the display apparatus supporting a variable frequency driving method may include a writing frame when the data voltage is written to the pixel and a holding frame when the light emitting element emits a light without writing the data voltage to the pixel.

In the writing frame, the data voltage VDATA may be applied to the first transistor TA1 and the light emitting element EEA may emit a light. In a first period DRA1 and a third period DRA3 of the writing frame, the scan signal SCAN[n] may have active pulses.

In the holding frame, the data voltage VDATA may not be applied to the first transistor TA1 and the light emitting element EEA may emit a light. In a first period DRA1 and a third period DRA3 of the holding frame, the scan signal SCAN[n] may have an inactive level.

According to the present embodiment, the pixel circuit may be driven in the pulse width modulation method. The threshold voltage of the driving transistor TA1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

In addition, in the present embodiment, the pixel circuit may support the variable frequency driving method so that the power consumption of the display apparatus may be reduced.

Figure 34:
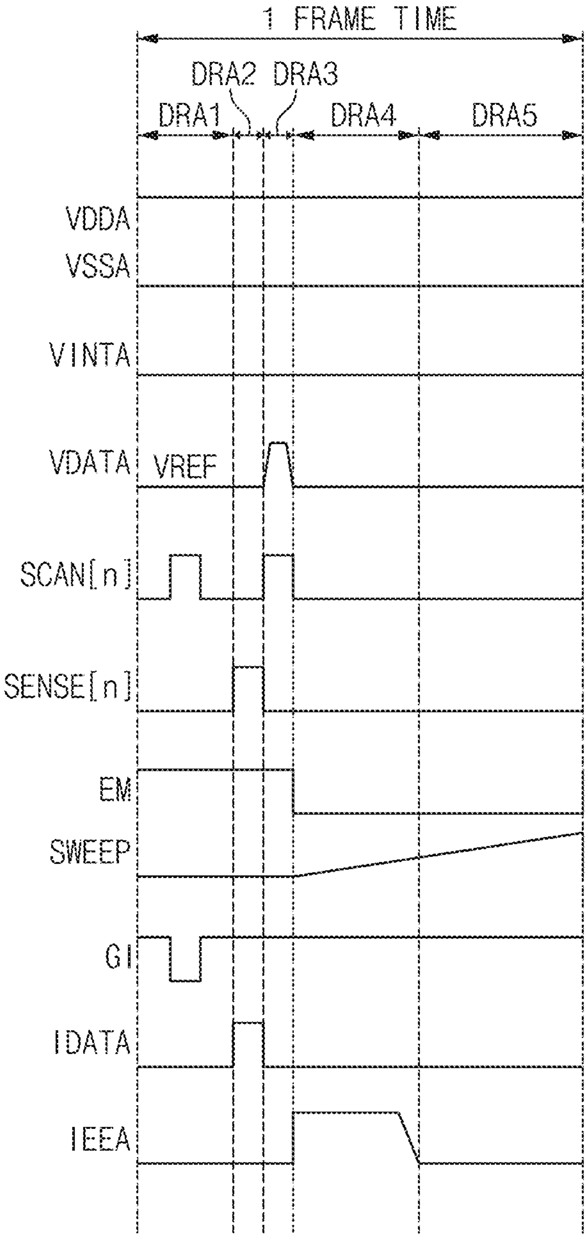
FIG. 34 is a timing diagram illustrating an example of input signals and an output signal of the pixel circuit of FIG. 17 and the constant current applying circuit of FIG. 17.

FIG. 34 is a timing diagram illustrating an example of input signals and an output signal of the pixel circuit CC and PC of FIG. 17 and the constant current applying circuit CMC of FIG. 17.

The driving timing of the pixel circuit according to the present embodiment is substantially the same as the driving timing of the previous embodiment explained referring to FIGS. 19, 21, 23, 25 and 27 except that the display panel is driven in a progressive light emission driving method. Thus, the same reference numerals will be used to refer to the same or like parts as those described in the previous embodiment and any repetitive explanation concerning the above elements will be omitted.

Referring to FIGS. 1, 17 and 34, the display panel 100 may be driven in a progressive light emission driving method.

According to the present embodiment, the pixel circuit may be driven in the pulse width modulation method. The threshold voltage of the driving transistor TA1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 35:
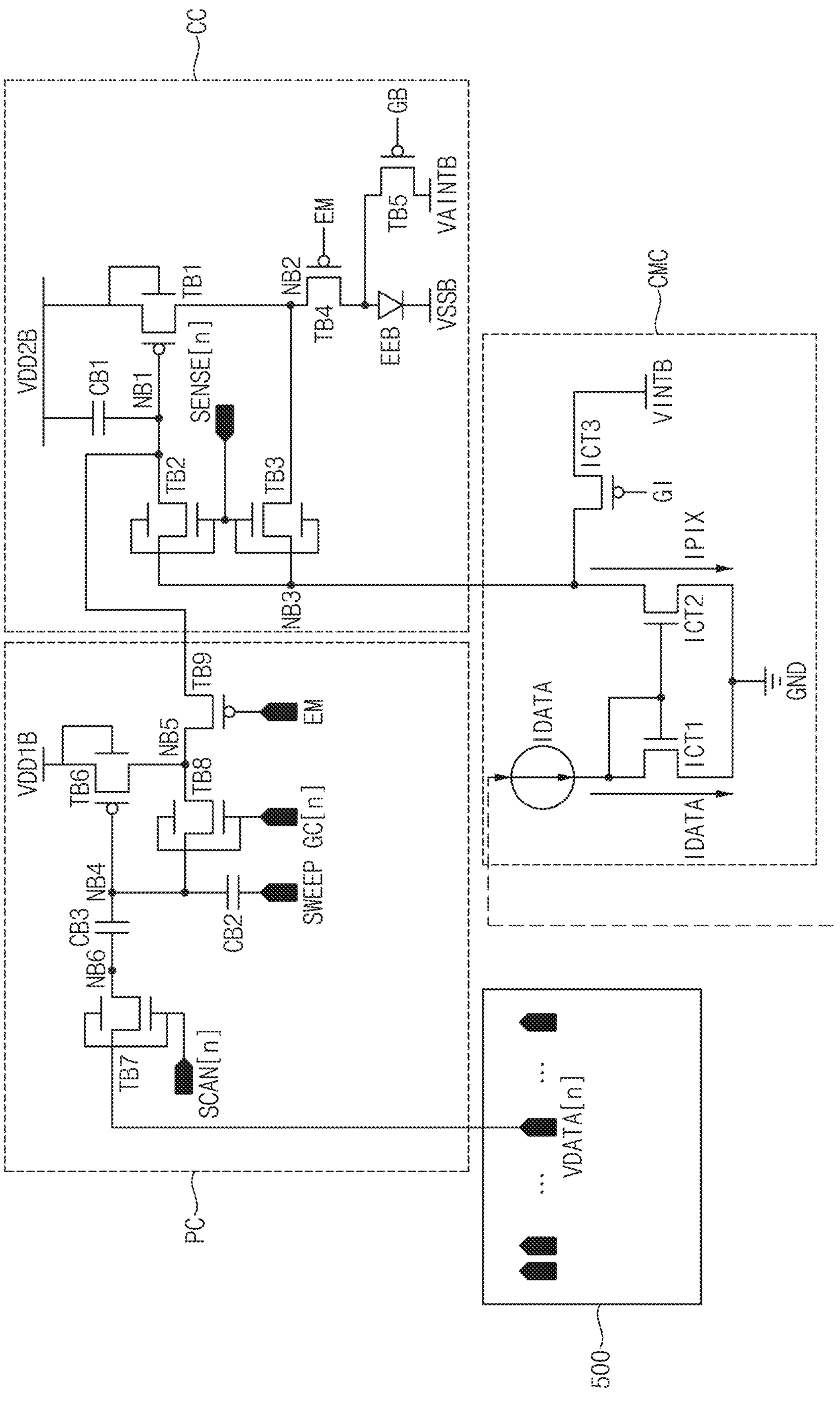
FIG. 35 is a circuit diagram illustrating a pixel circuit of a display panel of a display apparatus according to an embodiment of the present invention, a data driver and a constant current applying circuit of a display panel driver of the display apparatus.

FIG. 35 is a circuit diagram illustrating a pixel circuit CC and PC of a display panel 100 of a display apparatus according to an embodiment of the present invention, a data driver 500 and a constant current applying circuit CMC of a display panel driver of the display apparatus.

Referring to FIGS. 1 and 35, the pixel circuit may include a first circuit CC and a second circuit PC.

The first circuit CC may be a constant current generating circuit for a constant current generation (CCG). The second circuit PC may be a pulse width modulation circuit for a pulse width modulation (PWM).

The first circuit CC includes a first transistor TB1 including a control electrode connected to a first node NB1, a first electrode for receiving a first power voltage VDD2B and a second electrode connected to a second node NB2, a second transistor TB2 including a control electrode for receiving a sensing control signal SENSE[n], a first electrode connected to a third node NB3 and a second electrode connected to the first node NB1, a third transistor TB3 including a control electrode for receiving the sensing control signal SENSE[n], a first electrode connected to the third node NB3 and a second electrode connected to the second node NB2, a fourth transistor TB4 including a control electrode for receiving an emission signal EM, a first electrode connected to the second node NB2 and a second electrode connected to a first electrode of a light emitting element EEB, a first capacitor CB1 including a first electrode for receiving the first power voltage VDD2B and a second electrode connected to the first node NB1 and the light emitting element EEB including a first electrode connected to the second electrode of the fourth transistor TB4 and a second electrode for receiving a second power voltage VSSB.

In the present embodiment, the first circuit CC may further include a fifth transistor TB5 including a control electrode for receiving an anode initialization gate signal GB, a first electrode for receiving a second initialization voltage VAINTB and a second electrode connected to the first electrode of the light emitting element EEB.

The second circuit PC may include a sixth transistor TB6 including a control electrode connected to a fourth node NB4, a first electrode for receiving a second power voltage VDD1B and a second electrode connected to a fifth node NB5, a seventh transistor TB7 including a control electrode for receiving a scan signal SCAN[n], a first electrode for receiving a data voltage VDATA and a second electrode connected to a sixth node NB6, an eighth transistor TB8 including a control electrode for receiving a compensation gate signal GC[n], a first electrode connected to the fourth node NB4 and a second electrode connected to the fifth node NB5, a ninth transistor TB9 including a control electrode for receiving the emission signal EM, a first electrode connected to the fifth node NB5 and a second electrode connected to the first node NB1, a second capacitor CB2 including a first electrode for receiving a sweep signal SWEEP and a second electrode connected to the fourth node NB4 and a third capacitor CB3 including a first electrode connected to the sixth node NB6 and a second electrode connected to the fourth node NB4.

As explained above, the pixel circuit may include nine transistors and three capacitors.

In the present embodiment, some of the transistors in the pixel circuit may be P-type transistors and some of the transistors in the pixel circuit may be N-type transistors.

For example, the first transistor TB1, the fourth transistor TB4, the fifth transistor TB5, the sixth transistor TB6 and, the ninth transistor TB9 may be P-type transistors. The second transistor TB2, the third transistor TB3, the seventh transistor TB7 and the eighth transistor TB8 may be N-type transistors.

For example, the first transistor TB1 may further include a second control electrode for receiving the first power voltage VDD2B. For example, the second transistor TB2 may further include a second control electrode connected to the control electrode of the second transistor TB2. For example, the third transistor TB3 may further include a second control electrode connected to the control electrode of the third transistor TB3. For example, the sixth transistor TB6 may further include a second control electrode for receiving the second power voltage VDD1B. For example, the seventh transistor TB7 may further include a second control electrode connected to the control electrode of the seventh transistor TB7. For example, the eighth transistor TB8 may further include a second control electrode connected to the control electrode of the eighth transistor TB8.

The display apparatus may further include a third circuit CMC. The third circuit CMC may apply a data current IDATA to the first circuit CC.

For example, the third circuit CMC may be integrated on the peripheral region of the display panel 100. Alternatively, the third circuit CMC may be formed out of the display panel 100.

The third circuit CMC may include a first current applying transistor ICT1 including a first electrode for receiving the data current IDATA and a second electrode connected to a ground GND, a second current applying transistor ICT2 including a first electrode connected to the third node NB3 and a second electrode connected to the ground GND and a third current applying transistor ICT3 including a control electrode for receiving an initialization gate signal GI, a first electrode for receiving a first initialization voltage VINTB and a second electrode connected to the third node NB3.

The light emitting element EEB may emit a light based on the data voltage VDATA and the data current IDATA.

Figure 36:
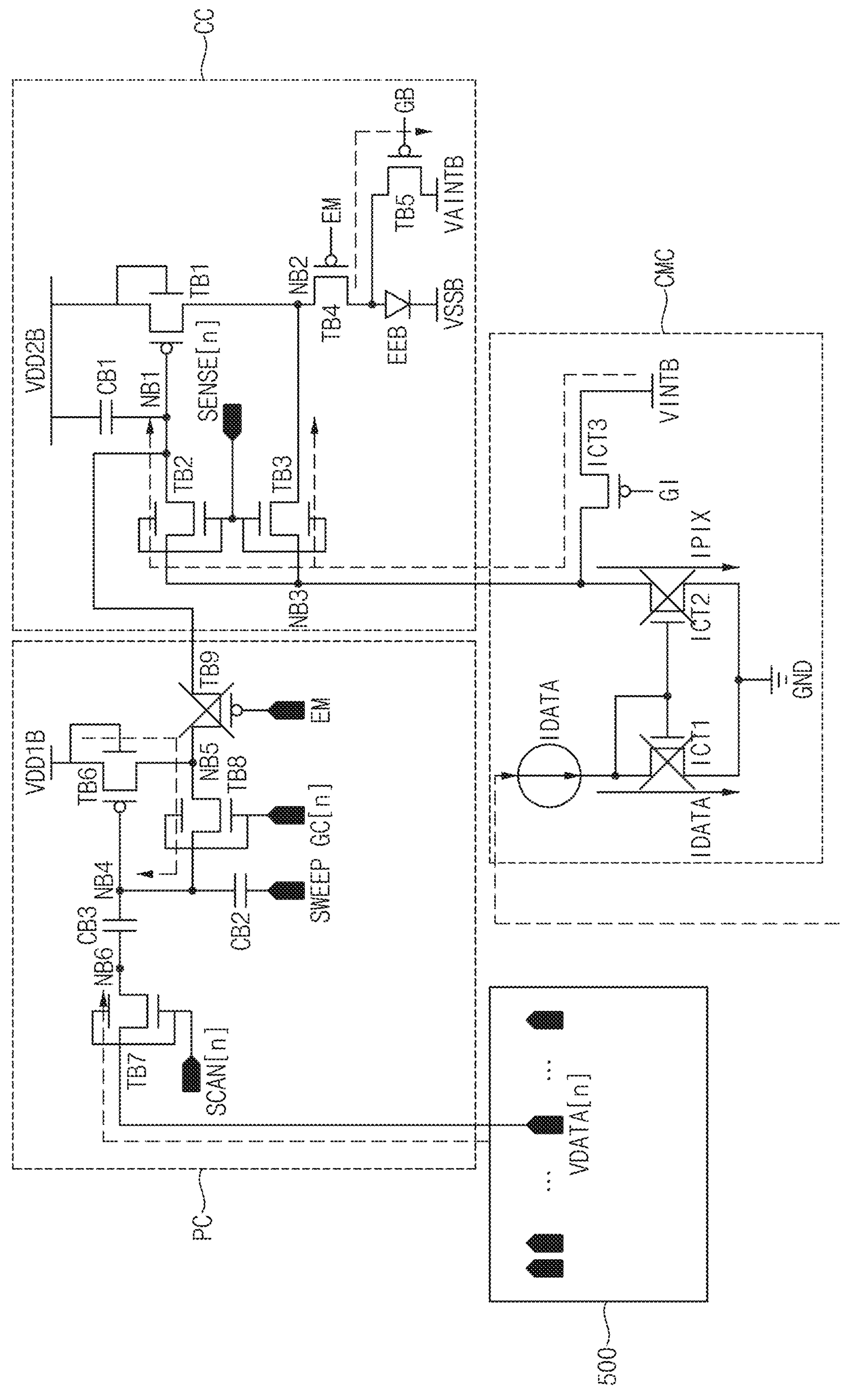
FIG. 36 is a circuit diagram illustrating an operation of the pixel circuit of FIG. 35 and an operation of the constant current applying circuit of FIG. 35 in a first period of a driving timing.
Figure 37:
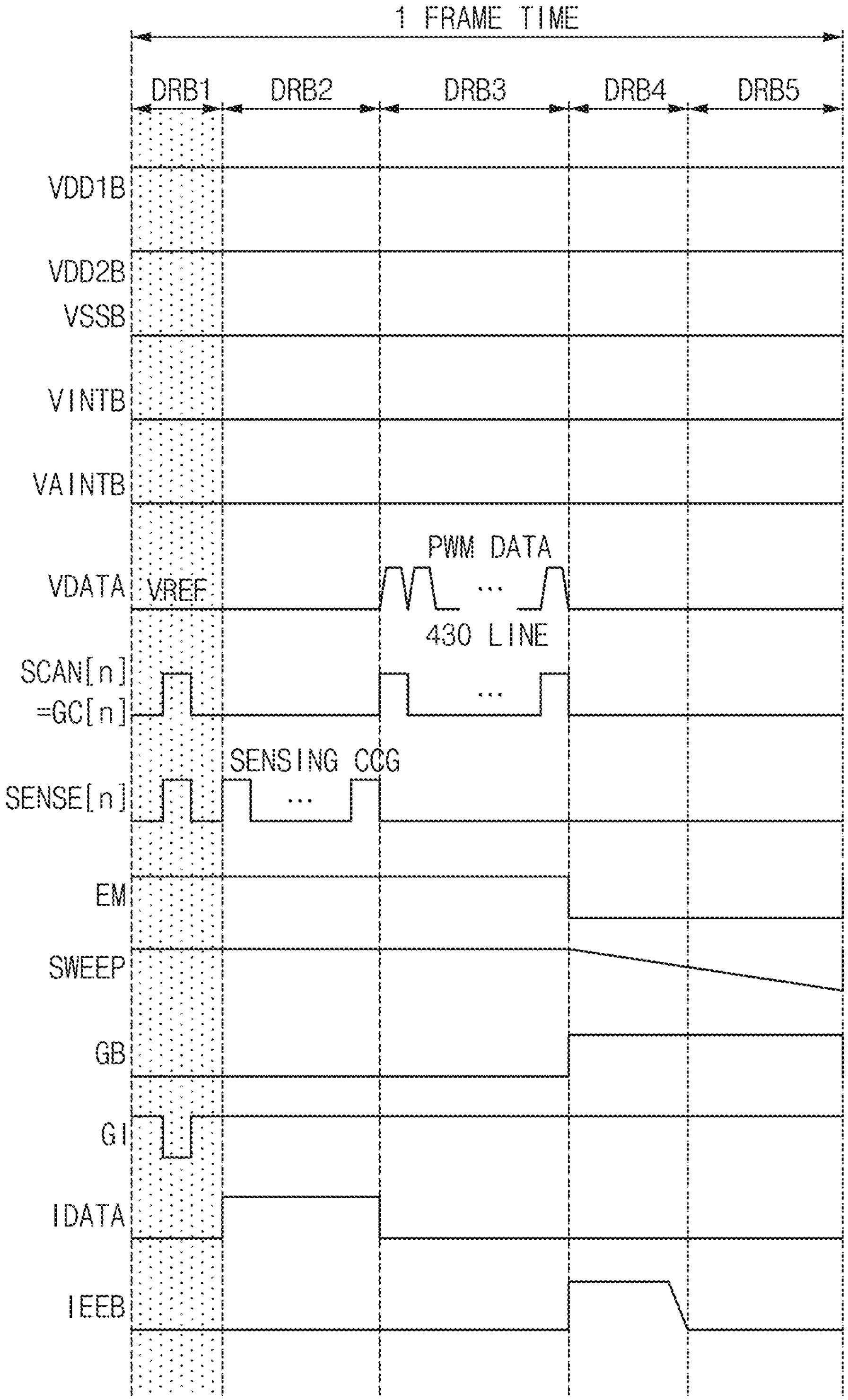
FIG. 37 is a timing diagram illustrating an example of input signals and an output signal of the pixel circuit of FIG. 35 and the constant current applying circuit of FIG. 35 in the first period.
Figure 38:
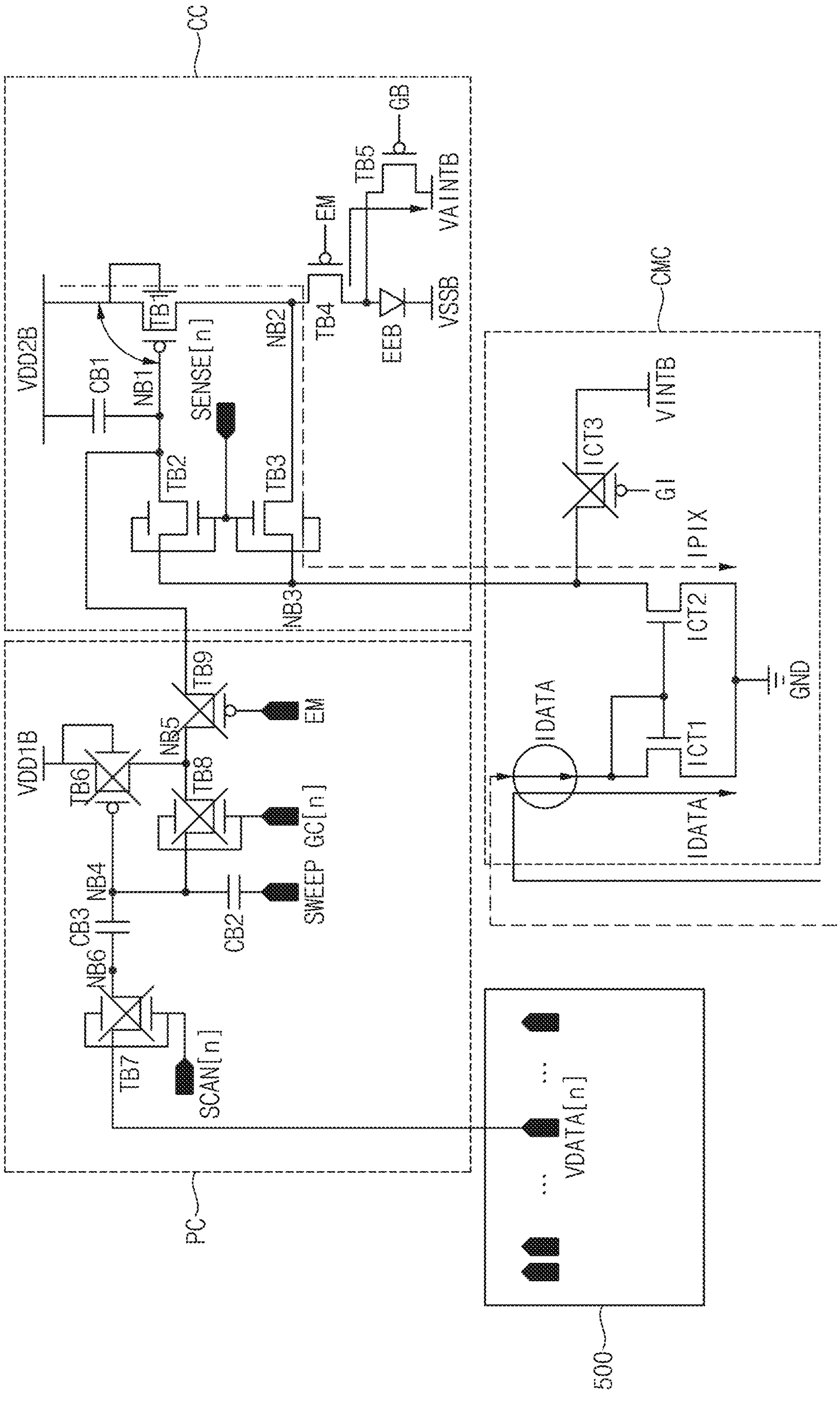
FIG. 38 is a circuit diagram illustrating an operation of the pixel circuit of FIG. 35 and an operation of the constant current applying circuit of FIG. 35 in a second period of the driving timing.
Figure 39:
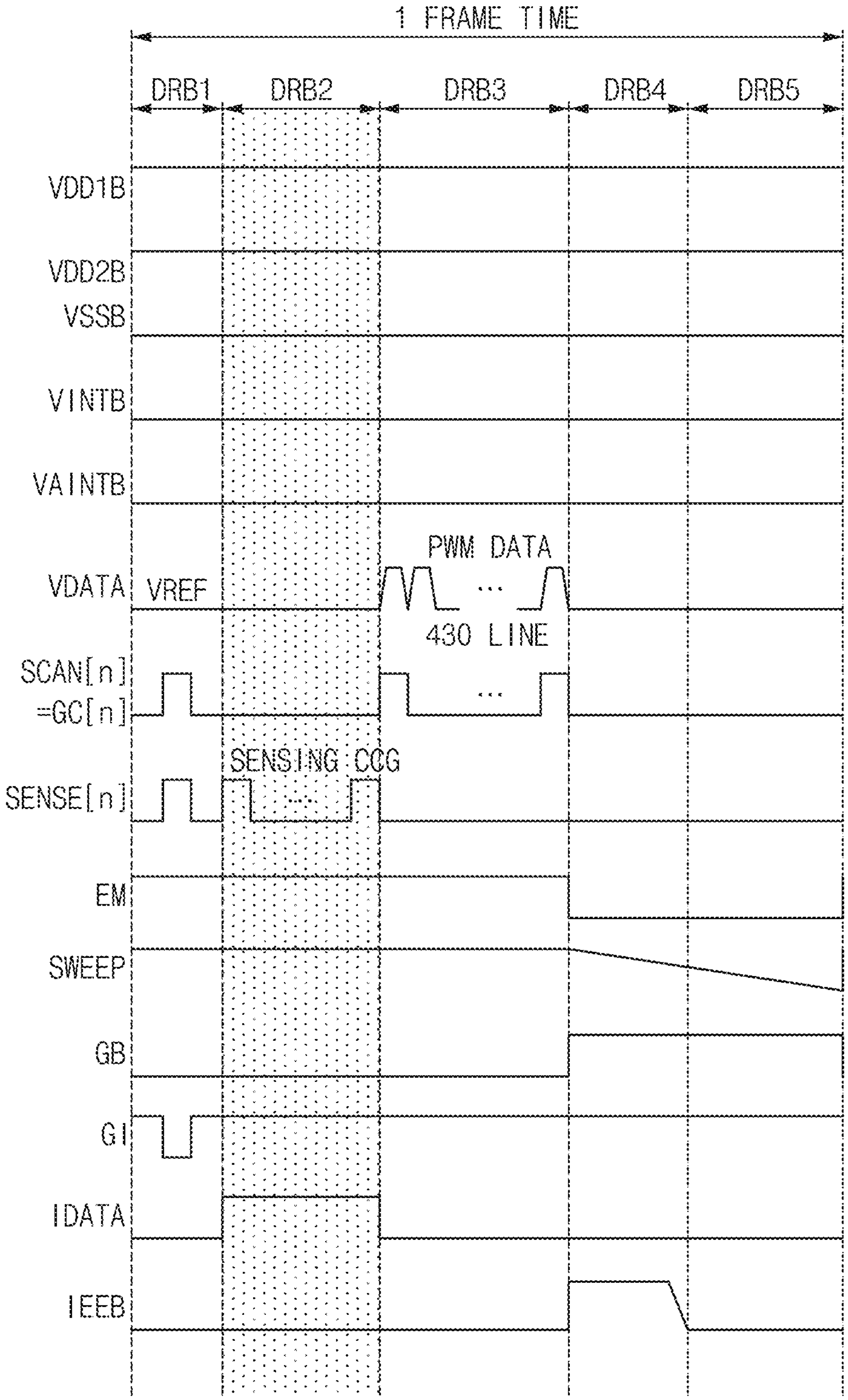
FIG. 39 is a timing diagram illustrating an example of input signals and an output signal of the pixel circuit of FIG. 35 and the constant current applying circuit of FIG. 35 in the second period.
Figure 40:
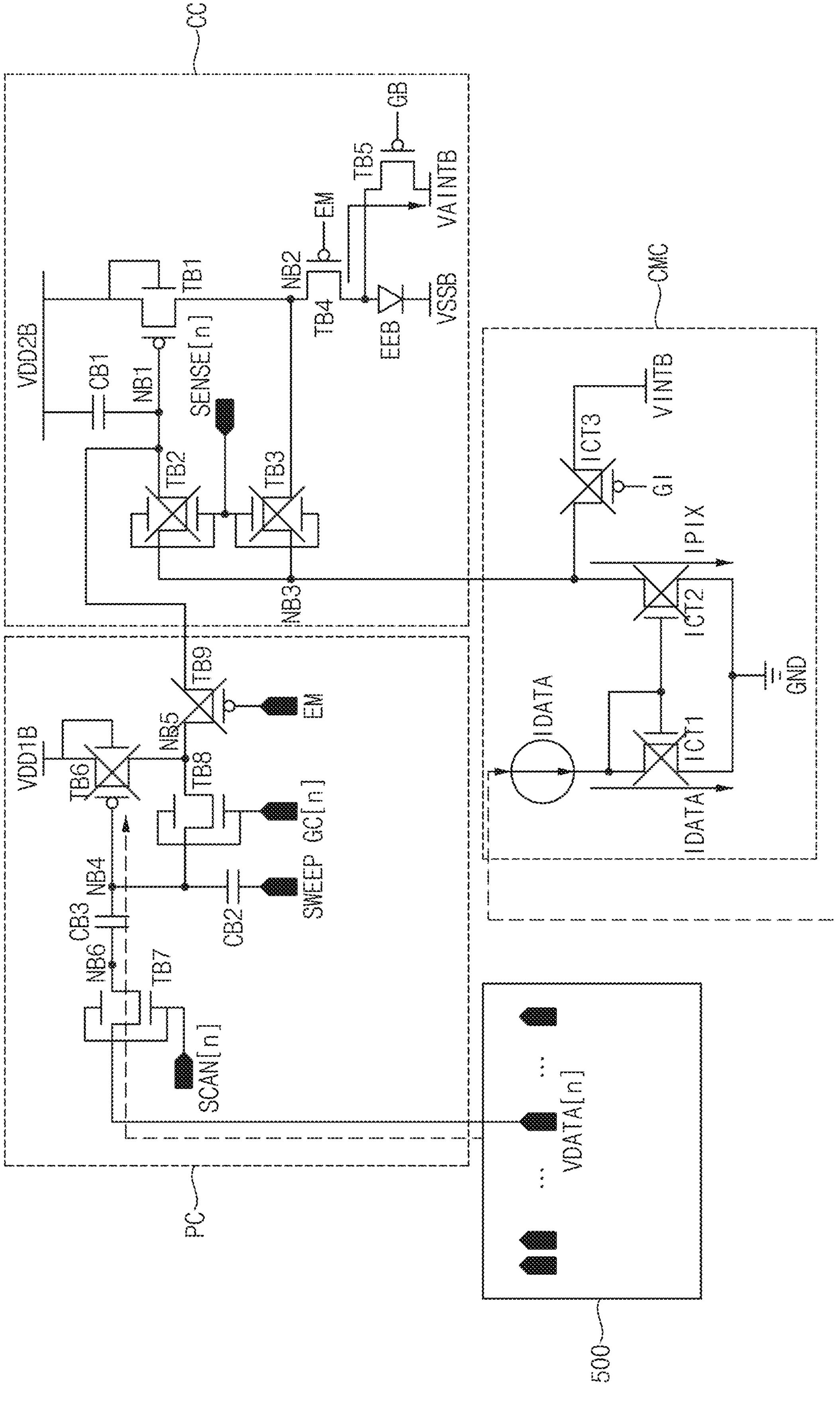
FIG. 40 is a circuit diagram illustrating an operation of the pixel circuit of FIG. 35 and an operation of the constant current applying circuit of FIG. 35 in a third period of the driving timing.
Figure 41:
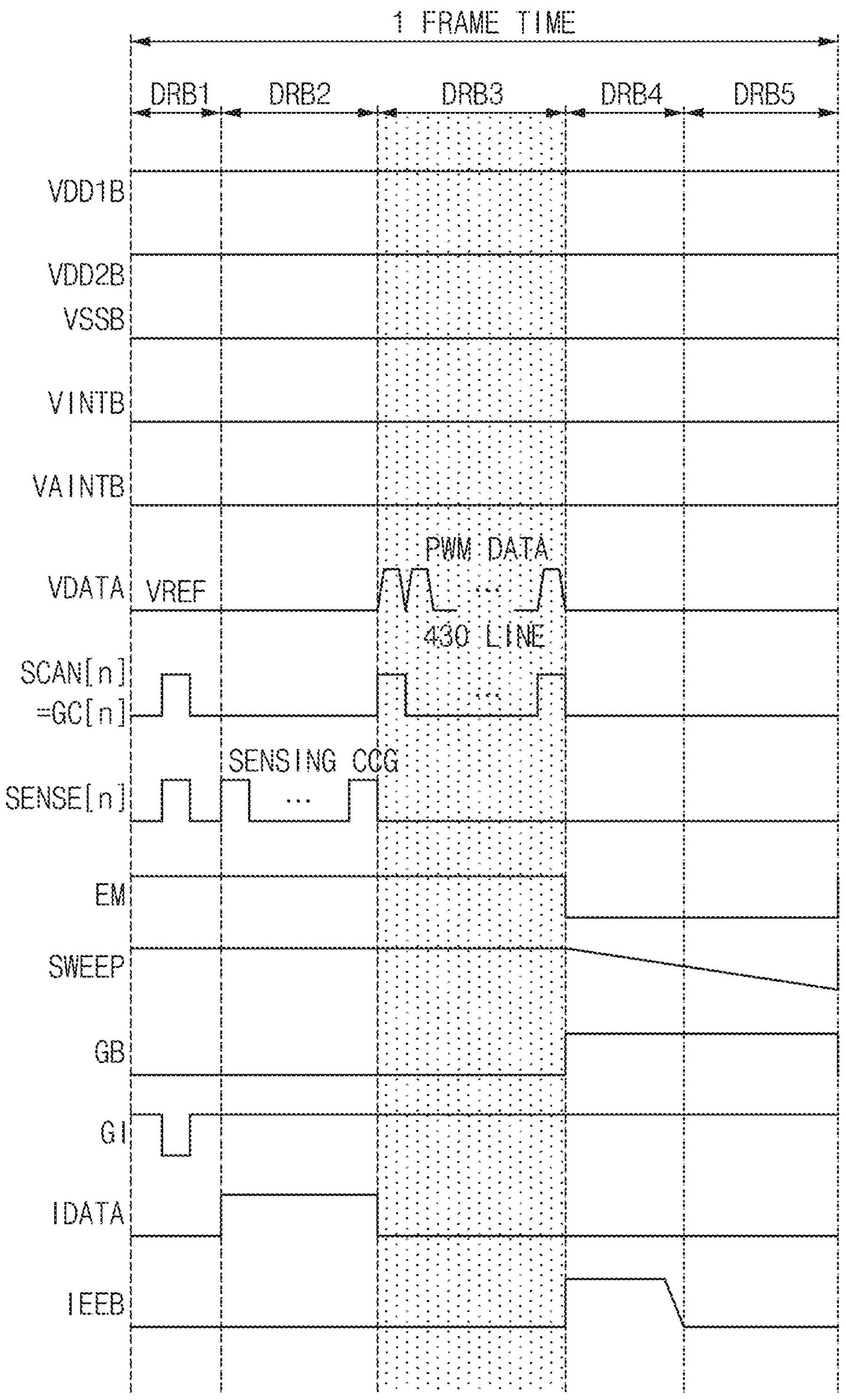
FIG. 41 is a timing diagram illustrating an example of input signals and an output signal of the pixel circuit of FIG. 35 and the constant current applying circuit of FIG. 35 in the third period.
Figure 42:
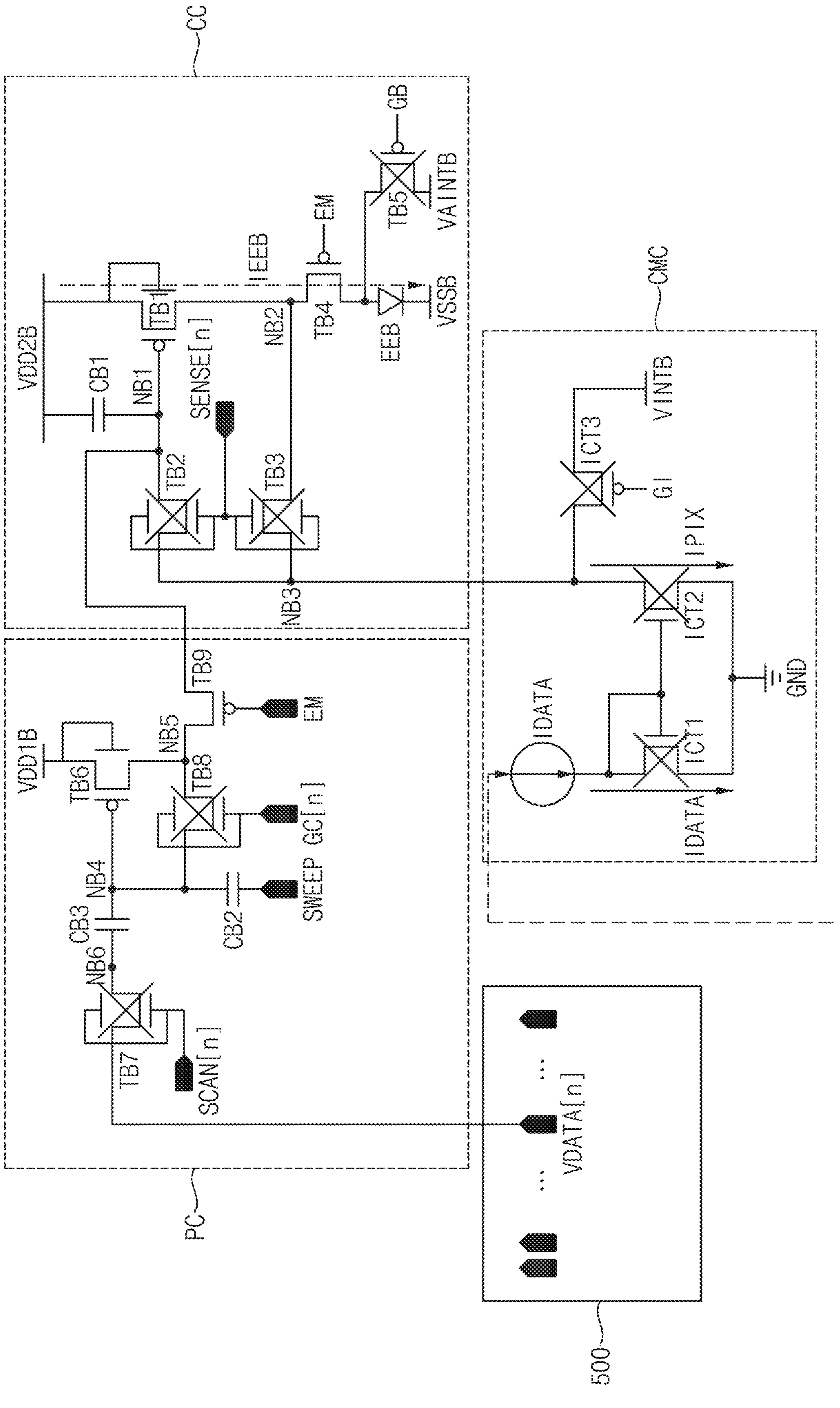
FIG. 42 is a circuit diagram illustrating an operation of the pixel circuit of FIG. 35 and an operation of the constant current applying circuit of FIG. 35 in a fourth period of the driving timing.
Figure 43:
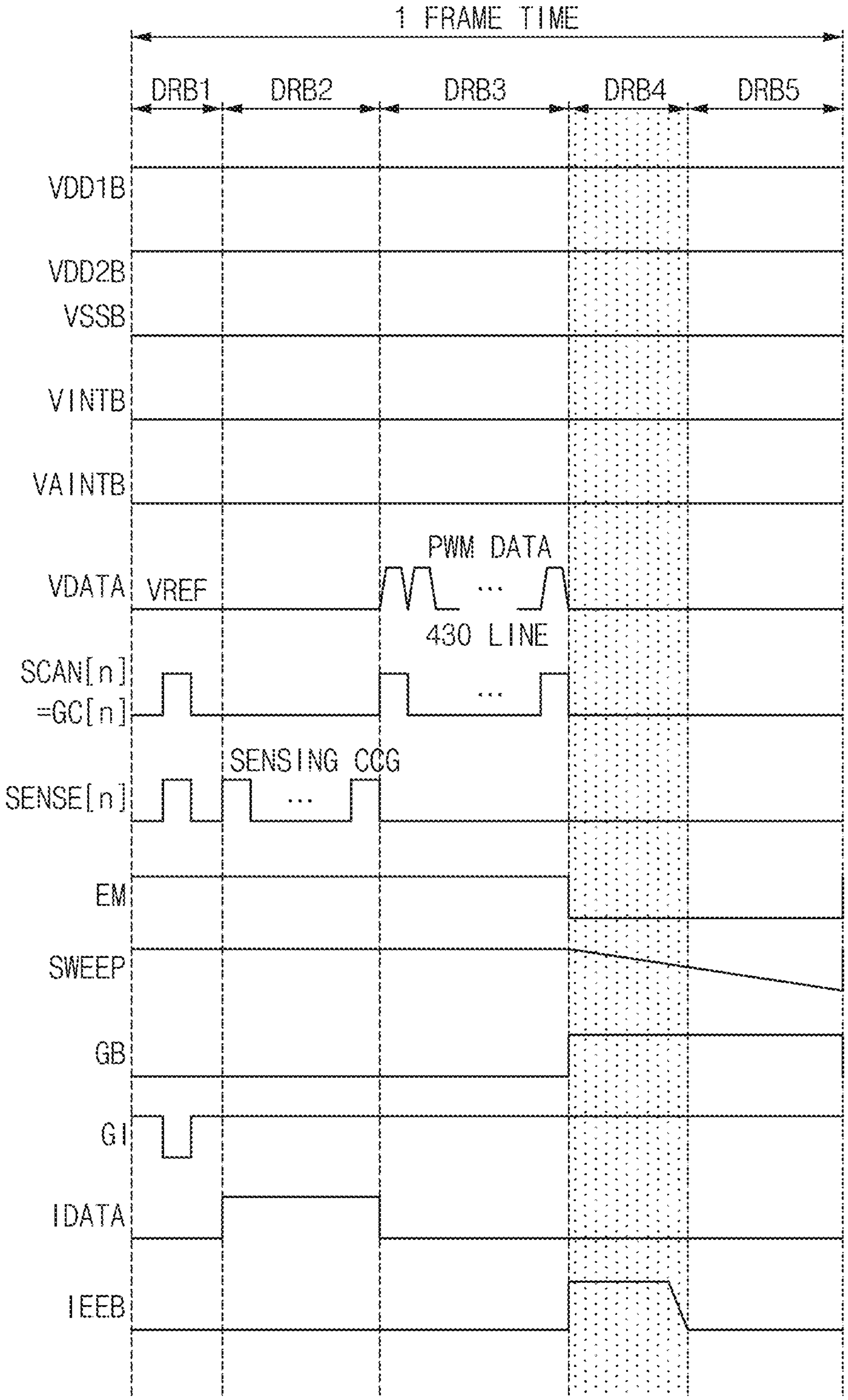
FIG. 43 is a timing diagram illustrating an example of input signals and an output signal of the pixel circuit of FIG. 35 and the constant current applying circuit of FIG. 35 in the fourth period.
Figure 44:
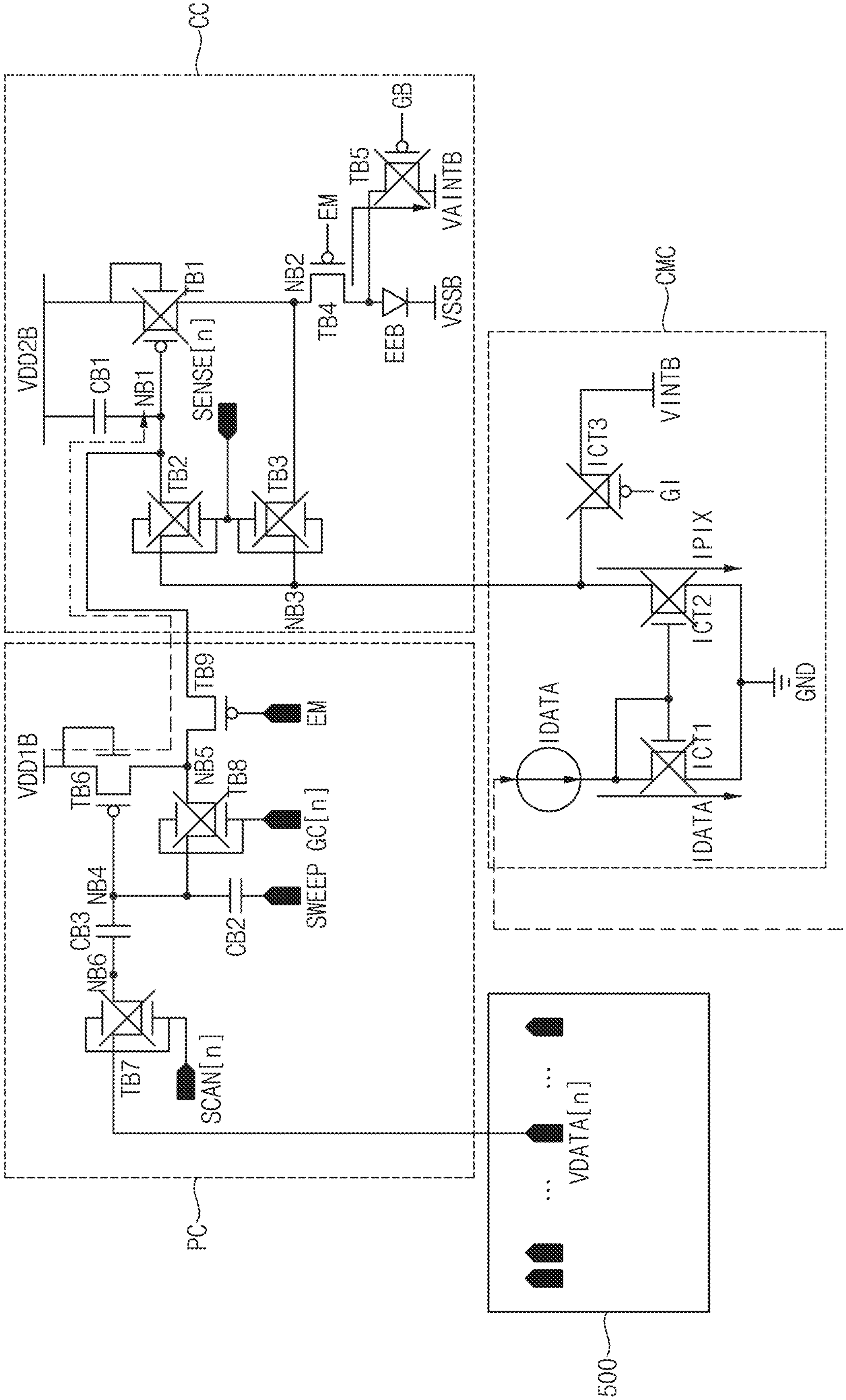
FIG. 44 is a circuit diagram illustrating an operation of the pixel circuit of FIG. 35 and an operation of the constant current applying circuit of FIG. 35 in a fifth period of the driving timing.
Figure 45:
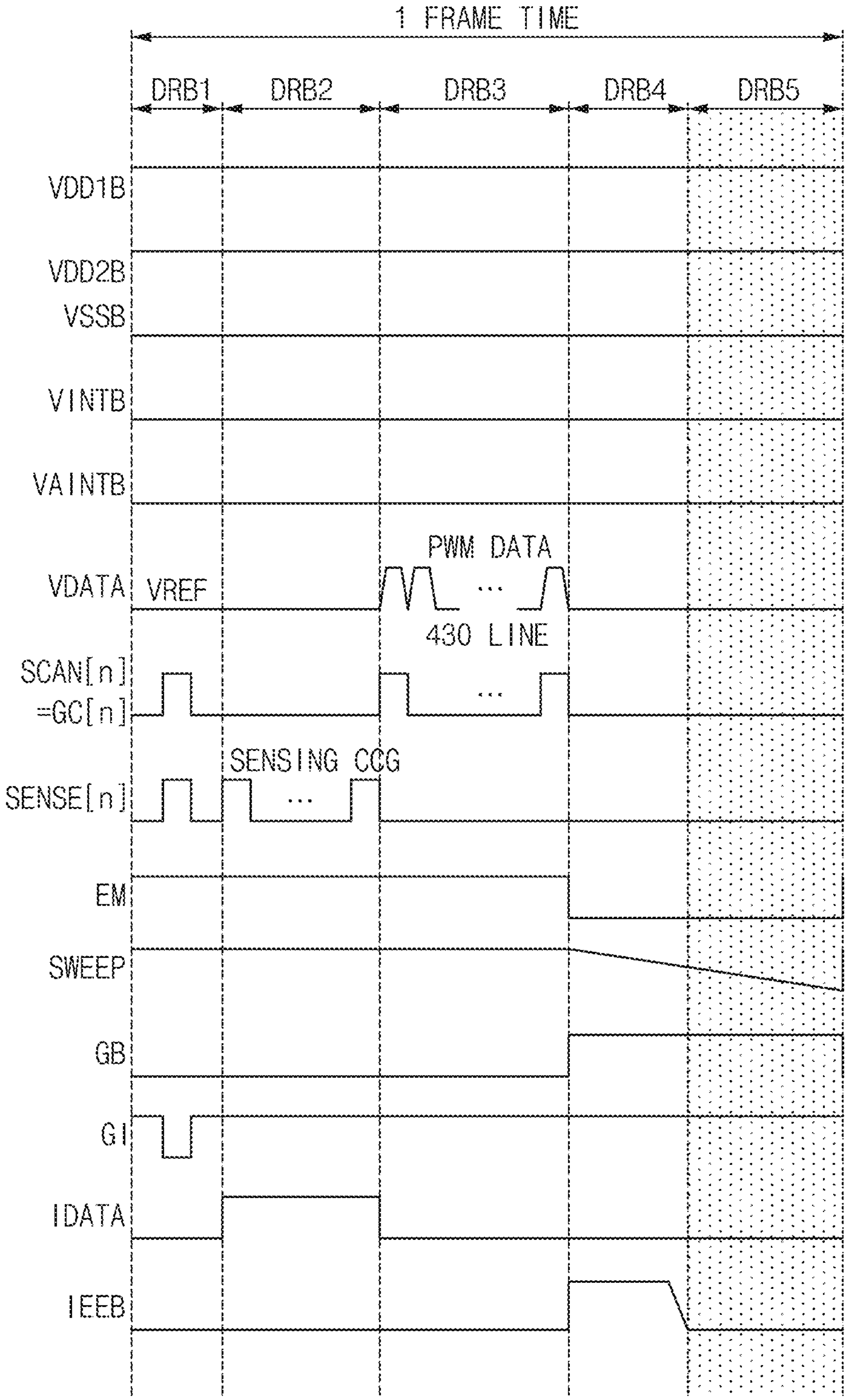
FIG. 45 is a timing diagram illustrating an example of input signals and an output signal of the pixel circuit of FIG. 35 and the constant current applying circuit of FIG. 35 in the fifth period.

FIG. 36 is a circuit diagram illustrating an operation of the pixel circuit CC and PC of FIG. 35 and an operation of the constant current applying circuit CMC of FIG. 35 in a first period of a driving timing. FIG. 37 is a timing diagram illustrating an example of input signals and an output signal of the pixel circuit CC and PC of FIG. 35 and the constant current applying circuit CMC of FIG. 35 in the first period. FIG. 38 is a circuit diagram illustrating an operation of the pixel circuit CC and PC of FIG. 35 and an operation of the constant current applying circuit CMC of FIG. 35 in a second period of the driving timing. FIG. 39 is a timing diagram illustrating an example of input signals and an output signal of the pixel circuit CC and PC of FIG. 35 and the constant current applying circuit CMC of FIG. 35 in the second period. FIG. 40 is a circuit diagram illustrating an operation of the pixel circuit CC and PC of FIG. 35 and an operation of the constant current applying circuit CMC of FIG. 35 in a third period of the driving timing. FIG. 41 is a timing diagram illustrating an example of input signals and an output signal of the pixel circuit CC and PC of FIG. 35 and the constant current applying circuit CMC of FIG. 35 in the third period. FIG. 42 is a circuit diagram illustrating an operation of the pixel circuit CC and PC of FIG. 35 and an operation of the constant current applying circuit CMC of FIG. 35 in a fourth period of the driving timing. FIG. 43 is a timing diagram illustrating an example of input signals and an output signal of the pixel circuit CC and PC of FIG. 35 and the constant current applying circuit CMC of FIG. 35 in the fourth period. FIG. 44 is a circuit diagram illustrating an operation of the pixel circuit CC and PC of FIG. 35 and an operation of the constant current applying circuit CMC of FIG. 35 in a fifth period of the driving timing. FIG. 45 is a timing diagram illustrating an example of input signals and an output signal of the pixel circuit CC and PC of FIG. 35 and the constant current applying circuit CMC of FIG. 35 in the fifth period.

Referring to FIGS. 1 and 35 to 45, in the driving timing, the first period DRB1 may be an initialization period, the second period DRB2 may be a constant-current sensing period, the third period DRB3 may be a pulse width modulation data writing period, the fourth period DRB4 may be the light emission period and the fifth period DRB5 may be the light emission-off period.

A width of the fourth period DRB4 which is the light emission period may be determined by a level of the pulse width modulation data VDATA.

The sweep signal SWEEP may have a constant high level in the first period DRB1, the second period DRB2 and the third period DRB3 and may gradually decrease in the fourth period DRB4 and the fifth period DRB5.

Referring to FIGS. 36 and 37, in the first period DRB1, the scan signal SCAN[n] may have an active pulse, the sensing control signal SENSE[n] may have an active pulse, the emission signal EM may have an inactive level, the sweep signal SWEEP may have the high level, the anode initialization gate signal GB may have an active level and the data voltage VDATA may have a reference level VREF. In the first period DRB1, the initialization gate signal GI may have an active pulse.

In the first period DRB1 to the fifth period DRB5, the compensation gate signal GC[n] may have an waveform and a timing same as the waveform and the timing of the scan signal SCAN[n].

In the first period DRB1, the reference level VREF may be applied to the sixth node NB6 through the seventh transistor TB7. In the first period DRB1, the second power voltage VDD1B may be applied to the fourth node NB4 through the sixth transistor TB6 and the eighth transistor TB8. In the first period DRB1, the first initialization voltage VINTB may be applied to the first node NB1 through the third current applying transistor ICT3 and the second transistor TB2. In the first period DRB1, the first initialization voltage VINTB may be applied to the second node NB2 through the third current applying transistor ICT3 and the third transistor TB3.

Referring to FIGS. 38 and 39, in the second period DRB2 subsequent to the first period DRB1, the scan signal SCAN [n] may have an inactive level, the sensing control signal SENSE[n] may have an active pulse, the emission signal EM may have the inactive level, the sweep signal SWEEP may have the high level and the anode initialization gate signal GB may have the active level. In the second period DRB2, the initialization gate signal GI may have an inactive level. In the second period DRB2, the data current IDATA may have an active level.

In the second period DRB2, the first current applying transistor ICT1 and the second current applying transistor ICT2 may be turned on so that the pixel current IPIX corresponding to the data current IDATA flows the first transistor TB1 through the third transistor TB3.

When the pixel current IPIX flows the first transistor TB1, a gate-source voltage may be stored in the first capacitor CB1. The pixel current IPIX may be a target current corresponding to a target luminance of the light emitting element EEB. When the target current flows the first transistor TB1, a threshold voltage of the first transistor TB1 may be compensated.

Referring to FIGS. 40 and 41, in the third period DRB3 subsequent to the second period DRB2, the scan signal SCAN[n] may have an active pulse, the sensing control signal SENSE[n] may have an inactive level, the emission signal EM may have the inactive level, the sweep signal SWEEP may have the high level, the anode initialization gate signal GB may have the active level and the data voltage VDATA may have a pulse width modulation data PWM DATA. In the third period DRB3, the initialization gate signal GI may have the inactive level. In the third period DRB3, the data current IDATA may have an inactive level.

In the third period DRB3, the seventh transistor TB7 is turned on so that the data voltage VDATA corresponding to the pulse width modulation data PWM DATA may be applied to the sixth node NA6 and a voltage level of the fourth node NB4 may be changed by a coupling of the third capacitor CB3.

Referring to FIGS. 42 to 45, in the fourth period DRB4 and the fifth period DRB5 which are subsequent to the third period DRB3, the scan signal SCAN[n] may have the inactive level, the sensing control signal SENSE[n] may have the inactive level, the emission signal EM may have an active level, the sweep signal SWEEP may gradually decrease from the high level and the anode initialization gate signal GB may have an inactive level.

The fourth period DRB4 may be the light emission period. In the light emission period DRB4, the fourth transistor TB4 may be turned on by the emission signal EM and the first transistor TB1 may be turned on by the gate-source voltage set after the second period DRB2.

In the light emission period DRB4, a current IEEB may flow along a path of the first transistor TB1, the fourth transistor TB4 and the light emitting element EEB so that the light emitting element EEB may emit a light.

The fifth period DRB5 subsequent to the fourth period DRB4 may be the light emission-off period. As the sweep signal SWEEP decreases, the sixth transistor TB6 may be turned on at a certain time point. The certain time point when the sixth transistor TB6 is turned on may be determined by the data voltage VDATA applied to the sixth node NB6.

When the sixth transistor TB6 is turned on, the second power voltage VDD1B may be applied to the control electrode of the first transistor TB1 through the sixth transistor TB6 and the ninth transistor TB9.

When the second power voltage VDD1B is applied to the control electrode of the first transistor TB1, the first transistor may be turned off and the light emitting element EEB may stop emitting a light.

According to the present embodiment, the pixel circuit may be driven in the pulse width modulation method. The threshold voltage of the driving transistor TB1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 46:
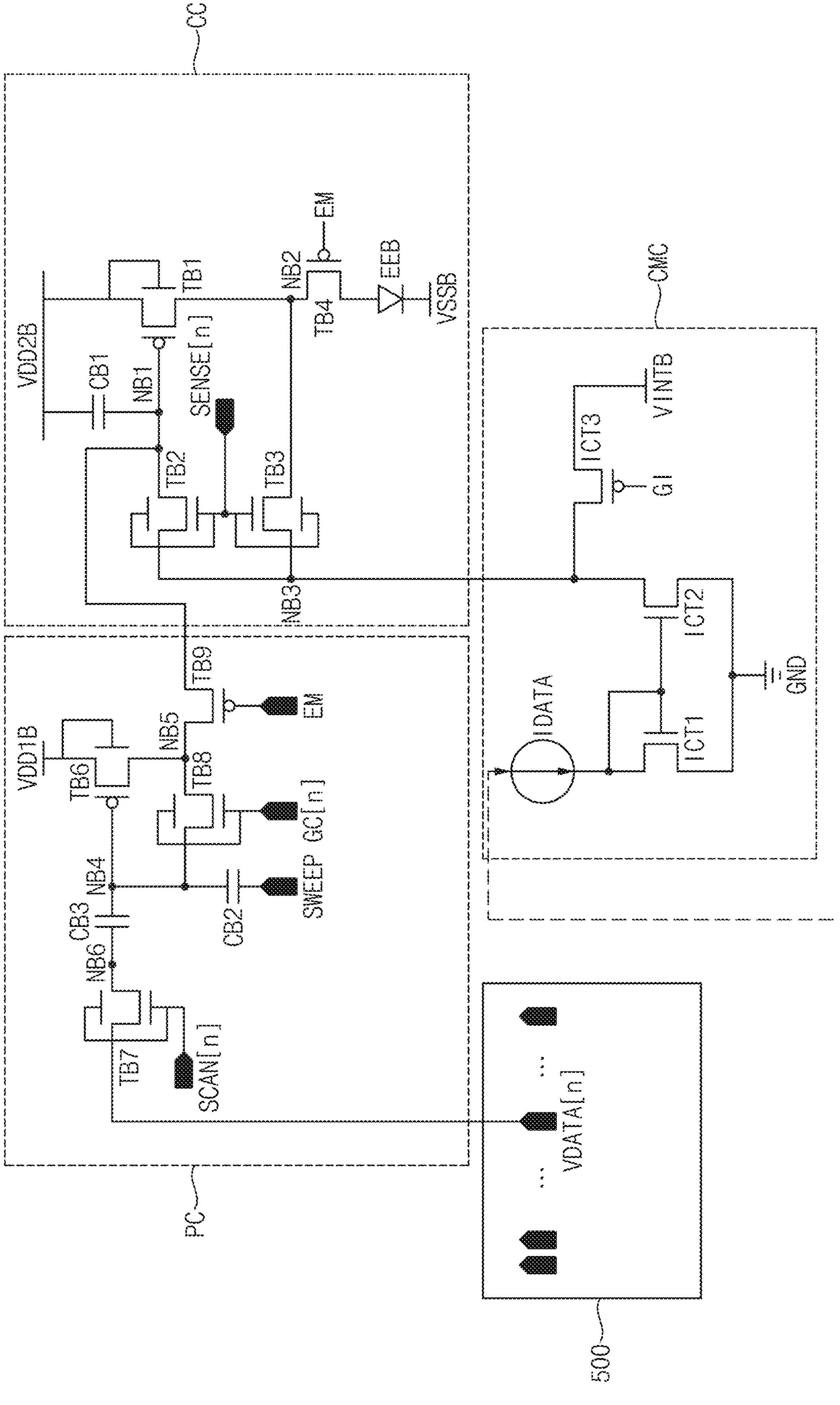
FIG. 46 is a circuit diagram illustrating a pixel circuit of a display panel of a display apparatus according to an embodiment of the present invention, a data driver and a constant current applying circuit of a display panel driver of the display apparatus.

FIG. 46 is a circuit diagram illustrating a pixel circuit CC and PC of a display panel 100 of a display apparatus according to an embodiment of the present invention, a data driver 500 and a constant current applying circuit CMC of a display panel driver of the display apparatus.

The display apparatus according to the present embodiment is substantially the same as the display apparatus of the previous embodiment explained referring to FIG. 35 except that the first circuit does not include a fifth transistor. Thus, the same reference numerals will be used to refer to the same or like parts as those described in the previous embodiment and any repetitive explanation concerning the above elements will be omitted.

Referring to FIGS. 1 and 46, the first circuit CC includes a first transistor TB1 including a control electrode connected to a first node NB1, a first electrode for receiving a first power voltage VDD2B and a second electrode connected to a second node NB2, a second transistor TB2 including a control electrode for receiving a sensing control signal SENSE[n], a first electrode connected to a third node NB3 and a second electrode connected to the first node NB1, a third transistor TB3 including a control electrode for receiving the sensing control signal SENSE[n], a first electrode connected to the third node NB3 and a second electrode connected to the second node NB2, a fourth transistor TB4 including a control electrode for receiving an emission signal EM, a first electrode connected to the second node NB2 and a second electrode connected to a first electrode of a light emitting element EEB, a first capacitor CB1 including a first electrode for receiving the first power voltage VDD2B and a second electrode connected to the first node NB1 and the light emitting element EEB including a first electrode connected to the second electrode of the fourth transistor TB4 and a second electrode for receiving a second power voltage VSSB.

According to the present embodiment, the pixel circuit may be driven in the pulse width modulation method. The threshold voltage of the driving transistor TB1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 47:
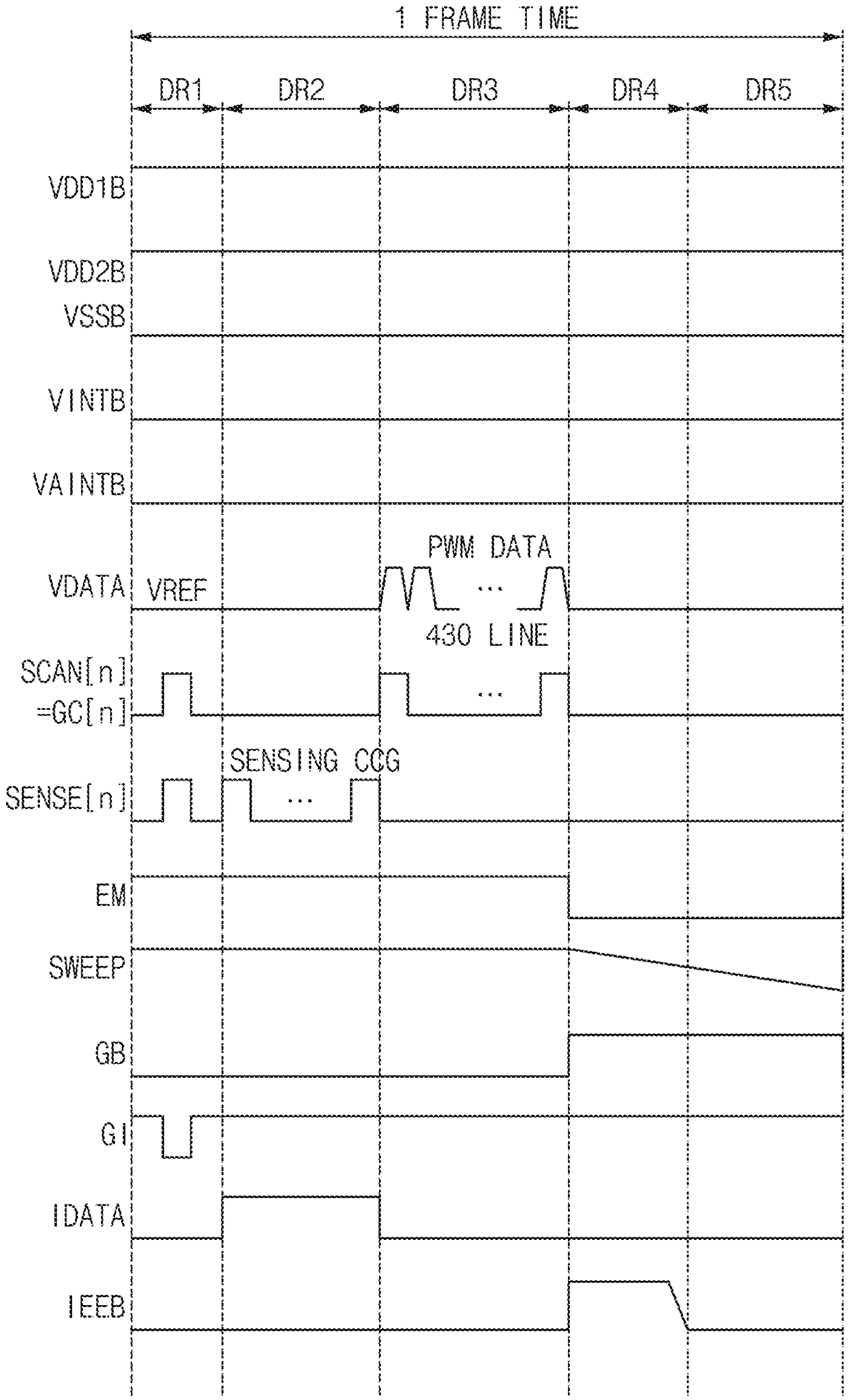
FIG. 47 is a timing diagram illustrating an example of input signals and an output signal of the pixel circuit of FIG. 35 and the constant current applying circuit of FIG. 35 in a writing period.
Figure 48:
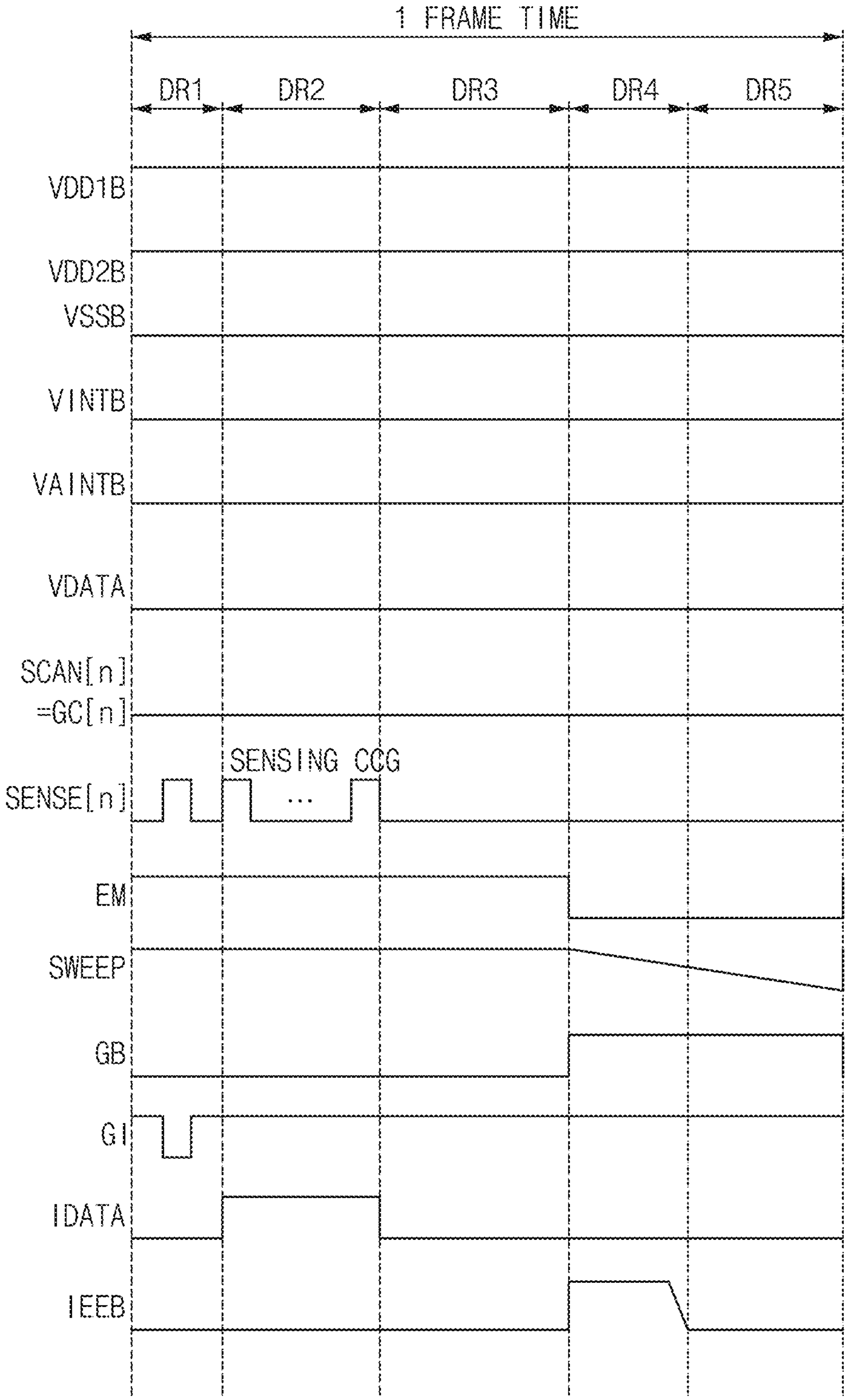
FIG. 48 is a timing diagram illustrating an example of input signals and an output signal of the pixel circuit of FIG. 35 and the constant current applying circuit of FIG. 35 in a holding period.

FIG. 47 is a timing diagram illustrating an example of input signals and an output signal of the pixel circuit CC and PC of FIG. 35 and the constant current applying circuit CMC of FIG. 35 in a writing period. FIG. 48 is a timing diagram illustrating an example of input signals and an output signal of the pixel circuit CC and PC of FIG. 35 and the constant current applying circuit CMC of FIG. 35 in a holding period.

The driving timing of the pixel circuit according to the present embodiment is substantially the same as the driving timing of the previous embodiment explained referring to FIGS. 37, 39, 41, 43 and 45 except that the display panel is driven in a variable frequency. Thus, the same reference numerals will be used to refer to the same or like parts as those described in the previous embodiment and any repetitive explanation concerning the above elements will be omitted.

Referring to FIGS. 1, 35, 47 and 48, the display panel 100 may be driven in a variable frequency.

The driving timing of the display apparatus supporting a variable frequency driving method may include a writing frame when the data voltage is written to the pixel and a holding frame when the light emitting element emits a light without writing the data voltage to the pixel.

In the writing frame, the data voltage VDATA may be applied to the sixth transistor TB6 and the light emitting element EEB may emit a light. In a first period DRB1 and a third period DRB3 of the writing frame, the scan signal SCAN[n] may have active pulses.

In the holding frame, the data voltage VDATA may not be applied to the sixth transistor TB6 and the light emitting element EEB may emit a light. In a first period DRB1 and a third period DRB3 of the holding frame, the scan signal SCAN[n] may have an inactive level.

According to the present embodiment, the pixel circuit may be driven in the pulse width modulation method. The threshold voltage of the driving transistor TB1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

In addition, in the present embodiment, the pixel circuit may support the variable frequency driving method so that the power consumption of the display apparatus may be reduced.

Figure 49:
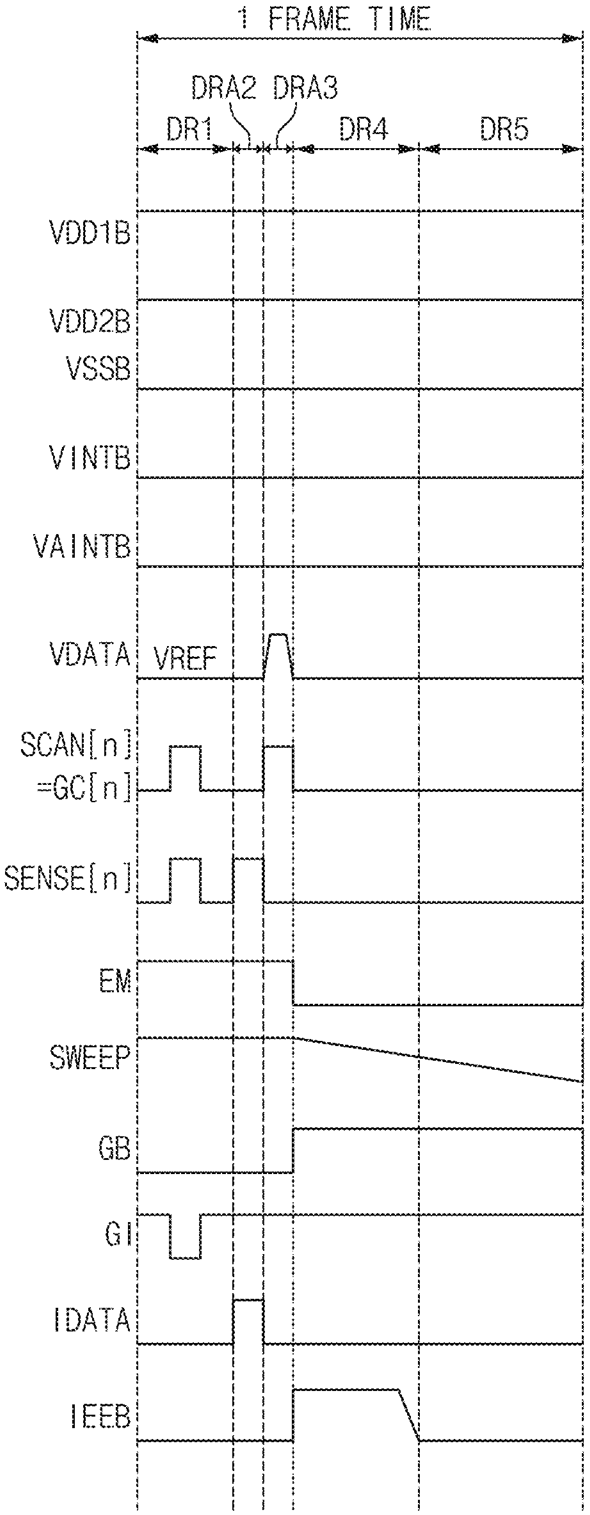
FIG. 49 is a timing diagram illustrating an example of input signals and an output signal of the pixel circuit of FIG. 35 and the constant current applying circuit of FIG. 35.

FIG. 49 is a timing diagram illustrating an example of input signals and an output signal of the pixel circuit CC and PC of FIG. 35 and the constant current applying circuit CMC of FIG. 35.

The driving timing of the pixel circuit according to the present embodiment is substantially the same as the driving timing of the previous embodiment explained referring to FIGS. 37, 39, 41, 43 and 45 except that the display panel is driven in a progressive light emission driving method. Thus, the same reference numerals will be used to refer to the same or like parts as those described in the previous embodiment and any repetitive explanation concerning the above elements will be omitted.

Referring to FIGS. 1, 35 and 49, the display panel 100 may be driven in a progressive light emission driving method.

According to the present embodiment, the pixel circuit may be driven in the pulse width modulation method. The threshold voltage of the driving transistor TB1 in the constant current generating circuit CC may be externally compensated by current writing. The pixel circuit may include the relatively fewer transistors compared to the conventional pixel circuit, so that the high integration may be achieved. Thus, the pixel circuit may be applicable to an ultra-high resolution display apparatus.

In addition, at least one transistor in the pulse width modulation circuit PC and at least one transistor in the constant current generating circuit CC may be N-type transistors so that a power consumption may be reduced.

Figure 50:
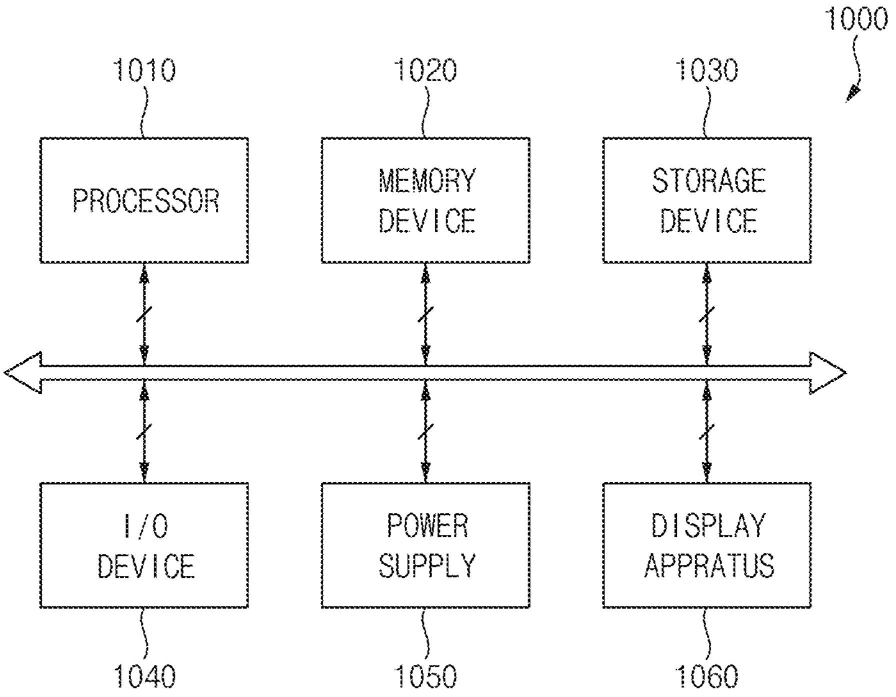
FIG. 50 is a block diagram illustrating an electronic apparatus according to an embodiment of the present invention.
Figure 51:
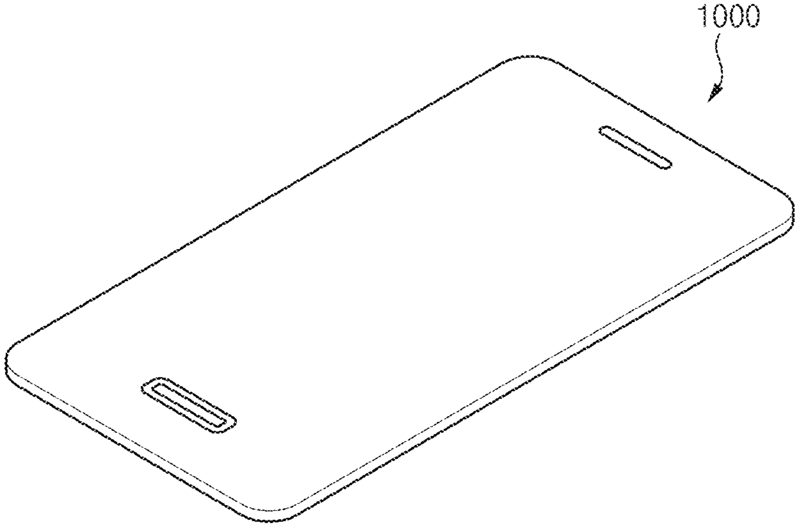
FIG. 51 is a diagram illustrating an example in which the electronic apparatus of FIG. 50 is implemented as a smart phone.

FIG. 50 is a block diagram illustrating an electronic apparatus 1000 according to an embodiment of the present invention. FIG. 51 is a diagram illustrating an example in which the electronic apparatus 1000 of FIG. 50 is implemented as a smart phone.

Referring to FIGS. 50 and 51, the electronic apparatus 1000 may include a processor 1010, a memory device 1020, a storage device 1030, an input/output (I/O) device 1040, a power supply 1050 and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 51, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 52:
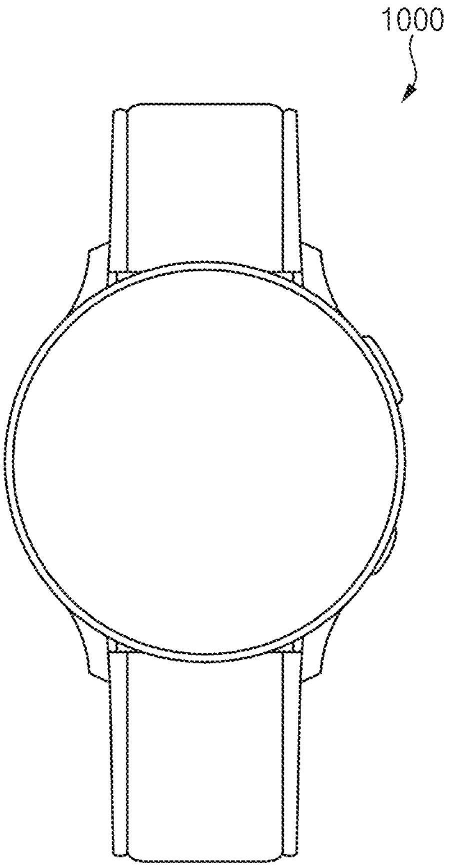
FIG. 52 is a diagram illustrating an example in which the electronic apparatus of FIG. 50 is implemented as a smart watch.

FIG. 52 is a diagram illustrating an example in which the electronic apparatus 1000 of FIG. 50 is implemented as a smart watch.

Referring to FIGS. 50 and 52, the electronic apparatus 1000 may be implemented as a smart watch. The smart watch may be an example of the electronic apparatus 1000 requiring an ultra-high resolution display panel.

According to the pixel circuit, the display apparatus and the electronic apparatus of the present invention as explained above, the ultra-high resolution display apparatus may be implemented using the pixel circuit having the high integration.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A pixel circuit comprising a first circuit, the first circuit comprising:

a seventh transistor including a control electrode connected to a fourth node, a first electrode connected to a fifth node and a second electrode connected to a sixth node;

an eighth transistor including a control electrode configured to receive a second writing gate signal, a first electrode connected to the fifth node and a second electrode connected to the fourth node;

a ninth transistor including a control electrode configured to receive the second writing gate signal, a first electrode configured to receive a data current and a second electrode connected to the fifth node;

a tenth transistor including a control electrode configured to receive a second initialization gate signal, a first electrode configured to receive a first initialization voltage and a second electrode connected to a seventh node;

an eleventh transistor including a control electrode configured to receive an emission signal, a first electrode configured to receive a second power voltage and a second electrode connected to the fifth node;

a twelfth transistor including a control electrode connected to the seventh node, a first electrode configured to receive the second power voltage or a second initialization voltage and a second electrode connected to the fourth node;

a thirteenth transistor including a control electrode configured to receive an anode initialization gate signal, a first electrode configured to receive the second initialization voltage and a second electrode connected to the sixth node; and a light emitting element including a first electrode connected to the sixth node and a second electrode configured to receive a third power voltage.

2. The pixel circuit of claim 1, wherein the first circuit further comprises:

a second capacitor including a first electrode connected to the fourth node and a second electrode connected to the sixth node; and a third capacitor including a first electrode connected to the seventh node and a second electrode connected to the first electrode of the twelfth transistor.

3. The pixel circuit of claim 1, further comprises a second circuit, the second circuit comprising:

a first transistor including a control electrode connected to a first node, a first electrode connected to a second node and a second electrode connected to a third node;

a second transistor including a control electrode configured to receive a first writing gate signal, a first electrode configured to receive a data voltage and a second electrode connected to the second node;

a third transistor including a control electrode configured to receive the first writing gate signal, a first electrode connected to the first node and a second electrode connected to the third node;

a fourth transistor including a control electrode configured to receive the emission signal, a first electrode configured to receive a first power voltage and a second electrode connected to the second node;

a fifth transistor including a control electrode configured to receive the emission signal, a first electrode connected to the third node and a second electrode connected to the seventh node; and a sixth transistor including a control electrode configured to receive a first initialization gate signal, a first electrode configured to receive the first initialization voltage and a second electrode connected to the first node.

4. The pixel circuit of claim 3, wherein the second circuit further comprises:

a first capacitor including a first electrode configured to receive a sweep signal and a second electrode connected to the first node.

5. The pixel circuit of claim 3, wherein the first transistor, the fourth transistor, the fifth transistor, the eighth transistor, the ninth transistor, the eleventh transistor, the twelfth transistor and the thirteenth transistor are P-type transistors, and wherein the second transistor, the third transistor, the sixth transistor and the tenth transistor are N-type transistors.

6. The pixel circuit of claim 3, wherein the seventh transistor is an N-type transistor, and wherein the first electrode of the twelfth transistor is configured to receive the second initialization voltage.

7. The pixel circuit of claim 3, wherein the seventh transistor is a P-type transistor, and wherein the first electrode of the twelfth transistor is configured to receive the second power voltage.

8. The pixel circuit of claim 3, wherein the second power voltage is greater than the first power voltage.

9. The pixel circuit of claim 3, wherein the first initialization gate signal sequentially has an active level and an inactive level in a first period, wherein the second initialization gate signal sequentially has an inactive level and an active level in the first period, wherein the first writing gate signal has an inactive level in the first period, wherein the second writing gate signal has an inactive level in the first period, wherein the emission signal has an inactive level in the first period, wherein the sweep signal has a high level in the first period, wherein the first initialization voltage has a low level in the first period, wherein the data current has a low level in the first period, and wherein the anode initialization gate signal has an active level in the first period.

10. The pixel circuit of claim 9, wherein the first initialization gate signal has the inactive level in a second period subsequent to the first period, wherein the second initialization gate signal has the inactive level in the second period, wherein the first writing gate signal has an active pulse in the second period, wherein the second writing gate signal has an inactive level in the second period, wherein the emission signal has the inactive level in the second period, wherein the sweep signal has the high level in the second period, wherein the first initialization voltage has the low level in the second period, wherein the data current has the low level in the second period, and wherein the anode initialization gate signal has an inactive level.

11. The pixel circuit of claim 10, wherein the first initialization gate signal has the inactive level in a third period subsequent to the second period, wherein the second initialization gate signal has an active pulse in the third period, wherein the first writing gate signal has the inactive level in the third period, wherein the second writing gate signal has an active pulse in the third period, wherein the emission signal has the inactive level in the third period, wherein the sweep signal has the high level in the third period, wherein the first initialization voltage has a high pulse in the third period, wherein the data current has a high level in the third period, and wherein the anode initialization gate signal has the active level in the third period.

12. The pixel circuit of claim 11, wherein the first initialization gate signal has the inactive level in a fourth period subsequent to the third period and a fifth period subsequent to the fourth period, wherein the second initialization gate signal has the inactive level in the fourth period and the fifth period, wherein the first writing gate signal has the inactive level in the fourth period and the fifth period, wherein the second writing gate signal has the inactive level in the fourth period and the fifth period, wherein the emission signal has an active level in the fourth period and the fifth period, wherein the sweep signal gradually decreases from the high level in the fourth period and the fifth period, wherein the first initialization voltage has the low level in the fourth period and the fifth period, wherein the data current has the low level in the fourth period and the fifth period, and wherein the anode initialization gate signal has the inactive level in the fourth period and the fifth period.

13. The pixel circuit of claim 3, wherein the data voltage is applied to the first transistor, and the light emitting element emits a light in a writing frame, wherein the first initialization gate signal sequentially has an active level and an inactive level in a first period of the writing frame, wherein the second initialization gate signal sequentially has an inactive level and an active level in the first period of the writing frame, wherein the first writing gate signal has an active pulse in a second period of the writing frame, wherein the data voltage is not applied to the first transistor, and the light emitting element emits a light in a holding frame, wherein the first initialization gate signal and the second initialization gate signal have an inactive level in a first period of the holding frame, and wherein the first writing gate signal has an inactive level in a second period of the holding frame.

14. A display apparatus comprising:

a display panel comprising a pixel;

a data driver configured to output a data voltage to the pixel;

a gate driver configured to output a gate signal to the pixel; and an emission driver configured to output an emission signal to the pixel, wherein the pixel comprises a first circuit, the first circuit comprising:

a seventh transistor including a control electrode connected to a fourth node, a first electrode connected to a fifth node and a second electrode connected to a sixth node;

an eighth transistor including a control electrode configured to receive a second writing gate signal, a first electrode connected to the fifth node and a second electrode connected to the fourth node;

a ninth transistor including a control electrode configured to receive the second writing gate signal, a first electrode configured to receive a data current and a second electrode connected to the fifth node;

a tenth transistor including a control electrode configured to receive a second initialization gate signal, a first electrode configured to receive a first initialization voltage and a second electrode connected to a seventh node;

an eleventh transistor including a control electrode configured to receive the emission signal, a first electrode configured to receive a second power voltage and a second electrode connected to the fifth node;

a twelfth transistor including a control electrode connected to the seventh node, a first electrode configured to receive the second power voltage or a second initialization voltage and a second electrode connected to the fourth node;

a thirteenth transistor including a control electrode configured to receive an anode initialization gate signal, a first electrode configured to receive the second initialization voltage and a second electrode connected to the sixth node; and a light emitting element including a first electrode connected to the sixth node and a second electrode configured to receive a third power voltage.

15. An electronic apparatus comprising:

a display panel comprising a pixel;

a data driver configured to output a data voltage to the pixel;

a gate driver configured to output a gate signal to the pixel;

an emission driver configured to output an emission signal to the pixel;

a driving controller configured to control the data driver, the gate driver and the emission driver; and a processor configured to output input image data and an input control signal to the driving controller, wherein the pixel comprises a first circuit, the first circuit comprising:

a seventh transistor including a control electrode connected to a fourth node, a first electrode connected to a fifth node and a second electrode connected to a sixth node;

an eighth transistor including a control electrode configured to receive a second writing gate signal, a first electrode connected to the fifth node and a second electrode connected to the fourth node;

a ninth transistor including a control electrode configured to receive the second writing gate signal, a first electrode configured to receive a data current and a second electrode connected to the fifth node;

a tenth transistor including a control electrode configured to receive a second initialization gate signal, a first electrode configured to receive a first initialization voltage and a second electrode connected to a seventh node;

an eleventh transistor including a control electrode configured to receive the emission signal, a first electrode configured to receive a second power voltage and a second electrode connected to the fifth node;

a twelfth transistor including a control electrode connected to the seventh node, a first electrode configured to receive the second power voltage or a second initialization voltage and a second electrode connected to the fourth node;

a thirteenth transistor including a control electrode configured to receive an anode initialization gate signal, a first electrode configured to receive the second initialization voltage and a second electrode connected to the sixth node; and a light emitting element including a first electrode connected to the sixth node and a second electrode configured to receive a third power voltage.

* * * * *